US012249273B2

(12) United States Patent
Hwang et al.

(10) Patent No.: US 12,249,273 B2
(45) **Date of Patent: *Mar. 11, 2025**

(54) DISPLAY DEVICE AND METHOD OF INSPECTING THE SAME

(71) Applicant: Samsung Display Co., LTD., Yongin-si (KR)

(72) Inventors: Jung Hwan Hwang, Seongnam-si (KR); Hyun Joon Kim, Hwaseong-si (KR); Kye Uk Lee, Seoul (KR); Jun Ki Jeong, Yongin-si (KR); Sang Jin Jeon, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,018

(22) Filed: Oct. 30, 2023

(65) Prior Publication Data

US 2024/0071299 A1 Feb. 29, 2024

Related U.S. Application Data

(63) Continuation of application No. 17/941,990, filed on Sep. 9, 2022, now Pat. No. 11,804,172.

(30) Foreign Application Priority Data

Oct. 19, 2021 (KR) ........................ 10-2021-0139198
Mar. 14, 2022 (KR) ........................ 10-2022-0031708

(51) Int. Cl.
*G09G 3/32* (2016.01)

(52) U.S. Cl.
CPC ......... *G09G 3/32* (2013.01); *G09G 2310/027* (2013.01); *G09G 2310/0297* (2013.01)

(58) Field of Classification Search
CPC ............... G09G 3/32; G09G 2310/027; G09G 2310/0297
See application file for complete search history.

(56) References Cited

U.S. PATENT DOCUMENTS 11,100,849 B1 * 8/2021 Yang ........................ G09G 3/32
2019/0371232 A1 12/2019 Kim et al.
2020/0327834 A1 10/2020 Kim et al.
2020/0394953 A1 * 12/2020 Kim ........................ G09G 3/32
2021/0210002 A1 7/2021 Kim et al.
2021/0210003 A1 7/2021 Kim et al.

FOREIGN PATENT DOCUMENTS

WO WO 2019-231074 12/2019

* cited by examiner

*Primary Examiner* — Abdul-Samad A Adediran
(74) *Attorney, Agent, or Firm* — Womble Bond Dickinson (US) LLP

(57) ABSTRACT

A display device includes connection lines, pulse amplitude modulation (PAM) data lines configured to receive pulse width modulation (PWM) data voltages, PWM data lines configured to receive the PWM data voltages, a first connection control line configured to receive a first connection control signal, a second connection control line configured to receive a second connection control signal, subpixels connected to the PWM data lines and the PAM data lines, and a first demultiplexer (demux) unit configured to connect the connection lines to the PAM data lines or to the PWM data lines according to the first connection control signal and the second connection control signal.

20 Claims, 26 Drawing Sheets

(a)

(b)

(c)

DISPLAY DEVICE AND METHOD OF INSPECTING THE SAME

CROSS-REFERENCE TO RELATED APPLICATIONS

This application is a continuation of U.S. patent application Ser. No. 17/941,990, filed Sep. 9, 2022, which claims priority to and the benefit of Korean Patent Application No. 10-2021-0139198 filed on Oct. 19, 2021, and Korean Patent Application No. 10-2022-0031708 filed on Mar. 14, 2022, in the Korean Intellectual Property Office (KIPO), the entire content of all of which is incorporated herein by reference.

BACKGROUND

1. Field

The present disclosure relates to a display device and a method of inspecting the same.

2. Description of the Related Art

As the information society develops, demands for display devices for displaying images are increasing in various forms. The display devices may be flat panel display devices such as liquid crystal display devices, field emission display devices, and light emitting display devices.

The light emitting display devices may include organic light emitting display devices including an organic light emitting diode element as a light emitting element or light emitting diode display devices including an inorganic light emitting diode element such as a light emitting diode as a light emitting element. Because the wavelength of light emitted from an inorganic light emitting diode element varies according to a driving current, image quality may deteriorate if the luminance or grayscale level of light emitted from the inorganic light emitting diode element is adjusted by adjusting the magnitude of the driving current applied to the inorganic light emitting diode element.

SUMMARY

Aspects of one or more embodiments of the present disclosure provide a display device capable of reducing or preventing deterioration of image quality due to a change in the wavelength of light emitted from an inorganic light emitting diode element according to a driving current applied to the inorganic light emitting diode element, and a method of inspecting the display device.

However, embodiments of the present disclosure are not limited to those set forth herein. The above and other embodiments of the present disclosure will become more apparent to one of ordinary skill in the art to which the present disclosure pertains by referencing the detailed description of the present disclosure given below.

According to one or more embodiments of the present disclosure, there is provided a display device including connection lines, pulse amplitude modulation (PAM) data lines configured to receive PAM data voltages, pulse width modulation (PWM) data lines configured to receive the PWM data voltages, a first connection control line configured to receive a first connection control signal, a second connection control line configured to receive a second connection control signal, subpixels connected to the PWM data lines and the PAM data lines, and a first demultiplexer (demux) unit configured to connect the connection lines to the PAM data lines or to the PWM data lines according to the first connection control signal and the second connection control signal.

The first demux unit may connect the connection lines to the PAM data lines when the first connection control signal of a gate-on voltage is applied to the first connection control line and may connect the connection lines to the PWM data lines when the second connection control signal of the gate-on voltage is applied to the second connection control line.

The first demux unit may include: a first connection control transistor that includes a gate electrode connected to the first connection control line, a first electrode connected to a first connection line from among the connection lines, and a second electrode connected to a first PAM data line from among the PAM data lines; a second connection control transistor that includes a gate electrode connected to the first connection control line, a first electrode connected to a second connection line from among the connection lines, and a second electrode connected to a second PAM data line from among the PAM data lines; and a third connection control transistor that includes a gate electrode connected to the first connection control line, a first electrode connected to a third connection line from among the connection lines, and a second electrode connected to a third PAM data line from among the PAM data lines.

The first demux unit may include: a fourth connection control transistor that includes a gate electrode connected to the second connection control line, a first electrode connected to a first connection line from among the connection lines, and a second electrode connected to a first PWM data line from among the PWM data lines; a fifth connection control transistor that includes a gate electrode connected to the second connection control line, a first electrode connected to a second connection line from among the connection lines, and a second electrode connected to a second PWM data line from among the PWM data lines; and a sixth connection control transistor that includes a gate electrode connected to the second connection control line, a first electrode connected to a third connection line from among the connection lines, and a second electrode connected to a third PWM data line from among the PWM data lines.

The display device may further include a fan-out line configured to receive the PWM data voltages, a first demux control line configured to receive a first demux control signal, a second demux control line configured to receive a second demux control signal, and a third demux control line configured to receive a third demux control signal. The first demux unit may selectively connect the fan-out line to Q connection lines from among the connection lines according to the first demux control signal, the second demux control signal, and the third demux control signal, where Q is an integer greater than equal to 2.

The first demux unit may connect the fan-out line to a first connection line from among the Q connection lines when the first demux control signal of a gate-on voltage is applied to the first demux control line, may connect the fan-out line to a second connection line from among the Q connection lines when the second demux control signal of the gate-on voltage is applied to the second demux control line, and may connect the fan-out line to a third connection line from among the Q connection lines when the third demux control signal of the gate-on voltage is applied to the third demux control line.

The first demux unit may include: a first demux transistor that includes a gate connected to the first demux control line, a first electrode connected to the fan-out line, and a second electrode connected to a first connection line from among the Q connection lines; a second demux transistor that includes a gate connected to the second demux control line, a first electrode connected to the fan-out line, and a second electrode connected to a second connection line from among the Q connection lines; and a third demux transistor that includes a gate electrode connected to the third demux control line, a first electrode connected to the fan-out line, and a second electrode connected to a third connection line from among the Q connection lines.

The display device may further include a first PWM control line configured to receive a first PWM control signal, a second PWM control line configured to receive a second PWM control signal, a third PWM control line configured to receive a third PWM control signal, and a second demux unit configured to connect the PWM data lines to a first power line configured to receive a first power supply voltage, according to the first PWM control signal, the second PWM control signal, and the third PWM control signal.

The second demux unit may connect a first PWM data line from among the PWM data lines to the first power line when the first PWM control signal of a gate-on voltage is applied to the first PWM control line, may connect a second PWM data line from among the PWM data lines to the first power line when the second PWM control signal of the gate-on voltage is applied to the second PWM control line, and may connect a third PWM data line from among the PWM data lines to the first power line when the third PWM control signal of the gate-on voltage is applied to the third PWM control line.

The second demux unit may include: a first PWM control transistor that includes a gate electrode connected to the first PWM control line, a first electrode connected to a first PWM data line from among the PWM data lines, and a second electrode connected to the first power line; a second PWM control transistor that includes a gate electrode connected to the second PWM control line, a first electrode connected to a second PWM data line from among the PWM data lines, and a second electrode connected to the first power line; and a third PWM control transistor that includes a gate electrode connected to the third PWM control line, a first electrode connected to a third PWM data line from among the PWM data lines, and a second electrode connected to the first power line.

The display device may further include a first PAM pad line configured to receive a first PWM data voltage, a second PAM pad line configured to receive a second PWM data voltage, and a third PAM pad line configured to receive a third PWM data voltage. When the second connection control signal of a gate-on voltage is applied to the second connection control line, the second demux unit may connect the first PAM pad line to a first PAM data line from among the PAM data lines, may connect the second PAM pad line to a second PAM data line from among the PAM data lines, and may connect the third PAM pad line to a third PAM data line from among the PAM data lines.

Each of the subpixels may include a PWM emission line configured to receive a PWM emission signal, a PAM emission line configured to receive a PAM emission signal, a first pixel driver configured to supply a control current according to a corresponding one of the PWM data voltages to a first node according to the PWM emission signal, a second pixel driver configured to generate a driving current according to a corresponding one of the PWM data voltages according to the PWM emission signal, and a third pixel driver configured to supply the driving current to a light emitting element according to the PAM emission signal and a voltage of the first node.

The display device may further include a scan write line configured to receive a scan write signal, a scan initialization line configured to receive a scan initialization signal, a scan control line configured to receive a scan control signal is applied, a PWM emission line configured to receive a PWM emission signal, a PAM emission line configured to receive a PAM emission signal, a sweep signal line configured to receive a sweep signal, an initialization voltage line configured to receive an initialization voltage, and a first power line configured to receive a first power supply voltage. The first pixel driver may include a first transistor configured to generate the control current according to a corresponding one of the PWM data voltages, a second transistor configured to apply the first PWM data voltage of a first data line to a first electrode of the first transistor according to the scan write signal, a third transistor configured to apply the initialization voltage of the initialization voltage line to a gate electrode of the first transistor according to the scan initialization signal, a fourth transistor configured to connect the gate electrode and a second electrode of the first transistor according to the scan write signal, a fifth transistor configured to connect the first power line to the first electrode of the first transistor according to the PWM emission signal, a sixth transistor configured to connect the second electrode of the first transistor to the first node according to the PWM emission signal, a seventh transistor configured to connect the sweep signal line to a gate-off voltage line configured to receive a gate-off voltage, according to the scan control signal, and a first capacitor located between the sweep signal line and the gate electrode of the first transistor.

The display device may further include a scan write line configured to receive a scan write signal, a scan initialization line configured to receive a scan initialization signal, a scan control line configured to receive a scan control signal, a PWM emission line configured to receive a PWM emission signal, a PAM emission line configured to receive a PAM emission signal, a sweep signal line configured to receive a sweep signal, an initialization voltage line configured to receive an initialization voltage, a first power line configured to receive a first power supply voltage, and a second power line configured to receive a second power supply voltage. The second pixel driver may include an eighth transistor configured to generate the driving current according to a second PWM data voltage, a ninth transistor configured to apply the second PWM data voltage of a second data line to a first electrode of the eighth transistor according to the scan write signal, a tenth transistor configured to apply the initialization voltage of the initialization voltage line to a gate electrode of the eighth transistor according to the scan initialization signal, an eleventh transistor configured to connect the gate electrode and a second electrode of the eighth transistor according to the scan write signal, a twelfth transistor configured to connect the first power line to a second node according to the scan control signal, a thirteenth transistor configured to connect the second power line to a first electrode of the ninth transistor according to the PWM emission signal, a fourteenth transistor configured to connect the second power line to the second node according to the PWM emission signal, and a second capacitor located between a gate electrode of the ninth transistor and the second node.

The display device may further include a scan write line configured to receive a scan write signal, a scan initialization line configured to receive a scan initialization signal, a scan control line configured to receive a scan control signal, a PWM emission line configured to receive a PWM emission signal, a PAM emission line configured to receive a PAM emission signal, a sweep signal line configured to receive a sweep signal, an initialization voltage line configured to receive an initialization voltage, a first power line configured to receive a first power supply voltage, a second power line configured to receive a second power supply voltage, and a third power line configured to receive a third power supply voltage. The third pixel driver may include a fifteenth transistor that includes a gate electrode connected to a third node, a sixteenth transistor configured to connect the third node to the initialization voltage line according to the scan control signal, a seventeenth transistor configured to connect a second electrode of the fifteenth transistor to a first electrode of the light emitting element according to the PAM emission signal, an eighteenth transistor configured to connect the first electrode of the light emitting element to the initialization voltage line according to the scan control signal, and a third capacitor located between the third node and the initialization voltage line.

According to one or more embodiments of the present disclosure, there is provided a display device including a fan-out line configured to receive PWM data voltages, PAM data lines configured to receive the PAM data voltages, PWM data lines, subpixels connected to the PWM data lines and the PAM data lines, a first demux unit configured to control connection between the fan-out line and the PWM data lines and connection between the fan-out line and the PAM data lines, and a second demux unit configured to control connection between the PWM data lines and a first power line configured to receive a first power supply voltage.

The display device may further include a first pad unit that includes a data pad connected to the fan-out line, and a second pad unit that includes a power pad connected to the first power line. The first pad unit may be located on a side of a display panel, and the second pad unit may be located on an other side opposite the side of the display panel.

The first demux unit may be located adjacent to the first pad unit, and the second demux unit may be located adjacent to the second pad unit.

The display device may further include a first circuit board connected to the first pad unit, a source driving circuit located on the first circuit board and configured to output the PWM data voltages, a second circuit board connected to the second pad unit, and a power supply circuit located on the second circuit board and configured to output the PWM data voltages and the first power supply voltage.

According to one or more embodiments of the present disclosure, there is provided a display device including a fan-out line configured to receive PWM data voltages, a first power line configured to receive a first power supply voltage, PAM pad lines configured to receive PAM data voltages, PWM data lines configured to be connected to the fan-out line in a first mode and to be connected to the first power line in a second mode, PAM data lines configured to be connected to the PAM pad lines in the first mode and to be connected to the fan-out line in the second mode, and subpixels connected to the PWM data lines and the PAM data lines.

According to one or more embodiments of the present disclosure, there is provided a method of inspecting a display device that includes fan-out lines, PAM data lines configured to receive PAM data voltages, PWM data lines configured to receive the PWM data voltages, and subpixels connected to the PWM data lines and the PAM data lines, the method including supplying the PWM data voltages of the fan-out lines to the PWM data lines and supplying the PAM data voltages of PAM pad lines to the PAM data lines, thereby causing light emitting elements of the subpixels to emit light, in a first mode, and supplying inspection PWM data voltages of the fan-out-lines to the PWM data lines, thereby causing the light emitting elements of the subpixels to emit light, in a second mode.

According to the aforementioned and other embodiments of the present disclosure, the luminance of light emitted from an inorganic light emitting diode element is controlled by adjusting a period during which a driving current is applied while maintaining the driving current applied to the inorganic light emitting diode element constant or substantially constant. Therefore, it may be possible to reduce or prevent deterioration of image quality due to a change in the wavelength of light emitted from the inorganic light emitting diode element according to the driving current applied to the inorganic light emitting diode element.

According to the aforementioned and other embodiments of the present disclosure, a first demux unit may time-divisionally supply PWM data voltages applied to each of fan-out lines to Q PWM data lines in a first mode, and a second demux unit may connect data pad lines, to which PAM data voltages are applied, to PAM data lines, respectively. Accordingly, light emitting elements of subpixels may emit light according to the PWM data voltages applied to the PWM data lines and the PAM data voltages applied to the PAM data lines. Therefore, in the first mode, it may be possible to inspect whether the subpixels display an image or whether a first pixel driver of each of the subpixels operates normally.

According to the aforementioned and other embodiments of the present disclosure, because a first demux unit time-divisionally supplies inspection data voltages applied to each of fan-out lines to Q PAM data lines in a second mode, an independent inspection data voltage can be applied to each of the PAM data lines.

Therefore, because light emitting elements of subpixels may emit light according to the inspection data voltages of the PAM data lines, it may be possible to inspect whether a second pixel driver operates normally.

According to the aforementioned and other embodiments of the present disclosure, when a first pixel driver and a second pixel driver of each of subpixels are controlled by scan signals of different scan lines, a scan PWM write pulse of a $k^{th}$ scan PWM write signal may not be applied in a second mode, and only a scan PAM write pulse of a $k^{th}$ scan PAM write signal may be applied. Accordingly, even when inspection data voltages of fan-out lines are concurrently (e.g., simultaneously) applied to PWM data lines and PAM data lines, a PWM data voltage of a PWM data line may not be applied to the first pixel driver, but a PAM data voltage of a PAM data line may be applied to the second pixel driver. Therefore, it may be possible to inspect whether the second pixel driver of each of the subpixels operates normally.

BRIEF DESCRIPTION OF THE DRAWINGS

The above and other embodiments and features of the present disclosure will become more apparent by describing embodiments thereof with reference to the attached drawings, in which.

DETAILED DESCRIPTION

Figure 1:
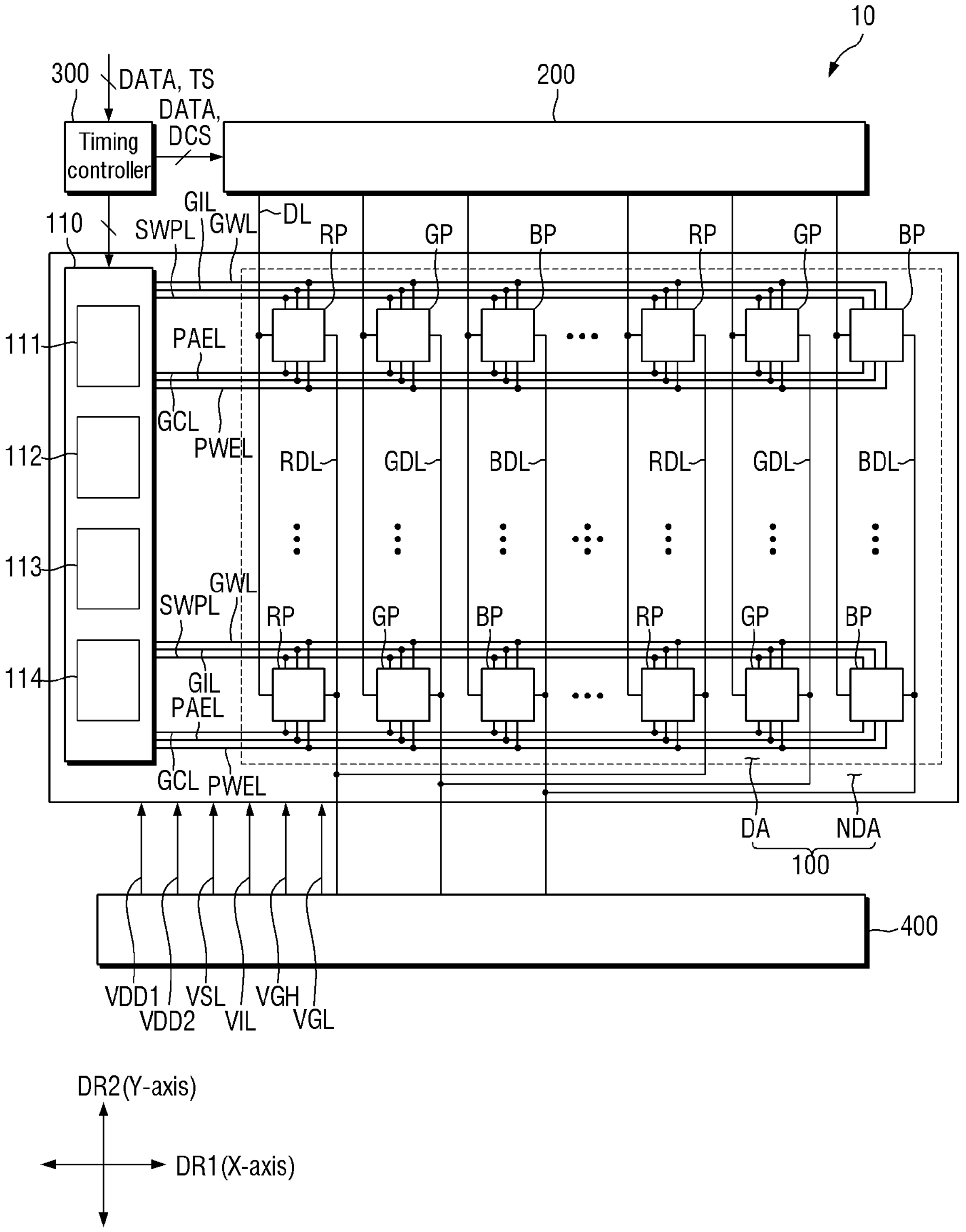
FIG. 1 is a block diagram of a display device according to one or more embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure might not be described.

Unless otherwise noted, like reference numerals, characters, or combinations thereof denote like elements throughout the attached drawings and the written description, and thus, descriptions thereof will not be repeated. Further, parts not related to the description of some embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present.

For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof.

Similarly, the expression such as "at least one of A and B" may include A, B, or A and B. As used herein, the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section.

Thus, a first element, component, region, layer or section described below could be termed a second element, component, region, layer or section, without departing from the spirit and scope of the present disclosure.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed concurrently (e.g., substantially at the same time) or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware.

For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of some embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram of a display device 10 according to one or more embodiments.

Referring to FIG. 1, the display device 10 includes a display panel 100, a scan driver 110, a source driver 200, a timing controller 300, and a power supply unit 400.

A display area DA of the display panel 100 may include subpixels RP, GP and BP for displaying an image, scan write lines GWL, scan initialization lines GIL, scan control lines GCL, sweep signal lines SWPL, pulse width modulation (PWM) emission lines PWEL, pulse amplitude modulation (PAM) emission lines PAEL, PWM data lines DL, first PAM data lines RDL, second PAM data lines GDL, and third PAM data lines BDL connected to the subpixels RP, GP and BP.

The scan write lines GWL, the scan initialization lines GIL, the scan control lines GCL, the sweep signal lines SWPL, the PWM emission lines PWEL, and the PAM emission lines PAEL may extend in a first direction (e.g., DR1, X-axis direction) and may be arranged along a second direction (e.g., DR2, Y-axis direction) intersecting the first direction (X-axis direction). The PWM data lines DL, the first PAM data lines RDL, the second PAM data lines GDL, and the third PAM data lines BDL may extend in the second direction (e.g., DR2, Y-axis direction) and may be arranged along the first direction (e.g., DR1, X-axis direction). The first PAM data lines RDL may be electrically connected to each other, the second PAM data lines GDL may be electrically connected to each other, and the third PAM data lines BDL may be electrically connected to each other.

The subpixels RP, GP and BP may include first subpixels RP to emit first light, second subpixels GP to emit second light, and third subpixels BP to emit third light. The first light refers to light in a red wavelength band, the second light refers to light in a green wavelength band, and the third light refers to light in a blue wavelength band. For example, a main peak wavelength of the first light may be located in the range of about 600 nm to 750 nm, a main peak wavelength of the second light may be located in the range of about 480 nm to 560 nm, and a main peak wavelength of the third light may be located in the range of about 370 nm to 460 nm.

Each of the subpixels RP, GP and BP may be connected to a corresponding one of the scan write lines GWL, a corresponding one of the scan initialization lines GIL, a corresponding one of the scan control lines GCL, a corresponding one of the sweep signal lines SWPL, a corresponding one of the PWM emission lines PWEL, and a corresponding one of the PAM emission lines PAEL. In addition, each of the first subpixels RP may be connected to a corresponding one of the PWM data lines DL and a corresponding one of the first PAM data lines RDL. In addition, each of the second subpixels GP may be connected to a corresponding one of the PWM data lines DL and a corresponding one of the second PAM data lines GDL. In addition, each of the third subpixels BP may be connected to a corresponding one of the PWM data lines DL and a corresponding one of the third PAM data lines BDL.

In a non-display area NDA of the display panel 100, the scan driver 110 for transmitting signals to the scan write lines GWL, the scan initialization lines GIL, the scan control lines GCL, the sweep signal lines SWPL, the PWM emission lines PWEL, and the PAM emission lines PAEL may be located. Although the scan driver 110 is located near one edge of the display panel 100 in FIG. 1, embodiments of the present specification are not limited thereto. The scan driver 110 may also be located near both edges of the display panel 100.

The scan driver 110 may include a first scan signal driver 111, a second scan signal driver 112, a sweep signal driver 113, and an emission signal driver 114.

The first scan signal driver 111 may receive a first scan driving control signal GDCS1 from the timing controller 300. The first scan signal driver 111 may output scan initialization signals to the scan initialization lines GIL and output scan write signals to the scan write lines GWL according to the first scan driving control signal GDCS1. That is, the first scan signal driver 111 may output two scan signals, that is, the scan initialization signals and the scan write signals together.

The second scan signal driver 112 may receive a second scan driving control signal GDCS2 from the timing controller 300. The second scan signal driver 112 may output scan control signals to the scan control lines GCL according to the second scan driving control signal GDCS2.

The sweep signal driver 113 may receive a first emission control signal ECS1 and a sweep control signal SWCS from the timing controller 300. The sweep signal driver 113 may output PWM emission signals to the PWM emission lines PWEL and output sweep signals to the sweep signal lines SWPL according to the first emission control signal ECS1. That is, the sweep signal driver 113 may output the PWM emission signals and the sweep signals together.

The emission signal driver 114 may receive a second emission control signal ECS2 from the timing controller 300. The emission signal driver 114 may output PAM emission signals to the PAM emission lines PAEL according to the second emission control signal ECS2.

The timing controller 300 receives digital video data DATA and timing signals TS. The timing controller 300 may generate the first scan driving control signal GDCS1, the second scan driving control signal GDCS2, the first emission control signal ECS1, the second emission control signal ECS2, and the sweep control signal SWCS for controlling the operation timing of the scan driver 110 according to the timing signals TS. In addition, the timing controller 300 may generate a data control signal DCS for controlling the operation timing of the source driver 200.

The timing controller 300 outputs the first scan driving control signal GDCS1, the second scan driving control signal GDCS2, the first emission control signal ECS1, the second emission control signal ECS2, and the sweep control signal SWCS to the scan driver 110. The timing controller 300 outputs the digital video data DATA and the data control signal DCS to the source driver 200.

The source driver 200 converts the digital video data DATA into analog PWM data voltages and outputs the analog PWM data voltages to the PWM data lines DL.

Therefore, the subpixels RP, GP and BP may be selected by the scan write signals of the scan driver 110, and the PWM data voltages may be supplied to the selected subpixels RP, GP and BP.

The power supply unit 400 may output a first PWM data voltage commonly to the first PAM data lines RDL, output a second PWM data voltage commonly to the second PAM data lines GDL, and output a third PWM data voltage commonly to the third PAM data lines BDL. In addition, the power supply unit 400 may generate a plurality of power supply voltages and output the power supply voltages to the display panel 100.

The power supply unit 400 may output a first power supply voltage VDD1, a second power supply voltage VDD2, a third power supply voltage VSS, an initialization voltage VINT, a gate-on voltage VGL, and a gate-off voltage VGH to the display panel 100. The first power supply voltage VDD1 and the second power supply voltage VDD2 may be high-potential driving voltages for driving a light emitting element of each of the subpixels RP, GP and BP. The third power supply voltage VSS may be a low-potential driving voltage for driving the light emitting element of each of the subpixels RP, GP and BP. The initialization voltage VINT and the gate-off voltage VGH may be applied to each of the subpixels RP, GP and BP, and the gate-on voltage VGL and the gate-off voltage VGH may be applied to the scan driver 110.

Figure 2:
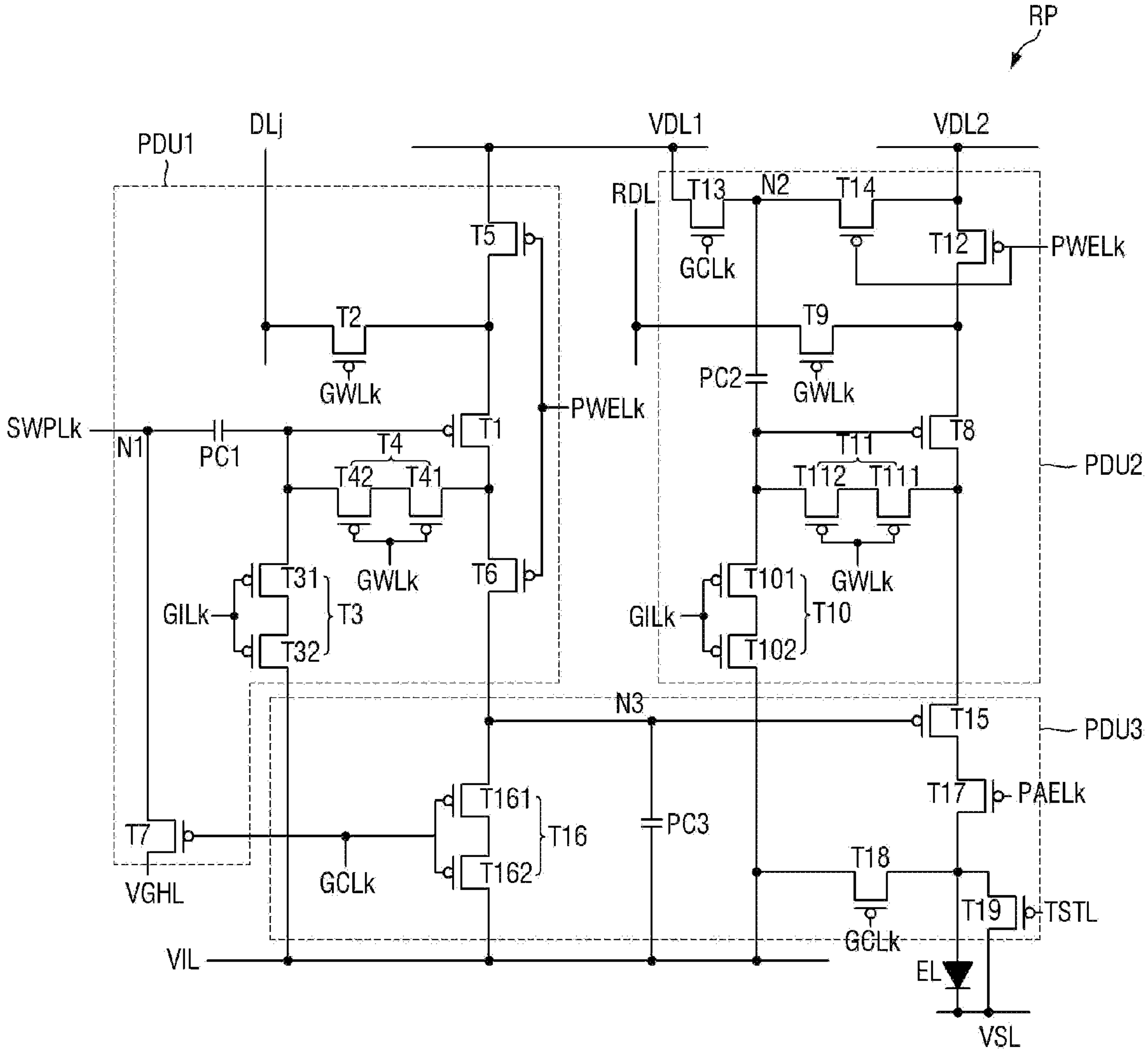
FIG. 2 is a circuit diagram of a first subpixel according to one or more embodiments.

FIG. 2 is a circuit diagram of a first subpixel RP according to one or more embodiments.

Referring to FIG. 2, the first subpixel RP according to the embodiment may be connected to a $k^{th}$ scan write line GWLk, a $k^{th}$ scan initialization line GILk, a $k^{th}$ scan control line GCLk, a $k^{th}$ sweep signal line SWPLk, a $k^{th}$ PWM emission line PWELk, and a $k^{th}$ PAM emission line PAELk. In addition, the first subpixel RP may be connected to a $j^{th}$ PWM data line DLj and a first PAM data line RDL. In addition, the first subpixel RP may be connected to a first power line VDL1 to which the first power supply voltage VDD1 is applied, a second power line VDL2 to which the second power supply voltage VDD2 is applied, a third power line VSL to which the third power supply voltage VSS is applied, an initialization voltage line VIL to which the initialization voltage VINT is applied, and a gate-off voltage line VGHL to which the gate-off voltage VGH is applied. Here, the first power line VDL1 is configured to receive the first power supply voltage VDD1, the second power line VDL2 is configured to receive the second power supply voltage VDD2, the third power line VSL is configured to receive the third power voltage VSS, and the gate-off voltage line VGHL is configured to receive the gate-off voltage VGH. For ease of description, the $j^{th}$ PWM data line DLj may be referred to as a first data line, and the first PAM data line RDL may be referred to as a second data line.

The first subpixel RP may include a light emitting element EL, a first pixel driver PDU1, a second pixel driver PDU2, and a third pixel driver PDU3.

Figure 13:
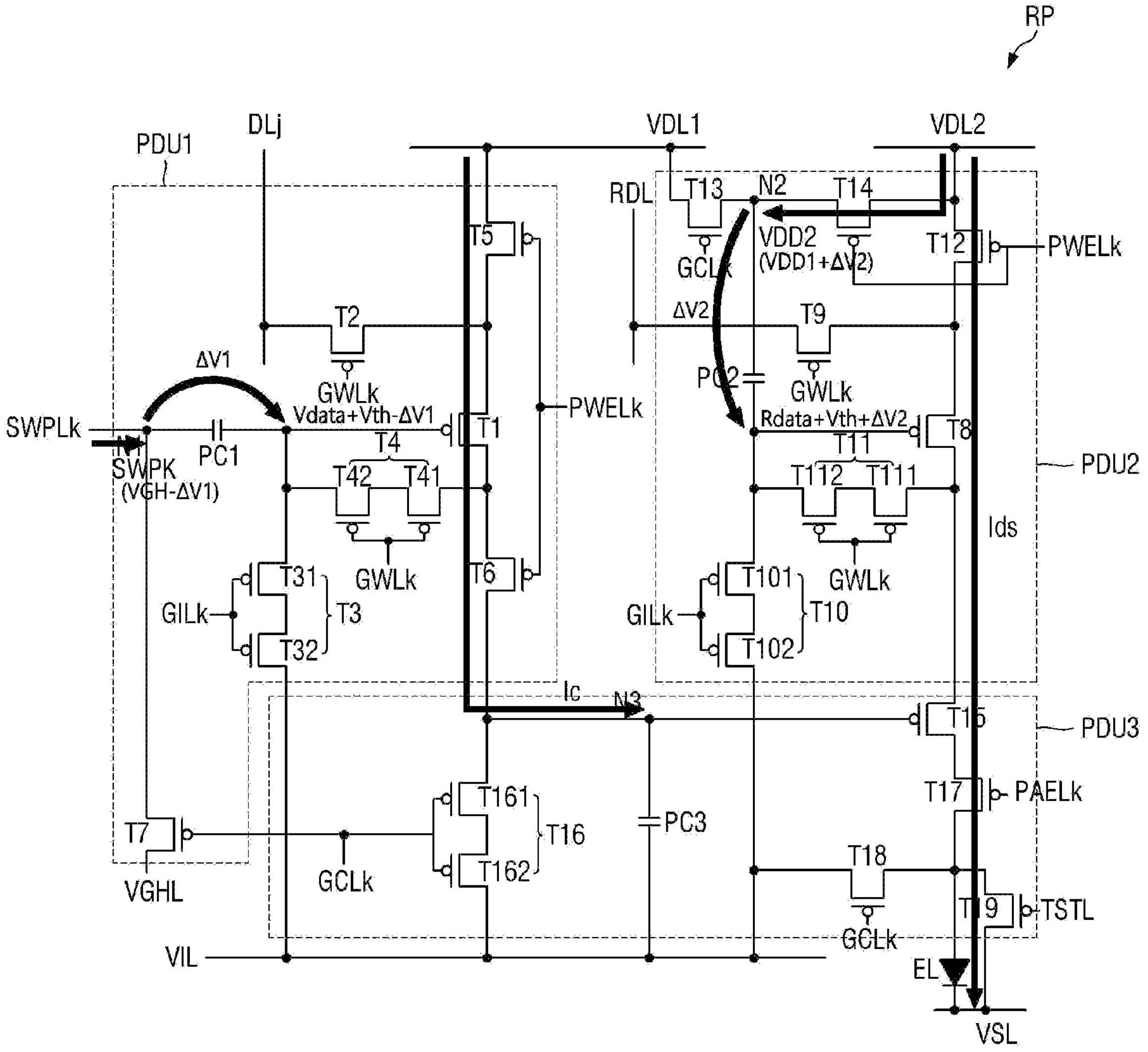

The light emitting element EL emits light according to a driving current Ids generated by the second pixel driver PDU2 (e.g., see FIG. 13). The light emitting element EL may be disposed between a seventeenth transistor T17 and the third power line VSL. The light emitting element EL may have a first electrode connected to a second electrode of the seventeenth transistor T17 and a second electrode connected to the third power line VSL. The first electrode of the light emitting element EL may be an anode, and the second electrode may be a cathode. The light emitting element EL may be an inorganic light emitting element including a first electrode, a second electrode, and an inorganic semiconductor disposed between the first electrode and the second electrode. For example, the light emitting element EL may be, but is not limited to, a micro-light emitting diode made of an inorganic semiconductor.

The first pixel driver PDU1 controls a voltage of a third node N3 of the third pixel driver PDU3 by generating a control current Ic according to a $j^{th}$ PWM data voltage of the $j^{th}$ PWM data line DLj (e.g., see FIG. 13). Because a pulse width of the driving current Ids flowing through the light emitting element EL can be adjusted by the control current Ic of the first pixel driver PDU1, the first pixel driver PDU1 may be a PWM unit that performs pulse width modulation of the driving current Ids flowing through the light emitting element EL.

The first pixel driver PDU1 may include first through seventh transistors T1 through T7 and a first capacitor PC1.

The first transistor T1 controls the control current Ic flowing between a second electrode and a first electrode according to a PWM data voltage applied to a gate electrode.

The second transistor T2 is turned on by a $k^{th}$ scan write signal of the $k^{th}$ scan write line GWLk to supply the PWM data voltage of the $j^{th}$ PWM data line DLj to the first electrode of the first transistor T1. The second transistor T2 may have a gate electrode connected to the $k^{th}$ scan write line GWLk, a first electrode connected to the $j^{th}$ PWM data line DLj, and a second electrode connected to the first electrode of the first transistor T1.

The third transistor T3 is turned on by a $k^{th}$ scan initialization signal of the $k^{th}$ scan initialization line GILk to connect the initialization voltage line VIL to the gate electrode of the first transistor T1. Therefore, during a period in which the third transistor T3 is turned on, the gate electrode of the first transistor T1 may be discharged to the initialization voltage VINT of the initialization voltage line VIL. Here, the gate-on voltage VGL of the $k^{th}$ scan initialization signal may be different from the initialization voltage VINT of the initialization voltage line VIL. In particular, because a difference voltage between the gate-on voltage VGL and the initialization voltage VINT is greater than a threshold voltage of the third transistor T3, the third transistor T3 may be stably turned on even after the initialization voltage VINT is applied to the gate electrode of the first transistor T1. Therefore, when the third transistor T3 is turned on, the initialization voltage VINT may be stably applied to the gate electrode of the first transistor T1 regardless of the threshold voltage of the third transistor T3.

The third transistor T3 may include a plurality of transistors connected in series. For example, the third transistor T3 may include a first sub-transistor T31 and a second sub-transistor T32. Therefore, it may be possible to prevent a voltage of the gate electrode of the first transistor T1 from leaking through the third transistor T3. The first sub-transistor T31 may have a gate electrode connected to the $k^{th}$ scan initialization line GILk, a first electrode connected to the gate electrode of the first transistor T1, and a second electrode connected to a first electrode of the second sub-transistor T32. The second sub-transistor T32 may have a gate electrode connected to the $k^{th}$ scan initialization line GILk, the first electrode connected to the second electrode of the first sub-transistor T31, and a second electrode connected to the initialization voltage line VIL.

The fourth transistor T4 is turned on by the $k^{th}$ scan write signal of the $k^{th}$ scan write line GWLk to connect the gate electrode and the second electrode of the first transistor T1. Therefore, during a period in which the fourth transistor T4 is turned on, the first transistor T1 may operate as a diode (e.g., may be diode-connected).

The fourth transistor T4 may include a plurality of transistors connected in series. For example, the fourth transistor T4 may include a third sub-transistor T41 and a fourth sub-transistor T42. Therefore, it may be possible to prevent the voltage of the gate electrode of the first transistor T1 from leaking through the fourth transistor T4. The third sub-transistor T41 may have a gate electrode connected to the $k^{th}$ scan write line GWLk, a first electrode connected to the second electrode of the first transistor T1, and a second electrode connected to a first electrode of the fourth sub-transistor T42. The fourth sub-transistor T42 may have a gate electrode connected to the $k^{th}$ scan write line GWLk, the first electrode connected to the second electrode of the third sub-transistor T41, and a second electrode connected to the gate electrode of the first transistor T1.

The fifth transistor T5 is turned on by a $k^{th}$ PWM emission signal of the $k^{th}$ PWM emission line PWELk to connect the first electrode of the first transistor T1 to the first power line VDL1. The fifth transistor T5 may have a gate electrode connected to the $k^{th}$ PWM emission line PWELk, a first electrode connected to the first power line VDL1, and a second electrode connected to the first electrode of the first transistor T1.

The sixth transistor T6 is turned on by the $k^{th}$ PWM emission signal of the $k^{th}$ PWM emission line PWELk to connect the second electrode of the first transistor T1 to the third node N3 of the third pixel driver PDU3. The sixth transistor T6 may have a gate electrode connected to the $k^{th}$ PWM emission line PWELk, a first electrode connected to the second electrode of the first transistor T1, and a second electrode connected to the third node N3 of the third pixel driver PDU3.

The seventh transistor T7 is turned on by a $k^{th}$ scan control signal of the $k^{th}$ scan control line GCLk to supply the gate-off voltage VGH of the gate-off voltage line VGHL to a first node N1 connected to the $k^{th}$ sweep signal line SWPLk. Therefore, it may be possible to prevent a voltage change of the gate electrode of the first transistor T1 from being reflected in a $k^{th}$ sweep signal of the $k^{th}$ sweep signal line SWPLk by the first capacitor PC1 during a period in which the initialization voltage VINT is applied to the gate electrode of the first transistor T1 and a period in which the PWM data voltage of the $j^{th}$ PWM data line DLj and a threshold voltage Vth1 of the first transistor T1 are programmed. The seventh transistor T7 may have a gate electrode connected to the $k^{th}$ scan control line GCLk, a first electrode connected to the gate-off voltage line VGHL, and a second electrode connected to the first node N1.

The first capacitor PC1 may be disposed between the gate electrode of the first transistor T1 and the first node N1. The first capacitor PC1 may have one electrode connected to the gate electrode of the first transistor T1 and the other electrode connected to the first node N1.

The first node N1 may be a contact point of the $k^{th}$ sweep signal line SWPLk, the second electrode of the seventh transistor T7, and the other electrode of the first capacitor PC1.

The second pixel driver PDU2 generates the driving current Ids applied to the light emitting element EL according to the first PWM data voltage of the first PAM data line RDL. The second pixel driver PDU2 may be a PAM unit that performs pulse amplitude modulation. The second pixel driver PDU2 may be a constant current generator that generates a constant driving current Ids according to the first PWM data voltage.

In addition, the second pixel driver PDU2 of each first subpixel RP may receive the same first PWM data voltage regardless of the luminance of the first subpixel RP and generate the same driving current Ids. Likewise, the second pixel driver PDU2 of each second subpixel GP may receive the same second PWM data voltage regardless of the luminance of the second subpixel GP and generate the same driving current Ids. The second pixel driver PDU2 of each third subpixel BP may receive the same third PWM data voltage regardless of the luminance of the third subpixel BP and generate the same driving current Ids.

The second pixel driver PDU2 may include eighth through fourteenth transistors T8 through T14 and a second capacitor PC2.

The eighth transistor T8 controls the driving current Ids flowing to the light emitting element EL according to a voltage applied to a gate electrode.

The ninth transistor T9 is turned on by the $k^{th}$ scan write signal of the $k^{th}$ scan write line GWLk to supply the first PWM data voltage of the first PAM data line RDL to a first electrode of the eighth transistor T8. The ninth transistor T9 may have a gate electrode connected to the $k^{th}$ scan write line GWLk, a first electrode connected to the first PAM data line RDL, and a second electrode connected to the first electrode of the eighth transistor T8.

The tenth transistor T10 is turned on by the $k^{th}$ scan initialization signal of the $k^{th}$ scan initialization line GILk to connect the initialization voltage line VIL to the gate electrode of the eighth transistor T8. Therefore, during a period in which the tenth transistor T10 is turned on, the gate electrode of the eighth transistor T8 may be discharged to the initialization voltage VINT of the initialization voltage line VIL. Here, the gate-on voltage VGL of the k$^{th}$ scan initialization signal may be different from the initialization voltage VINT of the initialization voltage line VIL. For example, because the difference voltage between the gate-on voltage VGL and the initialization voltage VINT is greater than a threshold voltage of the tenth transistor T10, the tenth transistor T10 may be stably turned on even after the initialization voltage VINT is applied to the gate electrode of the eighth transistor T8. Therefore, when the tenth transistor T10 is turned on, the initialization voltage VINT may be stably applied to the gate electrode of the eighth transistor T8 regardless of the threshold voltage of the tenth transistor T10.

The tenth transistor T10 may include a plurality of transistors connected in series. For example, the tenth transistor T10 may include a fifth sub-transistor T101 and a sixth sub-transistor T102. Therefore, it may be possible to prevent a voltage of the gate electrode of the eighth transistor T8 from leaking through the tenth transistor T10. The fifth sub-transistor T101 may have a gate electrode connected to the k$^{th}$ scan initialization line GILk, a first electrode connected to the gate electrode of the eighth transistor T8, and a second electrode connected to a first electrode of the sixth sub-transistor T102. The sixth sub-transistor T102 may have a gate electrode connected to the k$^{th}$ scan initialization line GILk, the first electrode connected to the second electrode of the fifth sub-transistor T101, and a second electrode connected to the initialization voltage line VIL.

The eleventh transistor T11 is turned on by the k$^{th}$ scan write signal of the k$^{th}$ scan write line GWLk to connect the gate electrode and a second electrode of the eighth transistor T8. Therefore, during a period in which the eleventh transistor T11 is turned on, the eighth transistor T8 may operate as a diode (e.g., may be diode-connected).

The eleventh transistor T11 may include a plurality of transistors connected in series. For example, the eleventh transistor T11 may include a seventh sub-transistor T111 and an eighth sub-transistor T112. Therefore, it may be possible to prevent the voltage of the gate electrode of the eighth transistor T8 from leaking through the eleventh transistor T11. The seventh sub-transistor T111 may have a gate electrode connected to the k$^{th}$ scan write line GWLk, a first electrode connected to the second electrode of the eighth transistor T8, and a second electrode connected to a first electrode of the eighth sub-transistor T112. The eighth sub-transistor T112 may have a gate electrode connected to the k$^{th}$ scan write line GWLk, the first electrode connected to the second electrode of the seventh sub-transistor T111, and a second electrode connected to the gate electrode of the eighth transistor T8.

The twelfth transistor T12 is turned on by the k$^{th}$ PWM emission signal of the k$^{th}$ PWM emission line PWELk to connect the first electrode of the eighth transistor T8 to the second power line VDL2. The twelfth transistor T12 may have a gate electrode connected to the k$^{th}$ PWM emission line PWELk, a first electrode connected to the first power line VDL1, and a second electrode connected to the first electrode of the eighth transistor T8.

The thirteenth transistor T13 is turned on by the k$^{th}$ scan control signal of the k$^{th}$ scan control line GCLk to connect the first power line VDL1 to a second node N2.

The thirteenth transistor T13 may have a gate electrode connected to the k$^{th}$ scan control line GCLk, a first electrode connected to the first power line VDL1, and a second electrode connected to the second node N2.

The fourteenth transistor T14 is turned on by the k$^{th}$ PWM emission signal of the k$^{th}$ PWM emission line PWELk to connect the second power line VDL2 to the second node N2. Therefore, when the fourteenth transistor T14 is turned on, the second power supply voltage VDD2 of the second power line VDL2 may be supplied to the second node N2. The fourteenth transistor T14 may have a gate electrode connected to the k$^{th}$ PWM emission line PWELk, a first electrode connected to the second power line VDL2, and a second electrode connected to the second node N2.

The second capacitor PC2 may be disposed between the gate electrode of the eighth transistor T8 and the second node N2. The second capacitor PC2 may have one electrode connected to the gate electrode of the eighth transistor T8 and the other electrode connected to the second node N2.

The second node N2 may be a contact point of the second electrode of the thirteenth transistor T13, the second electrode of the fourteenth transistor T14, and the other electrode of the second capacitor PC2.

The third pixel driver PDU3 adjusts a period during which the driving current Ids is applied to the light emitting element EL according to a voltage of the third node N3.

The third pixel driver PDU3 may include fifteenth through nineteenth transistors T15 through T19 and a third capacitor PC3.

The fifteenth transistor T15 is turned on or turned off according to the voltage of the third node N3. When the fifteenth transistor T15 is turned on, the driving current Ids of the eighth transistor T8 may be supplied to the light emitting element EL. When the fifteenth transistor T15 is turned off, the driving current Ids of the eighth transistor T8 may not be supplied to the light emitting element EL. Therefore, a turn-on period of the fifteenth transistor T15 may be substantially the same as an emission period of the light emitting element EL. The fifteenth transistor T15 may have a gate electrode connected to the third node N3, a first electrode connected to the second electrode of the eighth transistor T8, and a second electrode connected to a first electrode of the seventeenth transistor T17.

The sixteenth transistor T16 is turned on by the k$^{th}$ scan control signal of the k$^{th}$ scan control line GCLk to connect the initialization voltage line VIL to the third node N3. Therefore, during a period in which the sixteenth transistor T16 is turned on, the third node N3 may be discharged to the initialization voltage VINT of the initialization voltage line VIL.

The sixteenth transistor T16 may include a plurality of transistors connected in series. For example, the sixteenth transistor T16 may include a ninth sub-transistor T161 and a tenth sub-transistor T162. Therefore, it may be possible to prevent the voltage of the third node N3 from leaking through the sixteenth transistor T16. The ninth sub-transistor T161 may have a gate electrode connected to the k$^{th}$ scan control line GCLk, a first electrode connected to the third node N3, and a second electrode connected to a first electrode of the tenth sub-transistor T162. The tenth sub-transistor T162 may have a gate electrode connected to the k$^{th}$ scan control line GCLk, the first electrode connected to the second electrode of the ninth sub-transistor T161, and a second electrode connected to the initialization voltage line VIL.

The seventeenth transistor T17 is turned on by a k$^{th}$ PAM emission signal of the k$^{th}$ PAM emission line PAELk to connect the second electrode of the fifteenth transistor T15 to the first electrode of the light emitting element EL. The seventeenth transistor T17 may have a gate electrode connected to the k$^{th}$ PAM emission line PAELk, the first electrode connected to the second electrode of the fifteenth transistor T15, and the second electrode connected to the first electrode of the light emitting element EL.

The eighteenth transistor T18 is turned on by the $k^{th}$ scan control signal of the $k^{th}$ scan control line GCLk to connect the initialization voltage line VIL to the first electrode of the light emitting element EL. Therefore, during a period in which the eighteenth transistor T18 is turned on, the first electrode of the light emitting element EL may be discharged to the initialization voltage VINT of the initialization voltage line VIL. The eighteenth transistor T18 may have a gate electrode connected to the $k^{th}$ scan control line GCLk, a first electrode connected to the first electrode of the light emitting element EL, and a second electrode connected to the initialization voltage line VIL.

The nineteenth transistor T19 is turned on by a test signal of a test signal line TSTL to connect the first electrode of the light emitting element EL to the third power line VSL. The nineteenth transistor T19 may have a gate electrode connected to the test signal line TSTL, a first electrode connected to the first electrode of the light emitting element EL, and a second electrode connected to the third power line VSL.

The third capacitor PC3 may be disposed between the third node N3 and the initialization voltage line VIL. The third capacitor PC3 may have one electrode connected to the third node N3 and the other electrode connected to the initialization voltage line VIL.

The third node N3 may be a contact point of the second electrode of the sixth transistor T6, the gate electrode of the fifteenth transistor T15, the first electrode of the ninth sub-transistor T161, and the one electrode of the third capacitor PC3.

Any suitable one of the first electrode and the second electrode of each of the first through nineteenth transistors T1 through T19 may be a source electrode, and the other may be a drain electrode. An active layer of each of the first through nineteenth transistors T1 through T19 may be made of polysilicon, amorphous silicon, or an oxide semiconductor. When the active layer of each of the first through nineteenth transistors T1 through T19 is polysilicon, it may be formed by a low-temperature polysilicon (LTPS) process.

In addition, although a case where each of the first through nineteenth transistors T1 through T19 is formed as a P-type metal oxide semiconductor field effect transistor (MOSFET) has been mainly shown in FIG. 2, embodiments of the present specification are not limited thereto. For example, each of the first through nineteenth transistors T1 through T19 may also be formed as an N-type MOSFET.

Alternatively, in order to increase the black expression ability of the light emitting element EL by blocking a leakage current, the first sub-transistor T31 and the second sub-transistor T32 of the third transistor T3, the third sub-transistor T41 and the fourth sub-transistor T42 of the fourth transistor T4, the fifth sub-transistor T101 and the sixth sub-transistor T102 of the tenth transistor T10, and the seventh sub-transistor T111 and the eighth sub-transistor T112 of the eleventh transistor T11 in the first subpixel RP may be formed as N-type MOSFETs. In this case, the gate electrode of the third sub-transistor T41 and the gate electrode of the fourth sub-transistor T42 of the fourth transistor T4 and the gate electrode of the seventh sub-transistor T111 and the gate electrode of the eighth sub-transistor T112 of the eleventh transistor T11 may be connected to the $k^{th}$ scan write line GWLk. The $k^{th}$ scan initialization signal GILk and the $k^{th}$ scan write signal may have pulses generated as the gate-off voltage VGH. In one or more other embodiments, the active layers of the first sub-transistor T31 and the second sub-transistor T32 of the third transistor T3, the third sub-transistor T41 and the fourth sub-transistor T42 of the fourth transistor T4, the fifth sub-transistor T101 and the sixth sub-transistor T102 of the tenth transistor T10, and the seventh sub-transistor T111 and the eighth sub-transistor T112 of the eleventh transistor T11 may be made of an oxide semiconductor, and the active layers of the other transistors may be made of polysilicon.

Alternatively, any one of the first sub-transistor T31 and the second sub-transistor T32 of the third transistor T3 may be formed as an N-type MOSFET, and the other may be formed as a P-type MOSFET. In this case, a transistor formed as an N-type MOSFET from among the first sub-transistor T31 and the second sub-transistor T32 of the third transistor T3 may be made of an oxide semiconductor, and a transistor formed as a P-type MOSFET may be made of polysilicon.

Alternatively, any one of the third sub-transistor T41 and the fourth sub-transistor T42 of the fourth transistor T4 may be formed as an N-type MOSFET, and the other may be formed as a P-type MOSFET. In this case, a transistor formed as an N-type MOSFET from among the third sub-transistor T41 and the fourth sub-transistor T42 of the fourth transistor T4 may be made of an oxide semiconductor, and a transistor formed as a P-type MOSFET may be made of polysilicon.

Alternatively, any one of the fifth sub-transistor T101 and the sixth sub-transistor T102 of the tenth transistor T10 may be formed as an N-type MOSFET, and the other may be formed as a P-type MOSFET. In this case, a transistor formed as an N-type MOSFET from among the fifth sub-transistor T101 and the sixth sub-transistor T102 of the tenth transistor T10 may be made of an oxide semiconductor, and a transistor formed as a P-type MOSFET may be made of polysilicon.

Alternatively, any one of the seventh sub-transistor T111 and the eighth sub-transistor T112 of the eleventh transistor T11 may be formed as an N-type MOSFET, and the other may be formed as a P-type MOSFET. In this case, a transistor formed as an N-type MOSFET from among the seventh sub-transistor T111 and the eighth sub-transistor T112 of the eleventh transistor T11 may be made of an oxide semiconductor, and a transistor formed as a P-type MOSFET may be made of polysilicon.

A second subpixel GP and a third subpixel BP according to one or more embodiments may be substantially the same as the first subpixel RP described above with reference to FIG. 2. Therefore, a description of the second subpixel GP and the third subpixel BP according to the one or more embodiments may be omitted.

Figure 3:
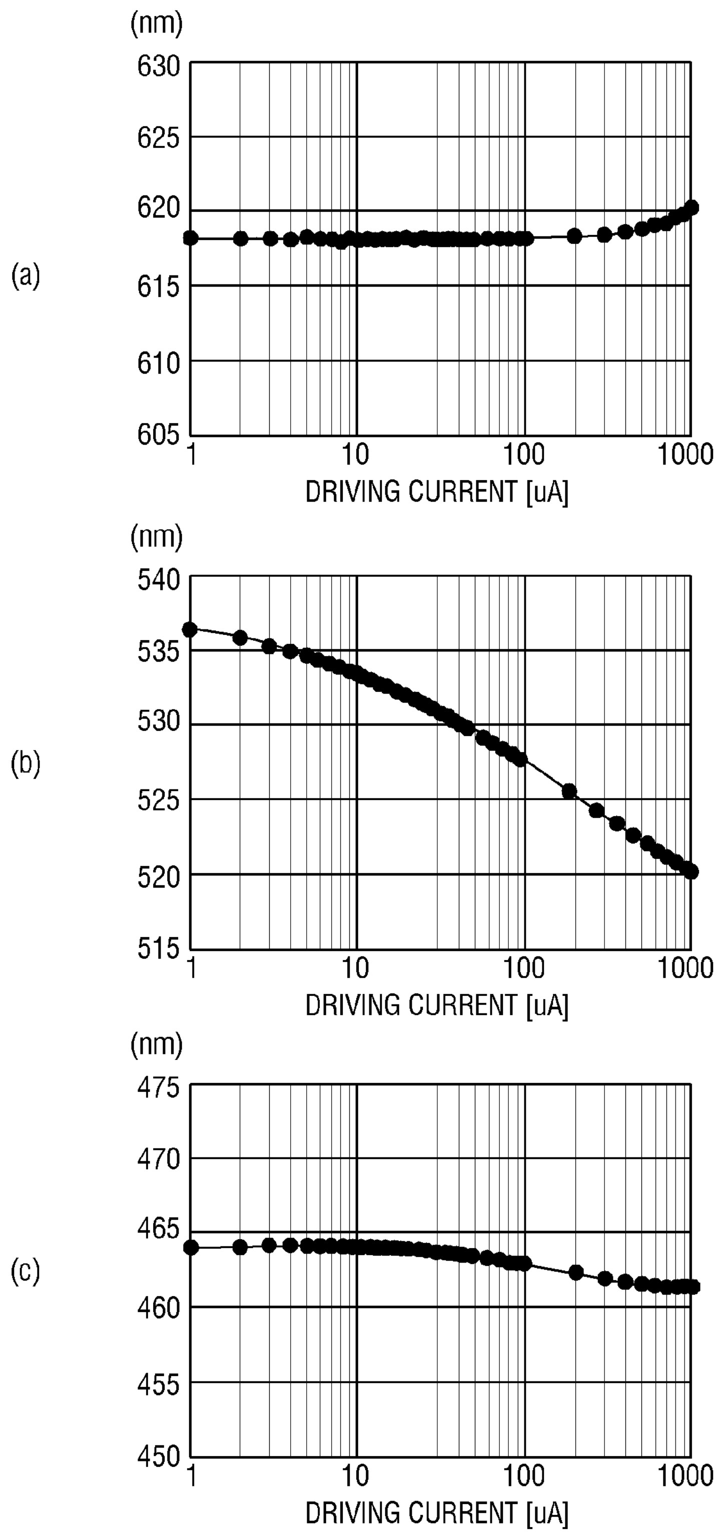
FIG. 3 shows graphs (a), (b) and (c) illustrating the wavelength of light emitted from a light emitting element of a first subpixel, the wavelength of light emitted from a light emitting element of a second subpixel, and the wavelength of light emitted from a light emitting element of a third subpixel according to a driving current according to one or more embodiments.

FIG. 3 shows graphs (a), (b) and (c) illustrating the wavelength of light emitted from the light emitting element EL of a first subpixel RP, the wavelength of light emitted from the light emitting element EL of a second subpixel GP, and the wavelength of light emitted from the light emitting element EL of a third subpixel BP according to the driving current Ids according to one or more embodiments.

FIG. 3(*a*) illustrates the wavelength of light emitted from the light emitting element EL of the first subpixel RP according to the driving current Ids applied to the light emitting element EL of the first subpixel RP when the light emitting element EL of the first subpixel RP includes an inorganic material, for example, gallium nitride (GaN). FIG. 3(*b*) illustrates the wavelength of light emitted from the light emitting element EL of the second subpixel GP according to the driving current Ids applied to the light emitting element EL of the second subpixel GP when the light emitting element EL of the second subpixel GP includes an inorganic material, for example, gallium nitride (GaN). FIG. 3(*c*) illustrates the wavelength of light emitted from the light emitting element EL of the third subpixel BP according to the driving current Ids applied to the light emitting element EL of the third subpixel BP when the light emitting element EL of the third subpixel BP includes an inorganic material, for example, gallium nitride (GaN). In each of the graphs of FIGS. 3(*a*), 3(*b*) and 3(*c*), the X axis represents the driving current Ids, and the Y axis represents the wavelength of light emitted from the light emitting element EL.

Referring to FIG. 3, when the driving current Ids applied to the light emitting element EL of the first subpixel RP is 1 μA to 300 μA, the wavelength of light emitted from the light emitting element EL of the first subpixel RP is constant at about 618 nm.

As the driving current Ids applied to the light emitting element EL of the first subpixel RP increases from 300 μA to 1000 μA, the wavelength of light emitted from the light emitting element EL of the first subpixel RP increases from about 618 nm to about 620 nm.

As the driving current Ids applied to the light emitting element EL of the second subpixel GP increases from 1 μA to 1000 μA, the wavelength of light emitted from the light emitting element EL of the second subpixel GP decreases from about 536 nm to about 520 nm.

As the driving current Ids applied to the light emitting element EL of the third subpixel BP increases from 1 μA to 1000 μA, the wavelength of light emitted from the light emitting element EL of the third subpixel BP decreases from about 464 nm to about 461 nm.

In summary, the wavelength of light emitted from the light emitting element EL of the first subpixel RP and the wavelength of light emitted from the light emitting element EL of the third subpixel BP may hardly change (e.g., may change by a relatively small amount) even when the driving current Ids changes. In contrast, the wavelength of light emitted from the light emitting element EL of the second subpixel GP may be inversely proportional to the driving current Ids. Therefore, when the driving current Ids applied to the light emitting element EL of the second subpixel GP is adjusted, the wavelength of light emitted from the light emitting element EL of the second subpixel GP may be changed, and color coordinates of an image displayed by the display panel 100 may be changed.

Figure 4:
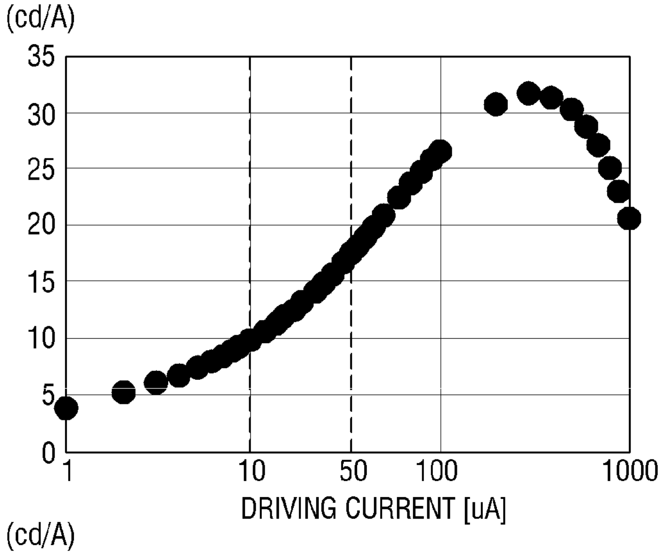
FIG. 4 shows graphs (a), (b) and (c) illustrating the luminous efficiency of the light emitting element of a first subpixel, the luminous efficiency of the light emitting element of a second subpixel, and the luminous efficiency of the light emitting element of a third subpixel according to the driving current according to one or more embodiments.
Figure 4:
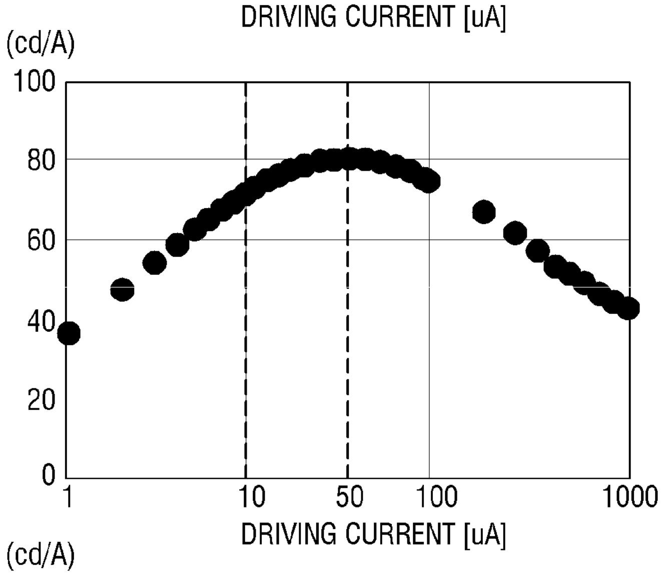
Figure 4:
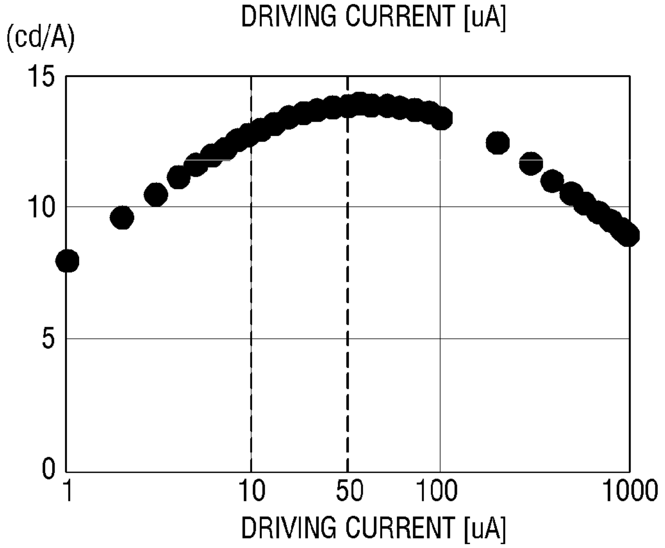

FIG. 4 shows graphs (a), (b), and (c) illustrating the luminous efficiency of the light emitting element EL of a first subpixel RP, the luminous efficiency of the light emitting element EL of a second subpixel GP, and the luminous efficiency of the light emitting element EL of a third subpixel BP according to the driving current Ids according to one or more embodiments.

FIG. 4(*a*) illustrates the luminous efficiency of the light emitting element EL of the first subpixel RP according to the driving current Ids applied to the light emitting element EL of the first subpixel RP when the light emitting element EL of the first subpixel RP is made of an inorganic material. FIG. 4(*b*) illustrates the luminous efficiency of the light emitting element EL of the second subpixel GP according to the driving current Ids applied to the light emitting element EL of the second subpixel GP when the light emitting element EL of the second subpixel GP is made of an inorganic material. FIG. 4(*c*) illustrates the luminous efficiency of the light emitting element EL of the third subpixel BP according to the driving current Ids applied to the light emitting element EL of the third subpixel BP when the light emitting element EL of the third subpixel BP is made of an inorganic material.

Referring to FIG. 4, when the driving current Ids applied to the light emitting element EL of the first subpixel RP is 10 μA, the luminous efficiency of the light emitting element EL of the first subpixel RP is about 8.5 cd/A. When the driving current Ids applied to the light emitting element EL of the first subpixel RP is 50 μA, the luminous efficiency of the light emitting element EL of the first subpixel RP is about 18 cd/A. That is, when the driving current Ids applied to the light emitting element EL of the first subpixel RP is 50 μA, the luminous efficiency increases by about 2.1 times compared with when the driving current Ids is 10 μA.

When the driving current Ids applied to the light emitting element EL of the second subpixel GP is 10 μA, the luminous efficiency of the light emitting element EL of the second subpixel GP is about 72 cd/A. When the driving current Ids applied to the light emitting element EL of the second subpixel GP is 50 μA, the luminous efficiency of the light emitting element EL of the second subpixel GP is about 80 cd/A. That is, when the driving current Ids applied to the light emitting element EL of the second subpixel GP is 50 μA, the luminous efficiency increases by about 1.1 times compared with when the driving current Ids is 10 μA.

When the driving current Ids applied to the light emitting element EL of the third subpixel BP is 10 μA, the luminous efficiency of the light emitting element EL of the third subpixel BP is about 13.2 cd/A. When the driving current Ids applied to the light emitting element EL of the third subpixel BP is 50 μA, the luminous efficiency of the light emitting element EL of the third subpixel BP is about 14 cd/A. That is, when the driving current Ids applied to the light emitting element EL of the third subpixel BP is 50 μA, the luminous efficiency increases by about 1.06 times compared with when the driving current Ids is 10 μA.

In summary, the luminous efficiency of the light emitting element EL of the first subpixel RP, the luminous efficiency of the light emitting element EL of the second subpixel GP, and the luminous efficiency of the light emitting element EL of the third subpixel BP may vary according to the driving current Ids.

As illustrated in FIGS. 3 and 4, when the driving current Ids applied to the light emitting element EL of the second subpixel GP is adjusted, color coordinates of an image displayed by the display panel 100 may be changed. In addition, the luminous efficiency of the light emitting element EL of the first subpixel RP, the luminous efficiency of the light emitting element EL of the second subpixel GP, and the luminous efficiency of the light emitting element EL of the third subpixel BP may vary according to the driving current Ids. Therefore, it may be desirable to maintain a constant driving current Ids in each of the first subpixel RP, the second subpixel GP and the third subpixel BP and adjust the luminance of each of the first subpixel RP, the second subpixel GP and the third subpixel BP by adjusting a period during which the driving current Ids is applied, so that color coordinates of an image displayed by the display panel 100 can be maintained constant or substantially constant and that the light emitting element EL of the first subpixel RP, the light emitting element EL of the second subpixel GP, and the light emitting element EL of the third subpixel BP can have desired (e.g., optimal) luminous efficiency.

That is, as illustrated in FIG. 2, the second pixel driver PDU2 of the first subpixel RP generates the driving current Ids according to the first PWM data voltage of the first PAM data line RDL so that the light emitting element EL of the first subpixel RP is driven with desired (e.g., optimized) luminous efficiency. The first pixel driver PDU1 of the first subpixel RP controls the voltage of the third node N3 of the third pixel driver PDU3 by generating the control current Ic according to the PWM data voltage of the PWM data line, and the third pixel driver PDU3 adjusts the period during which the driving current Ids is applied to the light emitting element EL according to the voltage of the third node N3. Therefore, the first subpixel RP may generate a constant driving current Ids to drive the light emitting element EL with optimized luminous efficiency and may adjust the luminance of light emitted from the light emitting element EL by adjusting a duty ratio of the light emitting element EL, that is, the period during which the driving current Ids is applied to the light emitting element EL.

In addition, the second pixel driver PDU2 of the second subpixel GP generates the driving current Ids according to the second PWM data voltage of a second PAM data line GDL so that the light emitting element EL of the second subpixel GP is driven with optimized luminous efficiency. The first pixel driver PDU1 of the second subpixel GP controls the voltage of the third node N3 of the third pixel driver PDU3 by generating the control current Ic according to the PWM data voltage of the PWM data line, and the third pixel driver PDU3 adjusts the period during which the driving current Ids is applied to the light emitting element EL according to the voltage of the third node N3. Therefore, the second subpixel GP may generate a constant driving current Ids to drive the light emitting element EL with optimized luminous efficiency and may adjust the luminance of light emitted from the light emitting element EL by adjusting the duty ratio of the light emitting element EL, that is, the period during which the driving current Ids is applied to the light emitting element EL.

In addition, the second pixel driver PDU2 of the third subpixel BP generates the driving current Ids according to the third PWM data voltage of a third PAM data line BDL so that the light emitting element EL of the third subpixel BP is driven with optimized luminous efficiency. The first pixel driver PDU1 of the third subpixel BP controls the voltage of the third node N3 of the third pixel driver PDU3 by generating the control current Ic according to the PWM data voltage of the PWM data line, and the third pixel driver PDU3 adjusts the period during which the driving current Ids is applied to the light emitting element EL according to the voltage of the third node N3.

Therefore, the third subpixel BP may generate a constant driving current Ids to drive the light emitting element EL with optimized luminous efficiency and may adjust the luminance of light emitted from the light emitting element EL by adjusting the duty ratio of the light emitting element EL, that is, the period during which the driving current Ids is applied to the light emitting element EL.

Therefore, it may be possible to reduce or prevent deterioration of image quality due to a change in the wavelength of emitted light according to the driving current Ids applied to the light emitting element EL. In addition, each of the light emitting element EL of the first subpixel RP, the light emitting element EL of the second subpixel GP, and the light emitting element EL of the third subpixel BP can emit light with optimized luminous efficiency.

Figure 5:
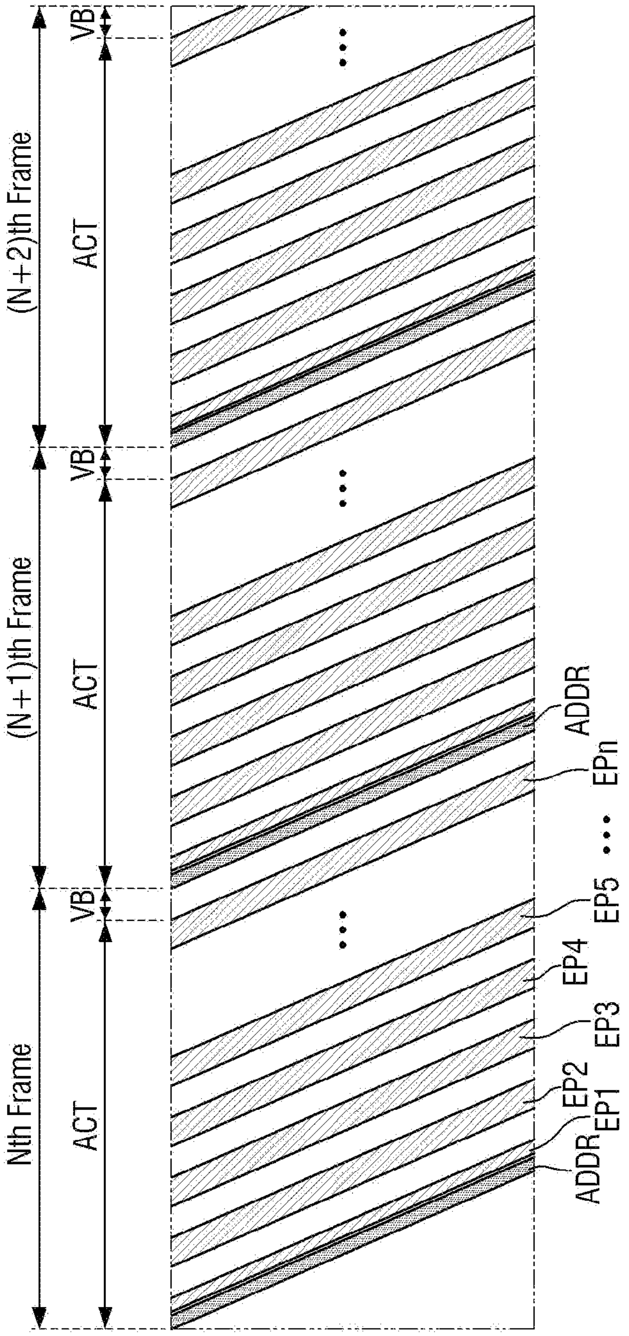
FIG. 5 is an example diagram illustrating the operation of the display device during $N^{th}$ through $(N+2)^{th}$ frame periods.

FIG. 5 is an example diagram illustrating the operation of the display device during $N^{th}$ through $(N+2)^{th}$ frame periods.

Referring to FIG. 5, each of the $N^{th}$ through $(N+2)^{th}$ frame periods may include an active period ACT and a blank period VB. The active period ACT may include a data addressing period ADDR in which a PWM data voltage and the first/second/third PWM data voltage are supplied to each of the first through third subpixels RP, GP and BP and a plurality of emission periods EP1 through EPn in which the light emitting element EL of each of the subpixels RP, GP and BP emits light. The blank period VB may be a period in which the subpixels RP, GP and BP of the display panel 100 are idle.

The address period ADDR and a first emission period EP1 may be shorter than each of second through $n^{th}$ emission periods EP2 through EPn. For example, the address period ADDR and the first emission period EP1 may be about five horizontal periods, and each of the second through $n^{th}$ emission periods EP2 through EPn may be about twelve horizontal periods, but embodiments of the present specification are not limited thereto. In addition, the active period ACT may include twenty-five emission periods, but the number of the emission periods EP1 through EPn of the active period ACT is not limited thereto.

The subpixels RP, GP and BP of the display panel 100 may sequentially receive PWM data voltages and the first/second/third PWM data voltages on a row line-by-row line basis during the address period ADDR. For example, the PWM data voltages and the first/second/third PWM data voltages may be applied sequentially from the subpixels RP, GP and BP disposed in a first row line to the subpixels RP, GP and BP disposed in an $n^{th}$ row line corresponding to a last row line.

The subpixels RP, GP and BP of the display panel 100 may sequentially emit light on a row line-by-row line basis in each of the emission periods EP1 through EPn. For example, the subpixels RP, GP and BP may emit light sequentially from the subpixels RP, GP and BP disposed in the first row line to the subpixels RP, GP and BP disposed in the last row line.

The address period ADDR may overlap at least one of the emission periods EP1 through EPn. For example, as illustrated in FIG. 5, the address period ADDR may overlap the first through third emission periods EP1 through EP3. In this case, when the subpixels RP, GP and BP disposed in a $p^{th}$ row line (where p is a positive integer) receive the PWM data voltages and the first/second/third PWM data voltages, the subpixels RP, GP and BP disposed in a $q^{th}$ row line (where q is a positive integer less than p) may emit light.

In addition, each of the emission periods EP1 through EPn may overlap neighboring emission periods. For example, the second emission period EP2 may overlap the first emission period EP1 and the third emission period EP3. In this case, while the subpixels RP, GP and BP disposed in the $p^{th}$ row line emit light in the second emission period EP2, the subpixels RP, GP and BP disposed in the $q^{th}$ row line may emit light in the first emission period EP1.

Figure 6:
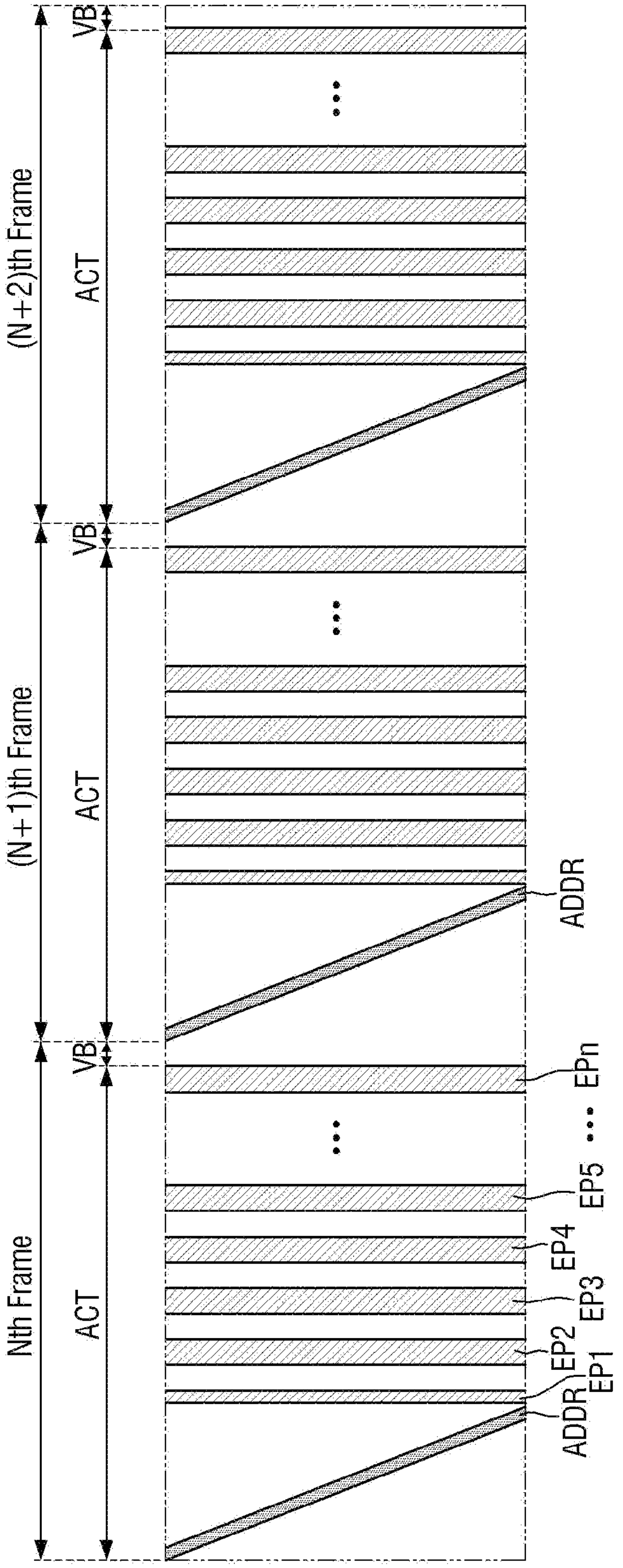
FIG. 6 is another example diagram illustrating the operation of the display device during the $N^{th}$ through $(N+2)^{th}$ frame periods.

FIG. 6 is another example diagram illustrating the operation of the display device during the $N^{th}$ through $(N+2)^{th}$ frame periods.

The embodiment of FIG. 6 is different from the embodiment of FIG. 5 in that the subpixels RP, GP and BP of the display panel 100 concurrently (e.g., simultaneously) emit light in each of the emission periods EP1 through EPn.

Referring to FIG. 6, the address period ADDR may not overlap the emission periods EP1 through EPn. The first emission period EP1 may occur after the address period ADDR completely ends.

The emission periods EP1 through EPn may not overlap each other. The subpixels RP, GP and BP disposed in all row lines may concurrently (e.g., simultaneously) emit light in each of the emission periods EP1 through EPn.

Figure 7:
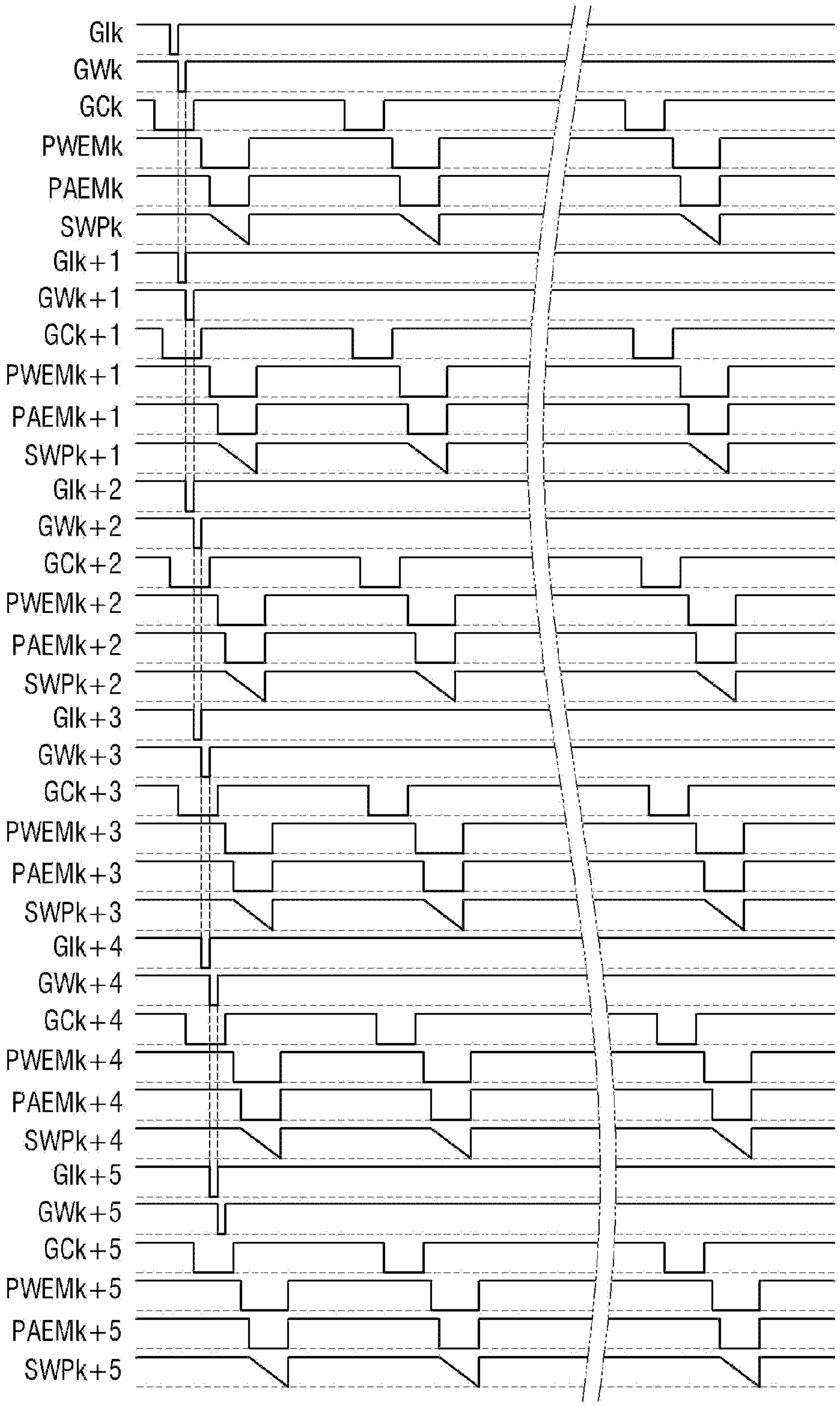
FIG. 7 is a waveform diagram of scan initialization signals, scan write signals, scan control signals, pulse width modulation (PWM) emission signals, pulse amplitude modulation (PAM) emission signals, and sweep signals applied to subpixels disposed in $k^{th}$ through $(k+5)^{th}$ row lines in the $N^{th}$ frame period according to one or more embodiments.

FIG. 7 is a waveform diagram of scan initialization signals GIk through GIk+5, scan write signals GWk through GWk+5, scan control signals GCk through GCk+5, PWM emission signals PWEMk through PWEMk+5, PAM emission signals PAEMk through PAEMk+5, and sweep signals SWPk through SWPk+5 applied to subpixels RP, GP and BP disposed in $k^{th}$ through $(k+5)^{th}$ row lines in the $N^{th}$ frame period according to one or more embodiments.

Referring to FIG. 7, the subpixels RP, GP and BP disposed in the $k^{th}$ row line refer to subpixels RP, GP and BP connected to the $k^{th}$ scan initialization line GILk, the $k^{th}$ scan write line GWLk, the $k^{th}$ scan control line GCLk, the $k^{th}$ PWM emission line PWELk, the $k^{th}$ PAM emission line PAELk, and the $k^{th}$ sweep signal line SWPLk. A $k^{th}$ scan initialization signal GIk refers to a signal applied to the $k^{th}$ scan initialization line GILk, and a $k^{th}$ scan write signal GWk refers to a signal applied to the $k^{th}$ scan write line GWLk. A $k^{th}$ scan control signal GCk refers to a signal applied to the $k^{th}$ scan control line GCLk, and a $k^{th}$ PWM emission signal PWEMk refers to a signal applied to the $k^{th}$ PWM emission line PWELk. A $k^{th}$ PAM emission signal PAEMk refers to a signal applied to the $k^{th}$ PAM emission line PAELk, and a $k^{th}$ sweep signal SWPk refers to a signal applied to the $k^{th}$ sweep signal line SWPLk.

The scan initialization signals GIk through GIk+5, the scan write signals GWk through GWk+5, the scan control signals GCk through GCk+5, the PWM emission signals PWEMk through PWEMk+5, the PAM emission signals PAEMk through PAEMk+5, and the sweep signals SWPk through SWPk+5 may be sequentially shifted by one horizontal period 1 H. The $k^{th}$ scan write signal GWk may be a signal obtained by shifting the $k^{th}$ scan initialization signal GIk by one horizontal period, and a $(k+1)^{th}$ scan write signal GWk+1 may be a signal obtained by shifting a $(k+1)^{th}$ scan initialization signal GIk+1 by one horizontal period. In this case, because the $(k+1)^{th}$ scan initialization signal GIk+1 is a signal obtained by shifting the $k^{th}$ scan initialization signal GIk by one horizontal period, the $k^{th}$ scan write signal GWk and the $(k+1)^{th}$ scan initialization signal GIk+1 may be substantially the same.

Figure 8:
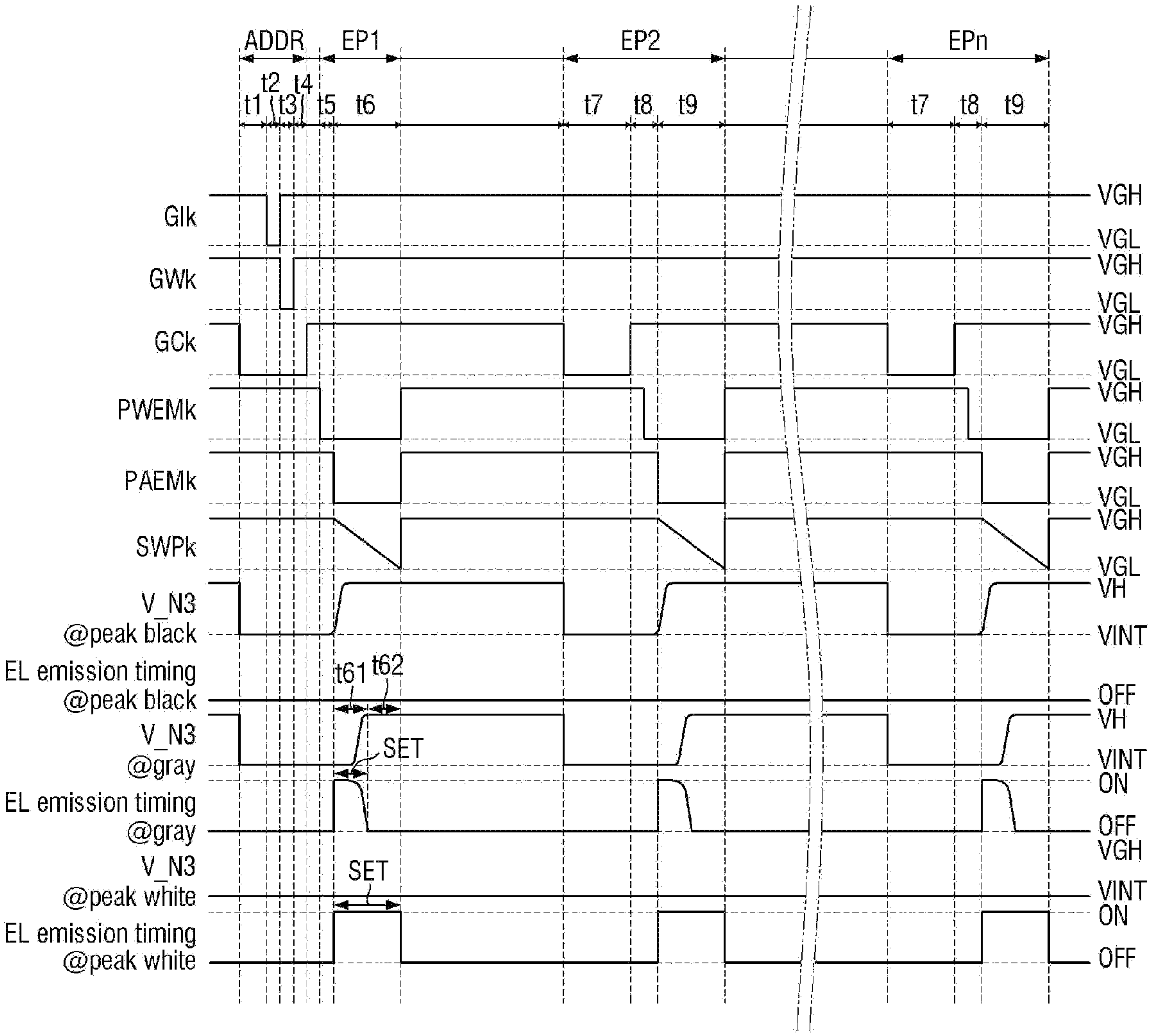
FIG. 8 is a waveform diagram illustrating periods in which a $k^{th}$ scan initialization signal, a $k^{th}$ scan write signal, a $k^{th}$ scan control signal, a $k^{th}$ PWM emission signal, a $k^{th}$ PAM emission signal and a $k^{th}$ sweep signal applied to each of the subpixels disposed in the $k^{th}$ row line, the voltage of a third node, and the driving current applied to the light emitting element are applied in the $N^{th}$ frame period according to one or more embodiments.

FIG. 8 is a waveform diagram illustrating periods in which the $k^{th}$ scan initialization signal GIk, the $k^{th}$ scan write signal GWk, the $k^{th}$ scan control signal GCk, the $k^{th}$ PWM emission signal PWEMk, the $k^{th}$ PAM emission signal PAEMk and the $k^{th}$ sweep signal SWPk applied to each of the subpixels RP, GP and BP disposed in the $k^{th}$ row line, the voltage of the third node N3, and the driving current Ids applied to the light emitting element EL are applied in the $N^{th}$ frame period according to one or more embodiments.

Referring to FIG. 8, the $k^{th}$ scan initialization signal GIk is a signal for controlling the turn-on and turn-off of the third and tenth transistors T3 and T10 of each of the subpixels RP, GP and BP. The $k^{th}$ scan write signal GWk is a signal for controlling the turn-on and turn-off of the second, fourth, ninth and eleventh transistors T2, T4, T9 and T11 of each of the subpixels RP, GP and BP. The $k^{th}$ scan control signal GCk is a signal for controlling the turn-on and turn-off of the seventh, thirteenth, sixteenth and eighteenth transistors T7, T13, T16 and T18 of each of the subpixels RP, GP and BP. The $k^{th}$ PWM emission signal PWEMk is a signal for controlling the turn-on and turn-off of the fifth, sixth, twelfth and fourteenth transistors T5, T6, T12 and T14.

The $k^{th}$ PAM emission signal PAEMk is a signal for controlling the turn-on and turn-off of the seventeenth transistor T17. The $k^{th}$ scan initialization signal GIk, the $k^{th}$ scan write signal GWk, the $k^{th}$ scan control signal GCk, the $k^{th}$ PWM emission signal PWEMk, the $k^{th}$ PAM emission signal PAEMk, and the $k^{th}$ sweep signal SWPk may be generated with a cycle of one frame period.

The data address period ADDR includes first through fourth periods t1 through t4. The first period t1 and the fourth period t4 are first initialization periods in which the first electrode of the light emitting element EL and the voltage of the third node N3 are initialized. The second period t2 is a second initialization period in which the gate electrode of the first transistor T1 and the gate electrode of the eighth transistor T8 are initialized. The third period t3 is a period in which a PWM data voltage Vdata of the $j^{th}$ PWM data line DLj and the threshold voltage Vth1 of the first transistor T1 are sampled at the gate electrode of the first transistor T1 and in which a first PWM data voltage RVdata of the first PAM data line RDL and a threshold voltage Vth8 of the eighth transistor T8 are sampled at the gate electrode of the eighth transistor T8.

The first emission period EP1 includes a fifth period t5 and a sixth period t6.

The first emission period EP1 is a period in which the turn-on period of the fifteenth transistor T15 is controlled according to the control current Ic, and the driving current Ids is supplied to the light emitting element EL.

Each of the second through $n^{th}$ emission periods EP2 through EPn includes seventh through ninth periods t7 through t9. The seventh period t7 is a third initialization period in which the third node N3 is initialized, the eighth period t8 is substantially the same as the fifth period t5, and the ninth period t9 is substantially the same as the sixth period t6.

Neighboring emission periods from among the first through $n^{th}$ emission periods EP1 through EPn may be spaced from each other by about several to tens of horizontal periods.

The $k^{th}$ scan initialization signal GIk may have the gate-on voltage VGL during the second period t2 and have the gate-off voltage VGH during the other periods. That is, the $k^{th}$ scan initialization signal GIk may have a scan initialization pulse generated as the gate-on voltage VGL during the second period t2. The gate-off voltage VGH may be a voltage having a higher level than the gate-on voltage VGL.

The $k^{th}$ scan write signal GWk may have the gate-on voltage VGL during the third period t3 and have the gate-off voltage VGH during the other periods. That is, the $k^{th}$ scan write signal GWk may have a scan write pulse generated as the gate-on voltage VGL during the third period t3.

The $k^{th}$ scan control signal GCk may have the gate-on voltage VGL during the first through fourth periods t1 through t4 and the seventh period t7 and have the gate-off voltage VGH during the other periods. That is, the $k^{th}$ scan control signal GCk may have scan control pulses generated as the gate-on voltage VGL during the first through fourth periods t1 through t4 and the seventh period t7.

The $k^{th}$ sweep signal SWPk may have sweep pulses in the form of triangular waves during the sixth period t6 and the ninth period t9 and may have the gate-off voltage VGH during the other periods. For example, a sweep pulse of the $k^{th}$ sweep signal SWPk may be in the form of a triangular wave that linearly decreases from the gate-off voltage VGH to the gate-on voltage VGL during each of the sixth period t6 and the ninth period t9 and immediately increases from the gate-on voltage VGL to the gate-off voltage VGH at the end of the sixth period t6 and at the end of the ninth period t9.

The $k^{th}$ PWM emission signal PWEMk may have the gate-on voltage VGL during the fifth and sixth periods t5 and t6 and the eighth and ninth periods t8 and t9 and may have the gate-off voltage VGH during the other periods. That is, the $k^{th}$ PWM emission signal PWEMk may include PWM pulses generated as the gate-on voltage VGL during the fifth and sixth periods t5 and t6 and the eighth and ninth periods t8 and t9.

The $k^{th}$ PAM emission signal PAEMk may have the gate-on voltage VGL during the sixth period t6 and the ninth period t9 and have the gate-off voltage VGH during the other periods. That is, the $k^{th}$ PAM emission signal PAEMk may include PAM pulses generated as the gate-on voltage VGL during the sixth period t6 and the ninth period t9. A PWM pulse width of the $k^{th}$ PWM emission signal PWEMk may be greater than a sweep pulse width of the $k^{th}$ sweep signal SWPk.

Figure 9:
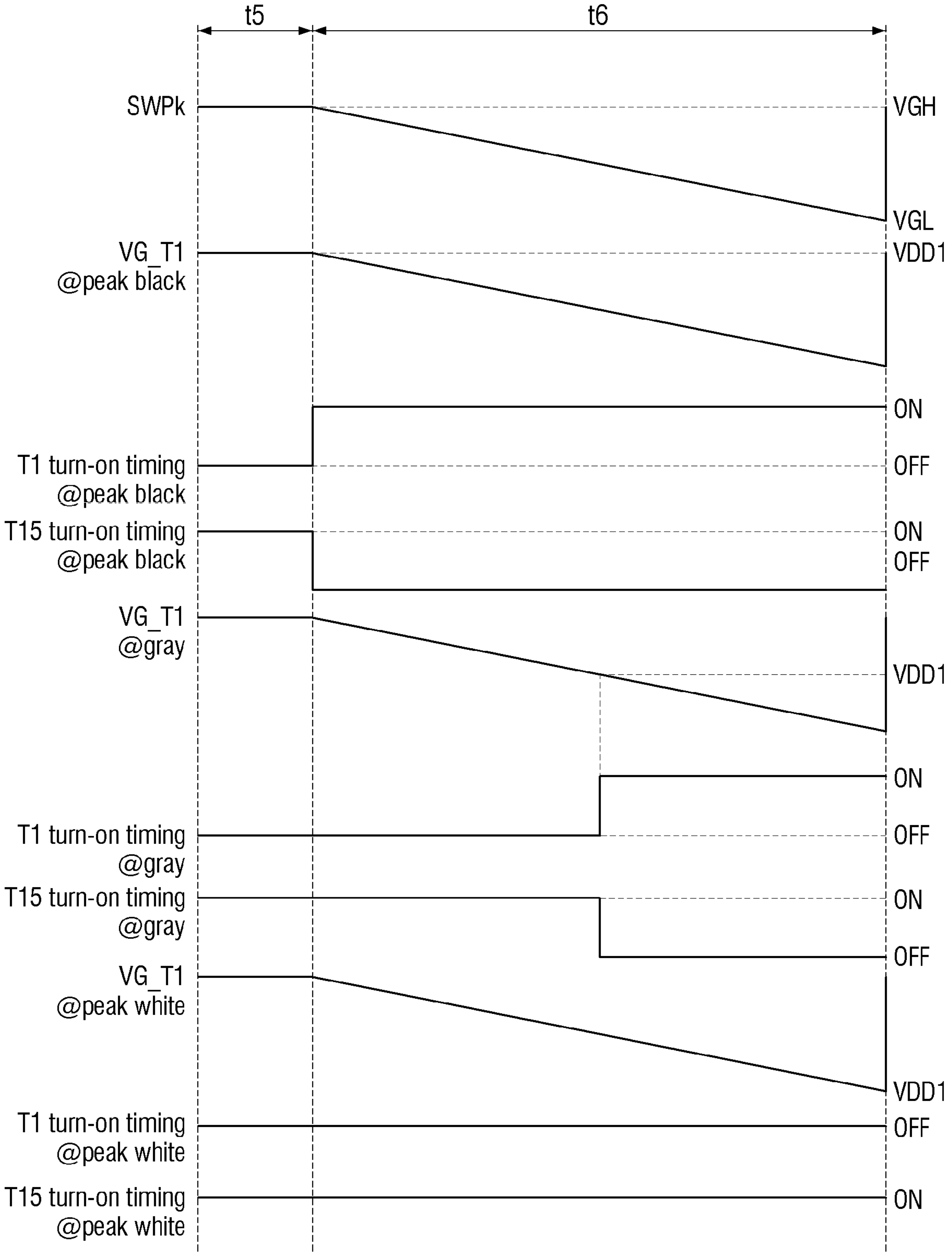
FIG. 9 is a timing diagram illustrating the $k^{th}$ sweep signal, the voltage of a gate electrode of a first transistor, the turn-on timing of the first transistor, and the turn-on timing of a fifteenth transistor during a fifth period and a sixth period according to one or more embodiments.

FIG. 9 is a timing diagram illustrating the $k^{th}$ sweep signal SWPk, the voltage of the gate electrode of the first transistor T1, the turn-on timing of the first transistor T1, and the turn-on timing of the fifteenth transistor T15 during the fifth period t5 and the sixth period t6 according to one or more embodiments. FIGS. 10, 11, 12 and 13 are circuit diagrams illustrating the operation of a first subpixel RP during the first period t1, the second period t2, the third period t3, and the sixth period t6 of FIG. 8.

The operation of a first subpixel RP according to one or more embodiments during the first through ninth periods t1 through t9 will now be described in detail with reference to FIGS. 9 through 13.

Figure 10:
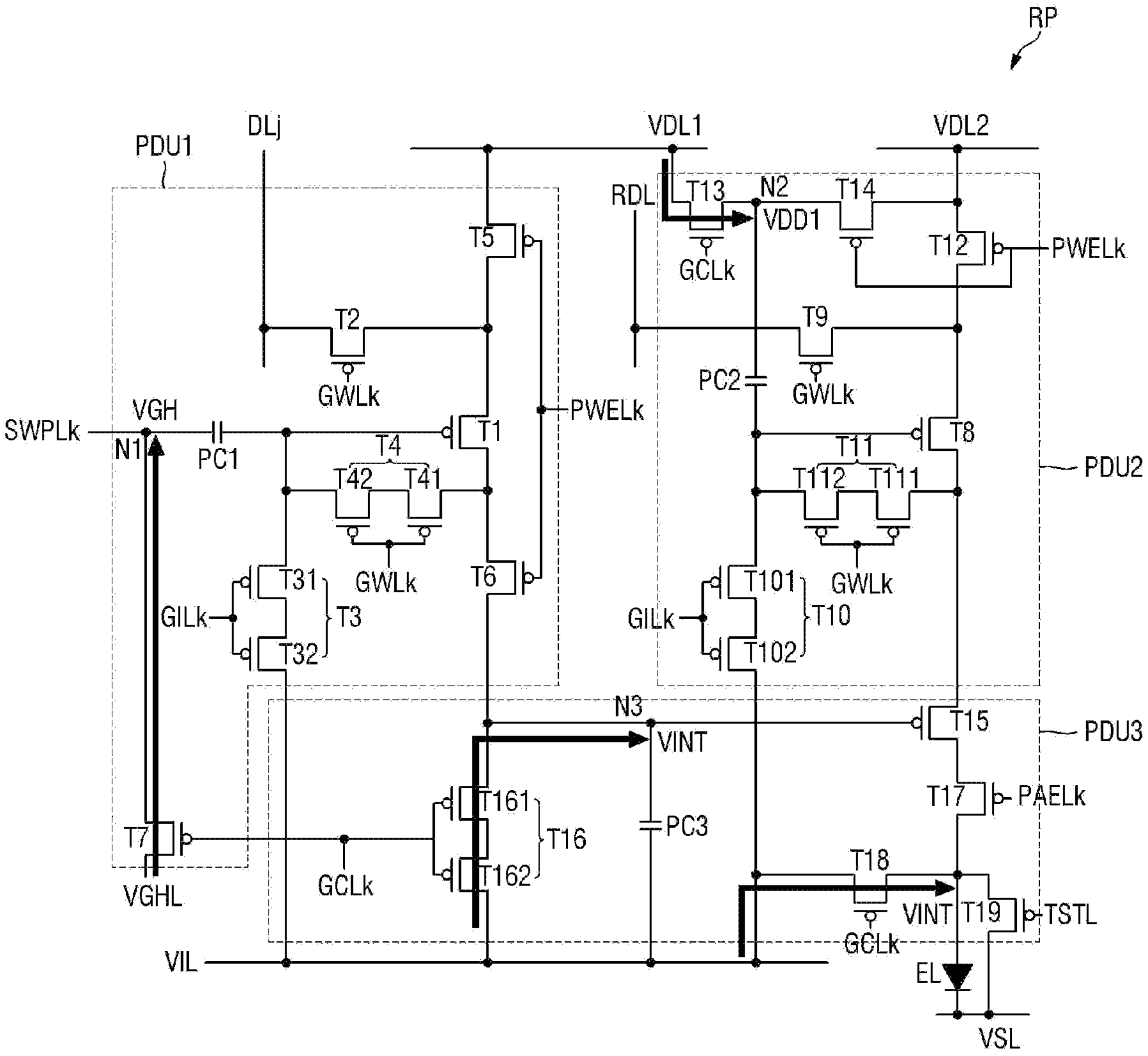
FIGS. 10, 11, 12 and 13 are circuit diagrams illustrating the operation of a first subpixel during a first period, a second period, a third period, and the sixth period of FIG. 8.

First, during the first period t1, the seventh transistor T7, the thirteenth transistor T13, the sixteenth transistor T16, and the eighteenth transistor T18 are turned on by the $k^{th}$ scan control signal GCk of the gate-on voltage VGL as illustrated in FIG. 10.

Due to the turn-on of the seventh transistor T7, the gate-off voltage VGH of the gate-off voltage line VGHL is applied to the first node N1. Due to the turn-on of the thirteenth transistor T13, the first power supply voltage VDD1 of the first power line VDL1 is applied to the second node N2.

Due to the turn-on of the sixteenth transistor T16, the third node N3 is initialized to the initialization voltage VINT of the initialization voltage line VIL. Due to the turn-on of the eighteenth transistor T18, the first electrode of the light emitting element EL is initialized to the initialization voltage VINT of the initialization voltage line VIL.

Figure 11:
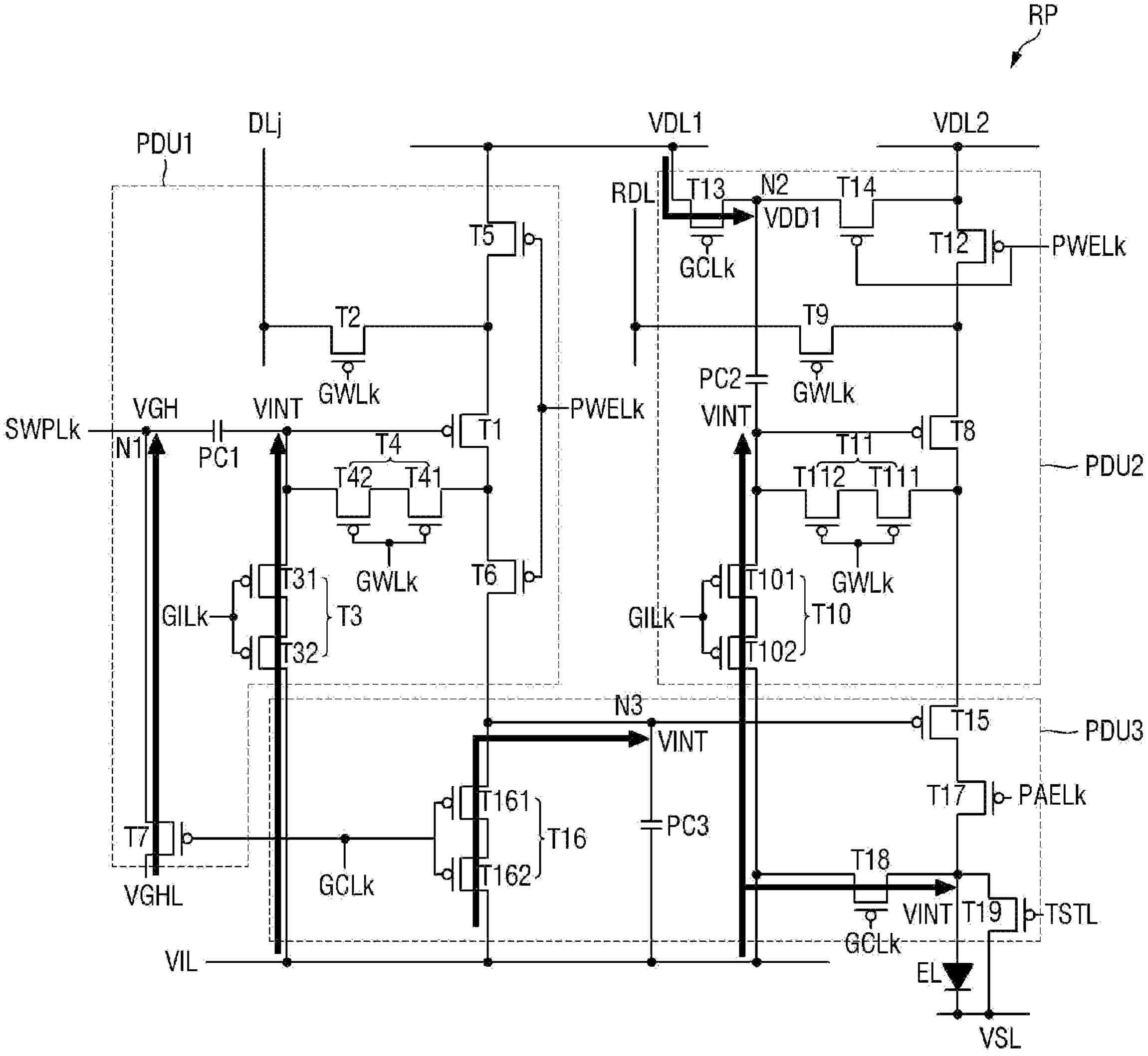

Second, during the second period t2, the seventh transistor T7, the thirteenth transistor T13, the sixteenth transistor T16, and the eighteenth transistor T18 are turned on by the $k^{th}$ scan control signal GCk of the gate-on voltage VGL as illustrated in FIG. 11. In addition, during the second period t2, the third transistor T3 and the tenth transistor T10 are turned on by the $k^{th}$ scan initialization signal GIk of the gate-on voltage VGL.

The seventh transistor T7, the thirteenth transistor T13, the sixteenth transistor T16, and the eighteenth transistor T18 are substantially the same as described above in the first period t1.

Due to the turn-on of the third transistor T3, the gate electrode of the first transistor T1 is initialized to the initialization voltage VINT of the initialization voltage line VIL. In addition, due to the turn-on of the tenth transistor T10, the gate electrode of the eighth transistor T8 is initialized to the initialization voltage VINT of the initialization voltage line VIL.

Here, because the gate-off voltage VGH of the gate-off voltage line VGHL is applied to the first node N1, it may be possible to prevent a voltage change of the gate electrode of the first transistor T1 from being reflected in the $k^{th}$ sweep signal line SWPLk by the first capacitor PC1 and thereby causing the gate-off voltage VGH of the $k^{th}$ sweep signal SWPk to be changed.

Figure 12:
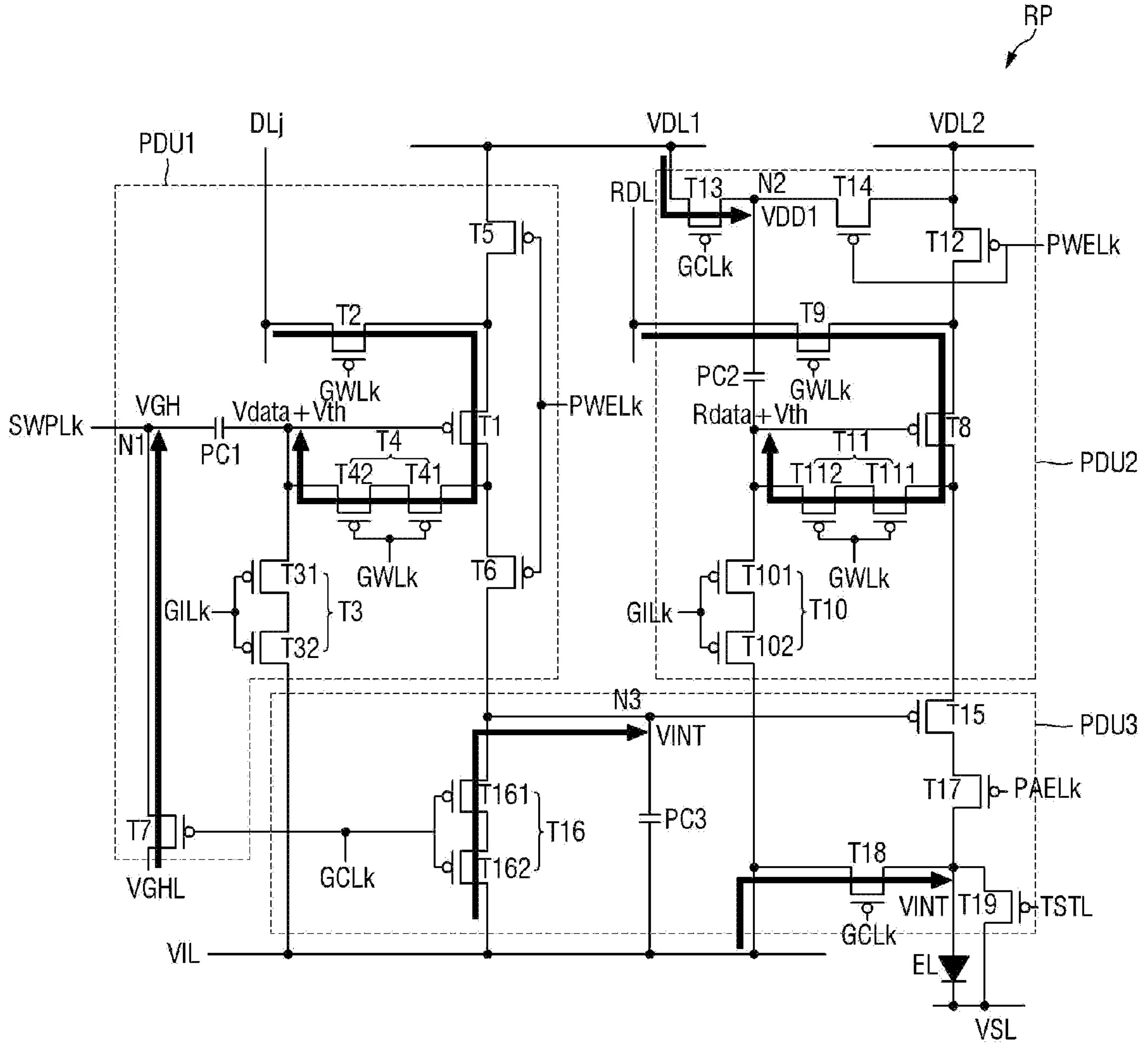

Third, during the third period t3, the seventh transistor T7, the thirteenth transistor T13, the sixteenth transistor T16, and the eighteenth transistor T18 are turned on by the $k^{th}$ scan control signal GCk of the gate-on voltage VGL as illustrated in FIG. 12. In addition, during the third period t3, the second transistor T2, the fourth transistor T4, the ninth transistor T9, and the eleventh transistor T11 are turned on by the $k^{th}$ scan write signal GWk of the gate-on voltage VGL.

The seventh transistor T7, the thirteenth transistor T13, the sixteenth transistor T16, and the eighteenth transistor T18 are substantially the same as described above in the first period t1.

Due to the turn-on of the second transistor T2, the PWM data voltage Vdata of the $j^{th}$ PWM data line DLj is applied to the first electrode of the first transistor T1. Due to the turn-on of the fourth transistor T4, the gate electrode and the second electrode of the first transistor T1 are connected to each other. Thus, the first transistor T1 operates as a diode.

Here, because a voltage (Vgs=Vint-Vdata) between the gate electrode and the first electrode of the first transistor T1 is greater than the threshold voltage Vth1, the first transistor T1 forms a current path until the voltage Vgs between the gate electrode and the first electrode reaches the threshold voltage Vth1. Therefore, the voltage of the gate electrode of the first transistor T1 may increase from "Vint" to "Vdata+Vth1". Because the first transistor T1 is formed as a P-type MOSFET, the threshold voltage Vth1 of the first transistor T1 may be less than 0 V.

In addition, because the gate-off voltage VGH of the gate-off voltage line VGHL is applied to the first node N1, it may be possible to prevent a voltage change of the gate electrode of the first transistor T1 from being reflected in the $k^{th}$ sweep signal line SWPLk by the first capacitor PC1 and thereby causing the gate-off voltage VGH of the $k^{th}$ sweep signal SWPk to be changed.

Due to the turn-on of the ninth transistor T9, the first PWM data voltage Rdata of the first PAM data line RDL is applied to the first electrode of the eighth transistor T8. Due to the turn-on of the eleventh transistor T11, the gate electrode and the second electrode of the eighth transistor T8 are connected to each other. Thus, the eighth transistor T8 may operate as a diode (e.g., may be diode-connected).

Here, because a voltage (Vgs=Vint-Rdata) between the gate electrode and the first electrode of the eighth transistor T8 is greater than the threshold voltage Vth8, the eighth transistor T8 forms a current path until the voltage Vgs between the gate electrode and the first electrode reaches the threshold voltage Vth8. Therefore, the voltage of the gate electrode of the eighth transistor T8 may increase from "Vint" to "Rdata+Vth8".

Fourth, during the fourth period t4, the seventh transistor T7, the thirteenth transistor T13, the sixteenth transistor T16, and the eighteenth transistor T18 are turned on by the $k^{th}$ scan control signal GCk of the gate-on voltage VGL.

The seventh transistor T7, the thirteenth transistor T13, the sixteenth transistor T16, and the eighteenth transistor T18 are substantially the same as described above in the first period t1.

Fifth, during the fifth period t5, the fifth transistor T5, the sixth transistor T6, the twelfth transistor T12, and the fourteenth transistor T14 are turned on by the $k^{th}$ PWM emission signal PWEMk of the gate-on voltage VGL as illustrated in FIG. 13.

Due to the turn-on of the fifth transistor T5, the first power supply voltage VDD1 is applied to the first electrode of the first transistor T1. In addition, due to the turn-on of the sixth transistor T6, the second electrode of the first transistor T1 is connected to the third node N3.

The control current Ic flowing according to the voltage (Vdata+Vth1) of the gate electrode of the first transistor T1 during the fifth period t5 may not depend on the threshold voltage Vth1 of the first transistor T1 as shown below in Equation 1.

$$Ids=k''X(Vgs-Vth1)^2=k''\times(\mathrm{Vdata}+Vth1-VDD1-Vth1)^2=k''\times(\mathrm{Vdata}-VDD1)^2, \quad (1)$$

where k" is a proportional coefficient determined by the structure and physical characteristics of the first transistor T1, Vth1 is the threshold voltage of the first transistor T1, VDD1 is the first power supply voltage, and Vdata is the PWM data voltage.

In addition, due to the turn-on of the twelfth transistor T12, the first electrode of the eighth transistor T8 may be connected to the second power line VDL2.

In addition, due to the turn-on of the fourteenth transistor T14, the second power supply voltage VDD2 of the second power line VDL2 is applied to the second node N2. When the second power supply voltage VDD2 of the second power line VDL2 is changed by a voltage drop or the like, a voltage difference ΔV2 between the first power supply voltage VDD1 and the second power supply voltage VDD2 may be reflected in the gate electrode of the eighth transistor T8 by the second capacitor PC2.

Due to the turn-on of the fourteenth transistor T14, the driving current Ids flowing according to the voltage (Rdata+Vth8) of the gate electrode of the eighth transistor T8 may be supplied to the fifteenth transistor T15. The driving current Ids may not depend on the threshold voltage Vth8 of the eighth transistor T8 as shown below in Equation 2.

$$Ids=k'\times(Vgs-Vth8)^2=k'\times(\mathrm{Rdata}+Vth8-\Delta V2-VDD2-Vth8)^2=k'\times(\mathrm{Rdata}-\Delta V2-VDD2)^2, \quad (2)$$

where k' is a proportional coefficient determined by the structure and physical characteristics of the eighth transistor T8, Vth8 is the threshold voltage of the eighth transistor T8, VDD2 is the second power supply voltage, and Rdata is the first PWM data voltage.

Sixth, during the sixth period t6, the fifth transistor T5, the sixth transistor T6, the twelfth transistor T12, and the fourteenth transistor T14 are turned on by the $k^{th}$ PWM emission signal PWEMk of the gate-on voltage VGL as illustrated in FIG. 13.

During the sixth period t6, the seventeenth transistor T17 is turned on by the $k^{th}$ PAM emission signal PAEMk of the gate-on voltage VGL as illustrated in FIG. 13. During the sixth period t6, the $k^{th}$ sweep signal SWPk linearly decreases from the gate-off voltage VGH to the gate-on voltage VGL.

The fifth transistor T5, the sixth transistor T6, the twelfth transistor T12, and the fourteenth transistor T14 are substantially the same as described above in the fifth period t5.

Due to the turn-on of the seventeenth transistor T17, the first electrode of the light emitting element EL may be connected to the second electrode of the fifteenth transistor T15.

During the sixth period t6, the $k^{th}$ sweep signal SWPk linearly decreases from the gate-off voltage VGH to the gate-on voltage VGL, and a voltage change ΔV1 of the $k^{th}$ sweep signal SWPk is reflected in the gate electrode of the first transistor T1 by the first capacitor PC1. Therefore, the voltage of the gate electrode of the first transistor T1 may be Vdata+Vth1−ΔV1. That is, as the voltage of the $k^{th}$ sweep signal SWPk decreases during the sixth period t6, the voltage of the gate electrode of the first transistor T1 may linearly decrease.

A period during which the control current Ic is applied to the third node N3 may vary according to the magnitude of the PWM data voltage Vdata applied to the first transistor T1. Accordingly, because the voltage of the third node N3 varies according to the magnitude of the PWM data voltage Vdata applied to the first transistor T1, the turn-on period of the fifteenth transistor T15 can be controlled. Therefore, by controlling the turn-on period of the fifteenth transistor T15, it may be possible to control a period SEP in which the driving current Ids is applied to the light emitting element EL during the sixth period t6.

As illustrated in FIG. 9, when the data voltage Vdata of the gate electrode of the first transistor T1 is a data voltage of a peak black grayscale level, as the voltage of the $k^{th}$ sweep signal SWPk decreases, a voltage VG_T1 of the gate electrode of the first transistor T1 may be lower than the first power supply voltage VDD1, which is the voltage of the first electrode of the first transistor T1, throughout the sixth period t6. Therefore, the first transistor T1 may be turned on throughout the sixth period t6. Accordingly, the control current Ic of the first transistor T1 may flow to the third node N3 throughout the sixth period t6, and the voltage of the third node N3 may increase to a high level VH in the fifth period t5. Therefore, the fifteenth transistor T15 may be turned off throughout the sixth period t6. Accordingly, because the driving current Ids is not applied to the light emitting element EL during the sixth period t6, the light emitting element EL may not emit light during the sixth period t6.

Also, as illustrated in FIG. 9, when the data voltage Vdata of the gate electrode of the first transistor T1 is a data voltage of a gray grayscale level, as the voltage of the $k^{th}$ sweep signal SWPk decreases, the voltage VG_T1 of the gate electrode of the first transistor T1 may have a higher level than the first power supply voltage VDD1 during a first sub-period t61 and may have a lower level than the first power supply voltage VDD1 during a second sub-period t62. Therefore, the first transistor T1 may be turned on during the second sub-period t62 of the sixth period t6. In this case, because the control current Ic of the first transistor T1 flows to the third node N3 during the second sub-period t62, the voltage of the third node N3 may have a high level VH during the second sub-period t62. Accordingly, the fifteenth transistor T15 may be turned off during the second sub-period t62. Therefore, the driving current Ids is applied to the light emitting element EL during the first sub-period t61 and is not applied to the light emitting element EL during the second sub-period t62. That is, the light emitting element EL may emit light during the first sub-period t61 which is a part of the sixth period t6. As the first subpixel RP expresses a gray grayscale level close to the peak black grayscale level, an emission period SET of the light emitting element EL may be reduced. In addition, as the first subpixel RP expresses a gray grayscale level close to a peak white grayscale level, the emission period SET of the light emitting element EL may be increased.

Also, as illustrated in FIG. 9, when the data voltage Vdata of the gate electrode of the first transistor T1 is a data voltage of the peak white grayscale level, the voltage VG_T1 of the gate electrode of the first transistor T1 may be higher than the first power supply voltage VDD1 during the sixth period t6 despite a reduction in the voltage of the $k^{th}$ sweep signal SWPk. Therefore, the first transistor T1 may be turned off throughout the sixth period t6. In this case, because the control current Ic of the first transistor T1 does not flow to the third node N3 throughout the sixth period t6, the voltage of the third node N3 may be maintained at the initialization voltage VINT. Accordingly, the fifteenth transistor T15 may be turned on throughout the sixth period t6. Therefore, the driving current Ids may be applied to the light emitting element EL throughout the sixth period t6, and the light emitting element EL may emit light throughout the sixth period t6.

Further, as the $k^{th}$ sweep signal SWPk rises from the gate-on voltage VGL to the gate-off voltage VGH at the end of the sixth period t6. Therefore, at the end of the sixth period t6, the voltage VG_T1 of the gate electrode of the first transistor T1 may increase to be substantially equal to the voltage VG_T1 of the gate electrode of the first transistor T1 in fifth period t5.

As described above, the emission period of the light emitting element EL may be controlled by adjusting the PWM data voltage applied to the gate electrode of the first transistor T1. Therefore, the grayscale level or luminance displayed by the first subpixel RP may be adjusted by controlling the emission period of the light emitting element EL while maintaining the driving current Ids applied to the light emitting element EL constant, rather than by adjusting the magnitude of the driving current Ids applied to the light emitting element EL.

When digital video data converted into data voltages is 8 bits, digital video data converted into a data voltage of the peak black grayscale level may be 0, and digital video data converted into a data voltage of the peak white grayscale level may be 255. In addition, digital video data of the black grayscale level may be 0 to 63, digital video data of the gray grayscale level may be 64 to 191, and digital video data of the white grayscale level may be 192 to 255.

In addition, the seventh period t7, the eighth period t8, and the ninth period t9 of each of the second through $n^{th}$ emission periods EP2 through EPn are substantially the same as the above-described first period t1, fifth period t5, and sixth period t6, respectively. That is, in each of the second through $n^{th}$ emission periods EP2 through EPn, after the third node N3 is initialized, a period during which the driving current Ids generated according to the first PWM data voltage Rdata written to the gate electrode of the eighth transistor T8 is applied to the light emitting element EL may be adjusted based on the PWM data voltage Vdata written to the gate electrode of the first transistor T1 during the address period ADDR.

Because the test signal of the test signal line TSTL is applied as the gate-off voltage VGH during the active period ACT of the $N^{th}$ frame period, the nineteenth transistor T19 may be turned off during the active period ACT of the $N^{th}$ frame period.

A second subpixel GP and a third subpixel BP may operate in substantially the same manner as the first subpixel RP described above with reference to FIGS. 8 through 13. Therefore, a description of the operation of the second subpixel GP and the third subpixel BP will be omitted.

Figure 14:
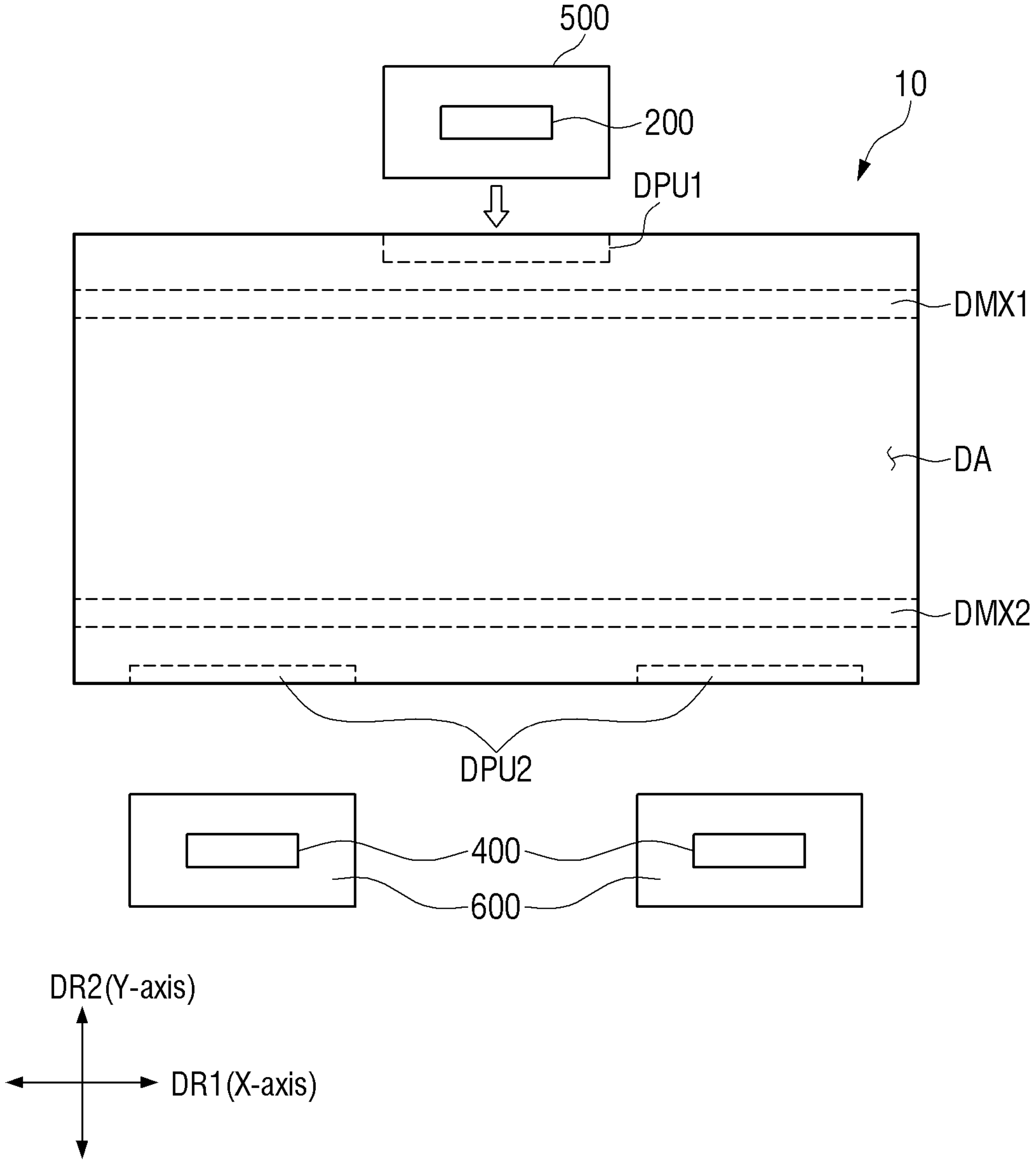
FIG. 14 is an example view of a display device according to one or more embodiments.

FIG. 14 is an example view of a display device 10 according to one or more embodiments.

Referring to FIG. 14, the display device 10 is a device for displaying moving images and/or still images. The display device 10 may be used as a display screen in portable electronic devices such as mobile phones, smartphones, tablet personal computers (PCs), smart watches, watch phones, mobile communication terminals, electronic notebooks, electronic books, portable multimedia players (PMPs), navigation devices and ultra-mobile PCs (UMPCs), as well as in various products such as televisions, notebook computers, monitors, billboards and the Internet of things (IoT).

The display device 10 includes a display panel 100, a source driver 200, power supply units 400, a source circuit board 500, and power circuit boards 600 (e.g., see also FIG. 1).

The display panel 100 may be shaped like a rectangular plane having long sides in the first direction (DR1, X-axis direction) and short sides in the second direction (DR2, Y-axis direction) intersecting the first direction (DR1, X-axis direction). Each corner where a long side extending in the first direction (DR1, X-axis direction) meets a short side extending in the second direction (DR2, Y-axis direction) may be rounded with a curvature (e.g., a predetermined curvature) or may be right-angled. The planar shape of the display panel 100 is not limited to a quadrangular shape but may also be another polygonal shape, a circular shape, or an oval shape. The display panel 100 may be formed flat, but embodiments of the present disclosure are not limited thereto. For example, the display panel 100 may include a curved part formed at left and right ends and having a constant or varying curvature. In addition, the display panel 100 may be formed to be flexible so that it can be curved, bent, folded or rolled.

The display panel 100 may include a display area DA for displaying an image, a first pad unit DPU1 connected to the source circuit board 500, second pad units DPU2 connected to the power circuit boards 600, a first demultiplexer (demux) unit DMX1, and a second demux unit DMX2.

The first pad unit DPU1, the second pad units DPU2, the first demux unit DMX1, and the second demux unit DMX2 may be disposed in the display area DA. In this case, the first pad unit DPU1, the second pad units DPU2, the first demux unit DMX1, and the second demux unit DMX2 may not overlap subpixels RP, GP and BP of the display area DA. For example, each of the first demux unit DMX1 and the second demux unit DMX2 may be disposed between subpixels neighboring each other in the second direction (DR2, Y-axis direction) from among the subpixels RP, GP and BP.

In addition, according to one or more embodiments, the scan driver 110 of FIG. 1 may be disposed in the display area DA. The scan driver 110 may also not overlap the subpixels RP, GP and BP of the display area DA. For example, the scan driver 110 may be disposed between subpixels neighboring each other in the second direction (DR2, Y-axis direction) from among the subpixels RP, GP and BP.

The first pad unit DPU1 may include first data pads respectively connected to fan-out lines. The fan-out lines and the first data pads may be connected one-to-one. The first pad unit DPU1 may be disposed on a side of the display panel 100, for example, on an upper side of the display panel 100. The first data pads of the first pad unit DPU1 may be connected to the source circuit board 500 through a conductive adhesive member such as an anisotropic conductive film.

When the first pad unit DPU1 is disposed on a front surface of the display panel 100, the source circuit board 500 may be disposed to cover an edge of the front surface of the display panel 100, but embodiments of the present specification are not limited thereto. For example, the first data pads of the first pad unit DPU1 may also be disposed on a rear surface of the display panel 100 through holes passing through the display panel 100. In this case, the source circuit board 500 may be disposed on the rear surface of the display panel 100.

The second pad units DPU2 may include second data pads respectively connected to data pad lines and power pads respectively connected to a plurality of power lines. The data pad lines and the second data pads may be connected one-to-one. The power lines and the power pads may be connected one-to-one. The power lines may include a first power line VDL1, a second power line VDL2, a third power line VSL, an initialization voltage line VIL, a gate-on voltage line, and a gate-off voltage line VGHL (e.g., see FIG. 2). The second pad units DPU2 may be disposed on the other side of the display panel 100, for example, on a lower side of the display panel 100. The second data pads of the second pad units DPU2 may be connected to the power circuit boards 600 through a conductive adhesive member such as an anisotropic conductive film.

When the second pad units DPU2 are disposed on the front surface of the display panel 100, the power circuit boards 600 may be disposed to cover an edge of the front surface of the display panel 100, but embodiments of the present specification are not limited thereto. For example, the second data pads of the second pad units DPU2 may also be disposed on the rear surface of the display panel 100 through holes passing through the display panel 100. In this case, the power circuit boards 600 may be disposed on the rear surface of the display panel 100.

The first demux unit DMX1 distributes PWM data voltages applied to each of the fan-out lines through the first pad unit DPU1 to Q (where Q is an integer greater than or equal to 2) PWM data lines DL or Q PAM data lines RDL, GDL and BDL. The first demux unit DMX1 distributes the PWM data voltages applied to each of the fan-out lines through the first pad unit DPU1 to the Q PWM data lines DL in a display mode for displaying an image and a first inspection mode for inspecting whether a first pixel driver PDU1 of each of the subpixels RP, GP and BP operates normally. The first demux unit DMX1 distributes inspection data voltages applied to each of the fan-out lines through the first pad unit DPU1 to the Q PAM data lines RDL, GDL and BDL in a second inspection mode for inspecting whether a second pixel driver PDU2 of each of the subpixels RP, GP and BP operates normally.

The second demux unit DMX2 connects the data pad lines to the PAM data lines RDL, GDL and BDL one-to-one through the second pad units DPU2 in the display mode and the first inspection mode. The second demux unit DMX2 does not connect the data pad lines to the PAM data lines RDL, GDL and BDL through the second pad units DPU2 in the second inspection mode.

The first demux unit DMX1 may be disposed adjacent to the first pad unit DPU1, and the second demux unit DMX2 may be disposed adjacent to the second pad units DPU2. That is, the first demux unit DMX1 may be disposed adjacent to a side of the display panel 100, for example, the upper side of the display panel 100. The second demux DMX2 may be disposed adjacent to the other side of the display panel 100, for example, the lower side of the display panel 100.

The source circuit board 500 may be connected to the first pad unit DPU1. Therefore, the source circuit board 500 may be electrically connected to the fan-out lines connected to the first pad unit DPU1. The source circuit board 500 may be a flexible printed circuit board, a printed circuit board, or a flexible film such as a chip-on film.

The source driver 200 may generate PWM data voltages and supply the PWM data voltages to the display panel 100 through the source circuit board 500. The source driver 200 may be formed as an integrated circuit and attached onto the source circuit board 500. Alternatively, the source driver 200 may be attached onto the front surface or the rear surface of the display panel 100 using a chip-on-glass (COG) method, a chip-on-plastic (COP) method, or an ultrasonic bonding method.

The power circuit boards 600 may be connected to the second pad units DPU2. Therefore, the power circuit boards 600 may be connected to the data pad lines connected to the second pad units DPU2. The power circuit boards 600 may be flexible printed circuit boards, printed circuit boards, or flexible films such as chip-on films.

The power supply units 400 may be formed as integrated circuits and attached onto the power circuit boards 600. The power supply units 400 may output PAM data voltages, a first power supply voltage VDD1, a second power supply voltage VDD2, a third power supply voltage VSS, an initialization voltage VINT, a gate-on voltage VGL, and a gate-off voltage VGH (e.g., see FIG. 1).

Figure 15:
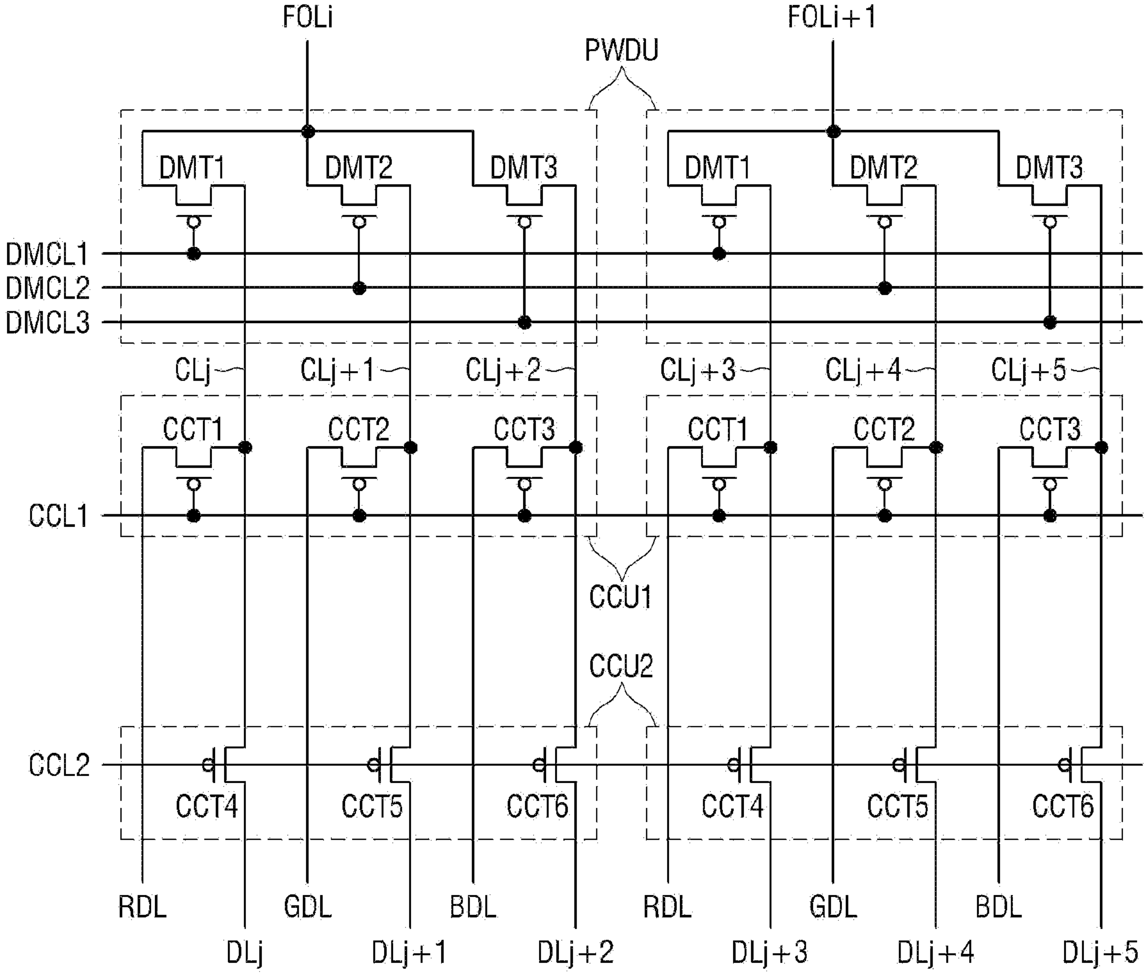
FIG. 15 is a circuit diagram of a first demux unit according to one or more embodiments.

FIG. 15 is a circuit diagram of a first demux unit DMX1 according to one or more embodiments.

Referring to FIG. 15, the first demux unit DMX1 includes PWM data distributors PWDU, first connection controllers CCU1, and second connection controllers CCU2. In FIG. 15, each of the PWM data distributors PWDU, the first connection controllers CCU1, and the second connection controllers CCU2 is connected to three connection lines. In FIG. 15, only six PWM data lines DLj through DLj+5 and six PAM data lines RDL, GDL and BDL are illustrated for ease of description, but the present disclosure is not limited thereto.

Each of the PWM data distributors PWDU distributes voltages applied to a corresponding one of fan-out lines FOLi and FOLi+1 to Q connection lines according to demux control signals applied to demux control lines DMCL1 through DMCL3. That is, each of the PWM data distributors PWDU selectively connects one of the fan-out lines FOLi and FOLi+1 to the Q connection lines according to the demux control signals applied to the demux control lines DMCL1 through DMCL3. Each of the PWM data distributors PWDU may include first through third demux transistors DMT1 through DMT3.

When a first demux control signal of a gate-on voltage is applied to a first demux control line DMCL1, the first demux transistor DMT1 may supply a voltage applied to the fan-out line FOLi/FOLi+1 to a $(3j)^{th}$ connection line CLj/CLj+3. That is, in response to the first demux control signal of the gate-on voltage, the first demux transistor DMT1 may connect the fan-out line FOLi/FOLi+1 to the $(3j)^{th}$ connection line CLj/CLj+3. The first demux transistor DMT1 may have a gate electrode connected to the first demux control line DMCL1, a first electrode connected to the fan-out line FOLi/FOLi+1, and a second electrode connected to the $(3j)^{th}$ connection line CLj/CLj+3.

When a second demux control signal of the gate-on voltage is applied to a second demux control line DMCL2, the second demux transistor DMT2 may supply a voltage applied to the fan-out line FOLi/FOLi+1 to a $(3j+1)^{th}$ connection line CLj+1/CLj+4. That is, in response to the second demux control signal of the gate-on voltage, the second demux transistor DMT2 may connect the fan-out line FOLi/FOLi+1 to the $(3j+1)^{th}$ connection line CLj+1/CLj+4. The second demux transistor DMT2 may have a gate electrode connected to the second demux control line DMCL2, a first electrode connected to the fan-out line FOLi/FOLi+1, and a second electrode connected to the $(3j+1)^{th}$ connection line CLj+1/CLj+4.

When a third demux control signal of the gate-on voltage is applied to a third demux control line DMCL3, the third demux transistor DMT3 may supply a voltage applied to the fan-out line FOLi/FOLi+1 to a $(3j+2)^{th}$ connection line CLj+2/CLj+5. That is, in response to the third demux control signal of the gate-on voltage, the third demux transistor DMT3 may connect the fan-out line FOLi/FOLi+1 to the $(3j+2)^{th}$ connection line CLj+2/CLj+5. The third demux transistor DMT3 may have a gate electrode connected to the third demux control line DMCL3, a first electrode connected to the fan-out line FOLi/FOLi+1, and a second electrode connected to the $(3j+2)^{th}$ connection line CLj+2/CLj+5.

The first connection controllers CCU1 connect the connection lines CLj through CLj+5 respectively to the PAM data lines RDL, GDL and BDL according to a first connection control signal applied to a first connection control line CCL1. Each of the first connection controllers CCU1 may include first through third connection control transistors CCT1 through CCT3.

When the first connection control signal of the gate-on voltage is applied to the first connection control line CCL1, the first connection control transistor CCT1 may connect the $(3j)^{th}$ connection line CLj/CLj+3 to a first PAM data line RDL. The first connection control transistor CCT1 may have a gate electrode connected to the first connection control line CCL1, a first electrode connected to the $(3j)^{th}$ connection line CLj/CLj+3, and a second electrode connected to the first PAM data line RDL.

When the first connection control signal of the gate-on voltage is applied to the first connection control line CCL1, the second connection control transistor CCT2 may connect the $(3j+1)^{th}$ connection line CLj+1/CLj+4 to a second PAM data line GDL. The second connection control transistor CCT2 may have a gate electrode connected to the first connection control line CCL1, a first electrode connected to the $(3j+1)^{th}$ connection line CLj+1/CLj+4, and a second electrode connected to the second PAM data line GDL.

When the first connection control signal of the gate-on voltage is applied to the first connection control line CCL1, the third connection control transistor CCT3 may connect the $(3j+2)^{th}$ connection line CLj+2/CLj+5 to a third PAM data line BDL. The third connection control transistor CCT3 may have a gate electrode connected to the first connection control line CCL1, a first electrode connected to the $(3j+2)^{th}$ connection line CLj+2/CLj+5, and a second electrode connected to the third PAM data line BDL.

The second connection controllers CCU2 connect the connection lines CLj through CLj+5 respectively to the PWM data lines DLj through DLj+5 according to a second connection control signal applied to a second connection control line CCL2. Each of the second connection controllers CCU2 may include fourth through sixth connection control transistors CCT4 through CCT6.

When the second connection control signal of the gate-on voltage is applied to the second connection control line CCL2, the fourth connection control transistor CCT4 may connect the $(3j)^{th}$ connection line CLj/CLj+3 to a $(3j)^{th}$ PWM data line DLj/DLj+3. The fourth connection control transistor CCT4 may have a gate electrode connected to the second connection control line CCL2, a first electrode connected to any one of the $(3j)^{th}$ connection lines CLj and CLj+3, and a second electrode connected to the $(3j)^{th}$ PWM data line DLj/DLj+3.

When the second connection control signal of the gate-on voltage is applied to the second connection control line CCL2, the fifth connection control transistor CCT5 may connect the $(3j+1)^{th}$ connection line CLj+1/CLj+4 to a $(3j+1)^{th}$ PWM data line DLj+1/DLj+4. The fifth connection control transistor CCT5 may have a gate electrode connected to the second connection control line CCL2, a first electrode connected to the $(3j+1)^{th}$ connection line CLj+1/CLj+4, and a second electrode connected to the $(3j+1)^{th}$ PWM data line DLj+1/DLj+4.

When the second connection control signal of the gate-on voltage is applied to the second connection control line CCL2, the sixth connection control transistor CCT6 may connect the $(3j+2)^{th}$ connection line CLj+2/CLj+5 to a $(3j+2)^{th}$ PWM data line DLj+2/DLj+5. The sixth connection control transistor CCT6 may have a gate electrode connected to the second connection control line CCL2, a first electrode connected to the $(3j+2)^{th}$ connection line CLj+2/CLj+5, and a second electrode connected to the $(3j+2)^{th}$ PWM data line DLj+2/DLj+5.

As illustrated in FIG. 15, the first demux unit DMX1 selectively connects each of the fan-out lines FOLi and FOLi+1 to Q PAM data lines or Q PWM data lines according to the first connection control signal and the second connection control signal. Therefore, the first demux unit DMX1 may distribute voltages applied to each of the fan-out lines FOLi and FOLi+1 to the Q PAM data lines from among the PAM data lines RDL, GDL and BDL or to the Q PWM data lines from among the PWM data lines DLj through DLj+5 according to the first connection control signal and the second connection control signal.

In addition, the first demux unit DMX1 may switch the connection lines CLj through CLj+5 to either the PWM data lines DLj through DLj+5 or the PAM data lines RDL, GDL and BDL through the first connection controller CCU1 and the second connection controller CCU2.

Figure 16:
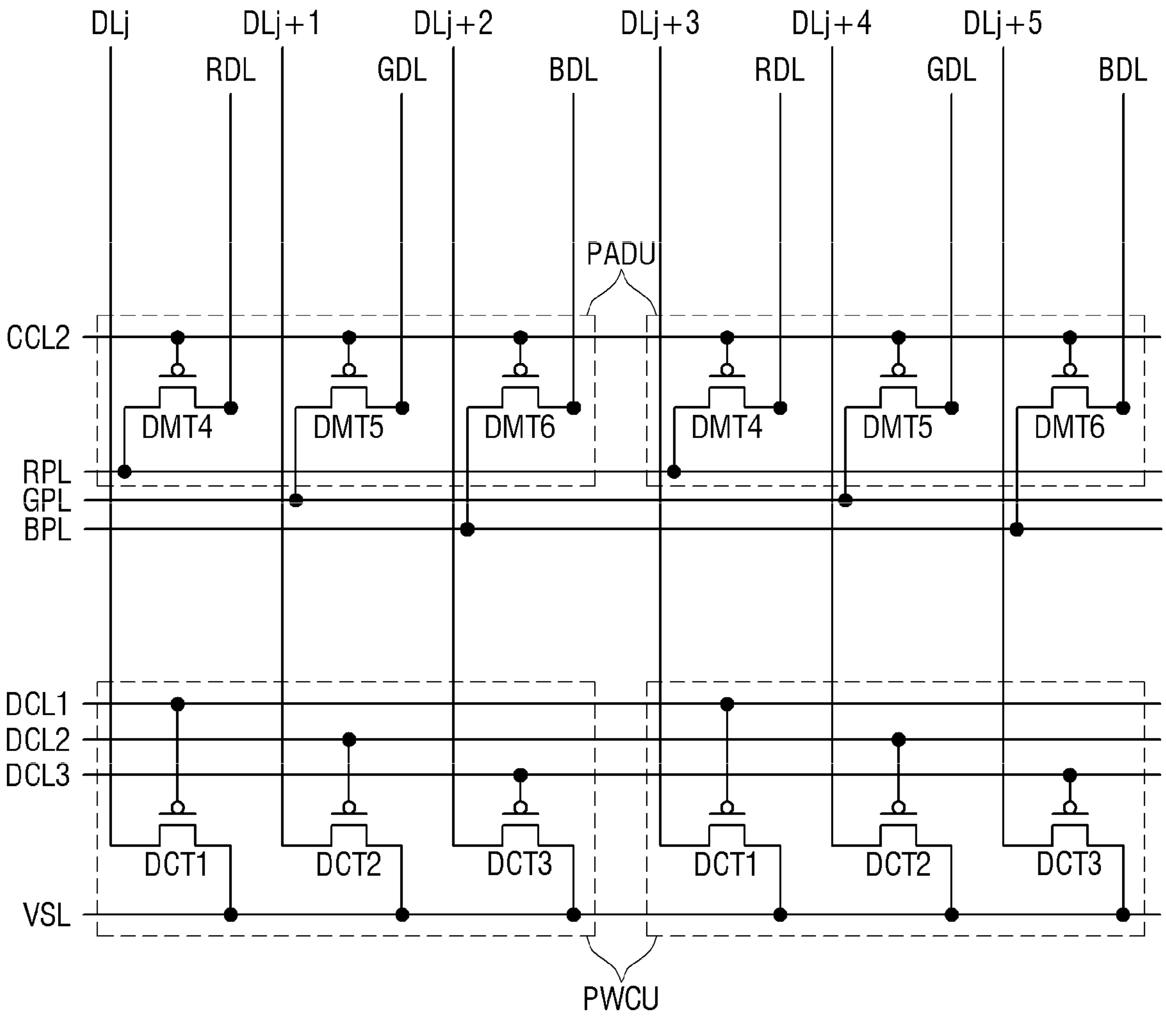
FIG. 16 is a circuit diagram of a second demux unit according to one or more embodiments.

FIG. 16 is a circuit diagram of a second demux unit DMX2 according to one or more embodiments.

Referring to FIG. 16, the second demux unit DMX2 includes PAM data distributors PADU and PWM controllers PWCU. In FIG. 16, each of the PAM data distributors PADU may be connected to a first data pad line RPL, a second data pad line GPL, a third data pad line BPL, a first PAM data line RDL, a second PAM data line GDL, and a third PAM data line BDL. Each of the PWM controllers PWCU may be connected to three PWM data lines. In FIG. 16, only six PWM data lines DLj through DLj+5 and six PAM data lines RDL, GDL and BDL are illustrated for ease of description.

Each of the PAM data distributors PADU connects the data pad lines RPL, GPL and BPL respectively to the PAM data lines RDL, GDL and BDL according to a second connection control signal applied to a second connection control line CCL2. That is, each of the PAM data distributors PADU may connect the first data pad line RPL to a corresponding first PAM data line RDL, connect the second data pad line GPL to a corresponding second PAM data line GDL, and connect the third data pad line BPL to a corresponding third PAM data line BDL according to the second connection control signal applied to the second connection control line CCL2. Each of the PAM data distributors PADU may include fourth through sixth demux transistors DMT4 through DMT6.

When the second connection control signal of a gate-on voltage is applied to the second connection control line CCL2, the fourth demux transistor DMT4 connects the first data pad line RPL to a first PAM data line RDL. The fourth demux transistor DMT4 may have a gate electrode connected to the second connection control line CCL2, a first electrode connected to the first data pad line RPL, and a second electrode connected to the first PAM data line RDL.

When the second connection control signal of the gate-on voltage is applied to the second connection control line CCL2, the fifth demux transistor DMT5 connects the second data pad line GPL to a second PAM data line GDL. The fifth demux transistor DMT5 may have a gate electrode connected to the second connection control line CCL2, a first electrode connected to the second data pad line GPL, and a second electrode connected to the second PAM data line GDL.

When the second connection control signal of the gate-on voltage is applied to the second connection control line CCL2, the sixth demux transistor DMT6 connects the third data pad line BPL to a third PAM data line BDL. The sixth demux transistor DMT6 may have a gate electrode connected to the second connection control line CCL2, a first electrode connected to the third data pad line BPL, and a second electrode connected to the third PAM data line BDL.

The PWM controllers PWCU connect the PWM data lines DLj through DLj+5 to a third power line VSL according to PWM control signals applied to PWM control lines DCL1 through DCL3. That is, each of the PWM controllers PWCU applies a third power supply voltage of the third power line VSL to a $(3j)^{th}$ data line DLj/DLj+3 according to a first PWM control signal applied to a first PWM control line DCL1, applies the third power supply voltage of the third power line VSL to a $(3j+1)^{th}$ data line DLj+1/DLj+4 according to a second PWM control signal applied to a second PWM control line DCL2, and applies the third power supply voltage of the third power line VSL to a $(3j+2)^{th}$ data line DLj+2/DLj+5 according to a third PWM control signal applied to a third PWM control line DCL3. Each of the PWM controllers PWCU may include a first PWM control transistor DCT1, a second PWM control transistor DCT2, and a third PWM control transistor DCT3.

When the first PWM control signal of the gate-on voltage is applied to the first PWM control line DCL1, the first PWM control transistor DCT1 connects the $(3j)^{th}$ data line DLj/DLj+3 to the third power line VSL. The first PWM control transistor DCT1 may have a gate electrode connected to the first PWM control line DCL1, a first electrode connected to the $(3j)^{th}$ data line DLj/DLj+3, and a second electrode connected to the third power line VSL.

When the second PWM control signal of the gate-on voltage is applied to the second PWM control line DCL2, the second PWM control transistor DCT2 connects the $(3j+1)^{th}$ data line DLj+1/DLj+4 to the third power line VSL. The second PWM control transistor DCT2 may have a gate electrode connected to the second PWM control line DCL2, a first electrode connected to the $(3j+1)^{th}$ data line DLj+1/DLj+4, and a second electrode connected to the third power line VSL.

When the third PWM control signal of the gate-on voltage is applied to the third PWM control line DCL3, the third PWM control transistor DCT3 connects the $(3j+2)^{th}$ data line DLj+2/DLj+5 to the third power line VSL. The third PWM control transistor DCT3 may have a gate electrode connected to the third PWM control line DCL3, a first electrode connected to the $(3j+2)^{th}$ data line DLj+2/DLj+5, and a second electrode connected to the third power line VSL.

As illustrated in FIG. 16, the second demux unit DMX2 may connect the data pad lines RPL, GPL and BPL respectively to the PAM data lines RDL, GDL and BDL according to the second connection control signal and may connect the PWM data lines DLj through DLj+5 to the third power line VSL according to the PWM control signals.

Figure 17:
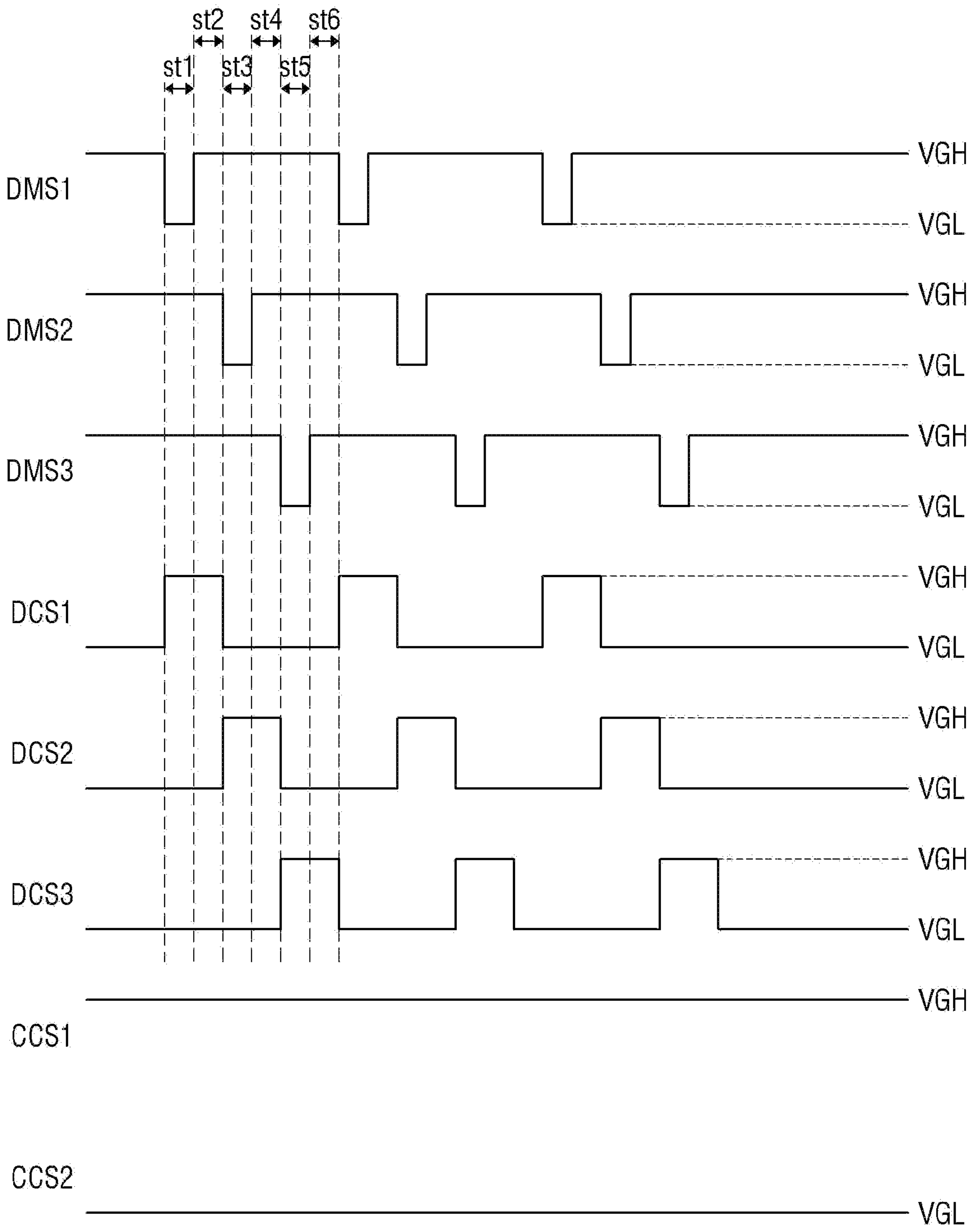
FIG. 17 is a waveform diagram of first through third demux control signals, first through third PWM control signals, a first connection control signal, and a second connection control signal input to the first demux unit and the second demux unit in a first mode.
Figure 18:
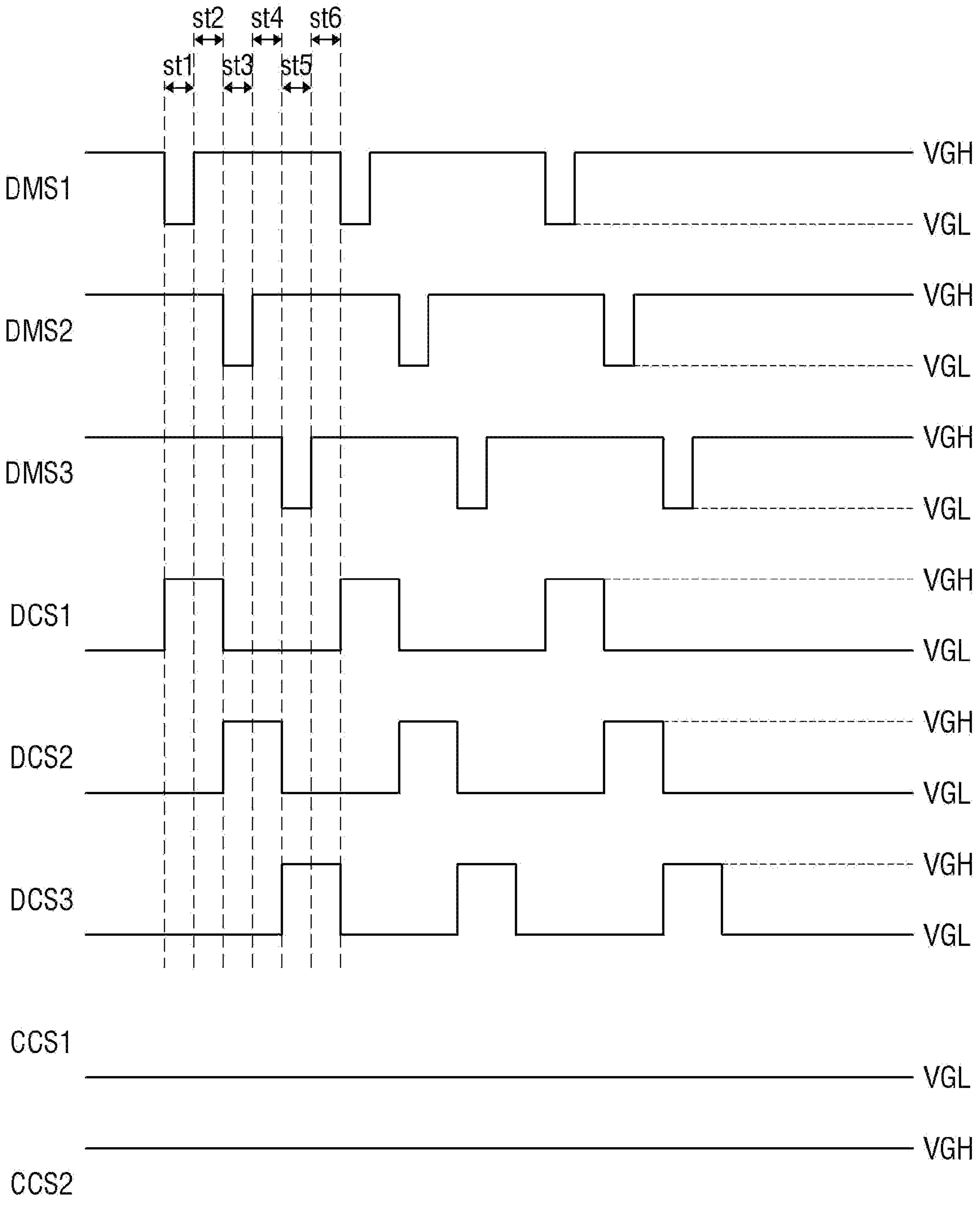
FIG. 18 is a waveform diagram of the first through third demux control signals, the first through third PWM control signals, the first connection control signal, and the second connection control signal input to the first demux unit and the second demux unit in a second mode.

FIG. 17 is a waveform diagram of first through third demux control signals DMS1 through DMS3, first through third PWM control signals DCS1 through DCS3, a first connection control signal CCS1, and a second connection control signal CCS2 input to the first demux unit DMX1 and the second demux unit DMX2 in a first mode. FIG. 18 is a waveform diagram of the first through third demux control signals DMS1 through DMS3, the first through third PWM control signals DCS1 through DCS3, the first connection control signal CCS1, and the second connection control signal CCS2 input to the first demux unit DMX1 and the second demux unit DMX2 in a second mode.

Referring to FIG. 17, the first mode includes the display mode in which the subpixels RP, GP and BP display an image and the first inspection mode in which whether the first pixel driver PDU1 of each of the subpixels RP, GP and BP operates normally is inspected. The second mode includes the second inspection mode in which whether the second pixel driver PDU2 of each of the subpixels RP, GP and BP operates normally is inspected. Each of the first mode and the second mode includes first through sixth sub-periods st1 through st6.

Each of the first demux control signal DMS1, the second demux control signal DMS2, and the third demux control signal DMS3 may be a signal that is repeated (e.g., repeated with a predetermined cycle). For example, each of the first demux control signal DMS1, the second demux control signal DMS2, and the third demux control signal DMS3 may be a signal that is repeated with a cycle of three horizontal periods.

One cycle may include first through sixth sub-periods st1 through st6. For example, the first through sixth sub-periods st1 through st6 may be repeated with a cycle of three horizontal periods.

The first demux control signal DMS1 may be generated as the gate-on voltage VGL during the first sub-period st1 and may be generated as the gate-off voltage VGH during the second through sixth sub-periods st2 through st6. The second demux control signal DMS2 may be generated as the gate-on voltage VGL during the third sub-period st3 and may be generated as the gate-off voltage VGH during the first, second and fourth through sixth sub-periods st1, st2 and st4 through st6. The third demux control signal DMS3 may be generated as the gate-on voltage VGL during the fifth sub-period st5 and may be generated as the gate-off voltage VGH during the first through fourth and sixth sub-periods st1 through st4 and st6.

Each of the first PWM control signal DCS1, the second PWM control signal DCS2, and the third PWM control signal DCS3 may be a signal that is repeated (e.g., repeated with a predetermined cycle). For example, each of the first PWM control signal DCS1, the second PWM control signal DCS2, and the third PWM control signal DCS3 may be a signal that is repeated with a cycle of three horizontal periods.

The first PWM control signal DCS1 may be generated as the gate-off voltage VGH during the first and second sub-periods st1 and st2 and may be generated as the gate-on voltage VGL during the third through sixth sub-periods st3 through st6. The second PWM control signal DCS2 may be generated as the gate-off voltage VGH during the third and fourth sub-periods st3 and st4 and may be generated as the gate-on voltage VGL during the first, second, fifth and sixth sub-periods st1, st2, st5 and st6.

The third PWM control signal DCS3 may be generated as the gate-off voltage VGH during the fifth and sixth sub-periods st5 and st6 and may be generated as the gate-on voltage VGL during the first through fourth sub-periods st1 through st4.

The first connection control signal CCS1 may be generated as the gate-off voltage VGH in the first mode. In contrast, the first connection control signal CCS1 may be generated as the gate-on voltage VGL in the second mode.

The second connection control signal CCS2 may be generated as the gate-on voltage VGL in the first mode. In contrast, the second connection control signal CCS2 may be generated as the gate-off voltage VGH in the second mode.

Figure 19:
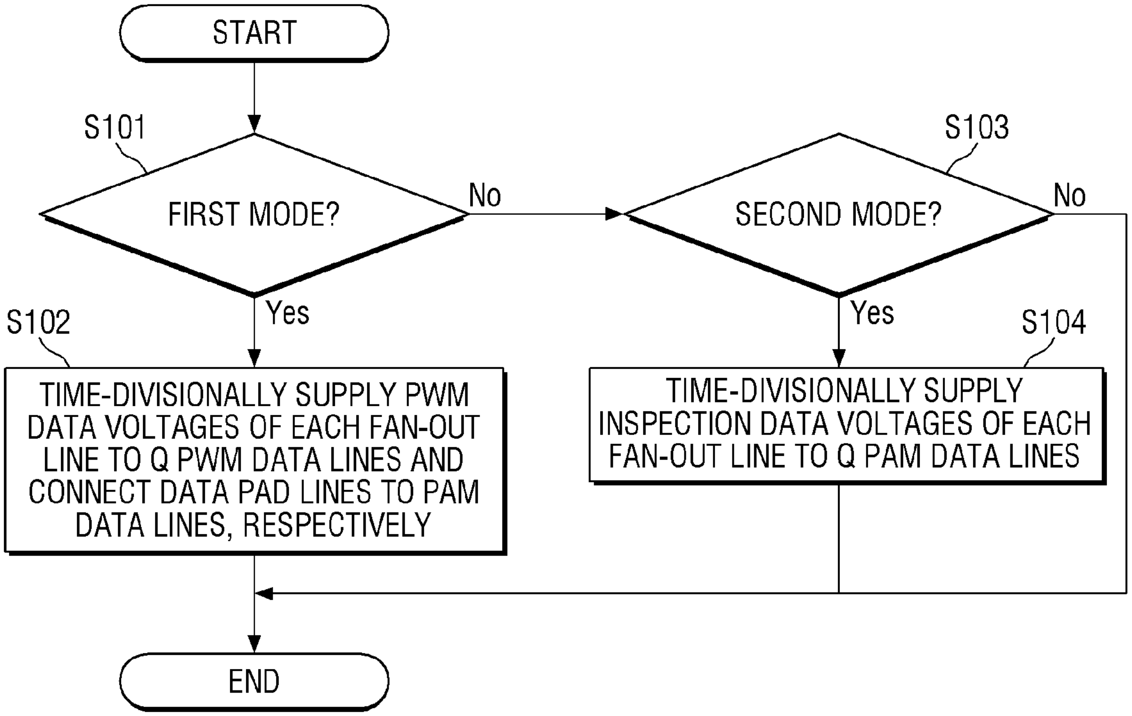
FIG. 19 is a flowchart illustrating a method of inspecting a display device according to one or more embodiments.

FIG. 19 is a flowchart illustrating a method of inspecting a display device according to one or more embodiments.

The method of inspecting the display device according to the embodiment will now be described with reference to FIGS. 15 through 19.

First, in a first mode, a first demux unit DMX1 may time-divisionally supply PWM data voltages applied to each of fan-out lines FOLi and FOLi+1 to Q PWM data lines, and a second demux unit DMX2 may connect data pad lines RPL, GPL and BPL, to which PAM data voltages are applied, to PAM data lines RDL, GDL and BDL, respectively (e.g., see operations S101 and S102 of FIG. 19).

Specifically, in the first mode, a first connection control signal CCS1 of a gate-off voltage VGH is applied to a first connection control line CCL1. In addition, in the first mode, a second connection control signal CCS2 of a gate-on voltage VGL is applied to a second connection control line CCL2.

In the first mode, first through third connection control transistors CCT1 through CCT3 of the first demux unit DMX1 may be turned off by the first connection control signal CCS1 of the gate-off voltage VGH, and fourth through sixth connection control transistors CCT4 through CCT6 of the first demux unit DMX1 may be turned on by the second connection control signal CCS2 of the gate-on voltage VGL. Therefore, in the first mode, connection lines CLj through CLj+5 may be connected one-to-one to PWM data lines DLj through DLj+5. That is, in the first mode, a $j^{th}$ connection line CLj may be connected to a $j^{th}$ PWM data line DLj, a $(j+1)^{th}$ connection line CLj+1 may be connected to a $(j+1)^{th}$ PWM data line DLj+1, a $(j+2)^{th}$ connection line CLj+2 may be connected to a $(j+2)^{th}$ PWM data line DLj+2, a $(j+3)^{th}$ connection line CLj+3 may be connected to a $(j+3)^{th}$ PWM data line DLj+3, a $(j+4)^{th}$ connection line CLj+4 may be connected to a $(j+4)^{th}$ PWM data line DLj+4, and a $(j+5)^{th}$ connection line CLj+5 may be connected to a $(j+5)^{th}$ PWM data line DLj+5.

In addition, in the first mode, fourth through sixth demux transistors DMT4 through DMT6 of the second demux unit DMX2 may be turned on by the second connection control signal CCS2 of the gate-on voltage VGL. Therefore, in the first mode, the data pad lines RPL, GPL and BPL to which the PAM data voltages are applied may be connected to the PAM data line RDL, GDL and BDL, respectively.

That is, in the first mode, each first data pad line RPL may be connected to a corresponding first PAM data line RDL, each second data pad line GPL may be connected to a corresponding second PAM data line GDL, and each third data pad line BPL may be connected to a corresponding third PAM data line BDL. In this case, a first PAM data voltage may be applied to each first PAM data line RDL, a second PAM data voltage may be applied to each second PAM data line GDL, and a third PAM data voltage may be applied to each third PAM data line BDL.

In the first mode, during a first sub-period st1, a first demux control signal DMS1 is generated as the gate-on voltage VGL, and the first connection control signal CCS1 is generated as the gate-off voltage VGH. Because first demux transistors DMT1 are turned on and first PWM control transistors DCT1 are turned off during the first sub-period st1, an $i^{th}$ fan-out line FOL1 may be connected to the $j^{th}$ data line DLj, and an $(i+1)^{th}$ fan-out line FOLi+1 may be connected to the $(j+3)^{th}$ data line DLj+3. During the first sub-period st1, a PWM data voltage of the $i^{th}$ fan-out line FOLi may be applied to the $j^{th}$ data line DLj, and a PWM data voltage of the $(i+1)^{th}$ fan-out line FOLi+1 may be applied to the $(j+3)^{th}$ data line DLj+3.

In the first mode, during a second sub-period st2, the first demux control signal DMS1 is generated as the gate-off voltage VGH, and the first connection control signal CCS1 is generated as the gate-off voltage VGH. Because the first demux transistors DMT1 and the first PWM control transistors DCT1 are turned off during the second sub-period st2, the $j^{th}$ data line DLj may maintain the PWM data voltage, and the $(j+3)^{th}$ data line DLj+3 may maintain the PWM data voltage.

In the first mode, during third through sixth sub-periods sp3 through sp6, the first demux control signal DMS1 is generated as the gate-off voltage VGH, and the first connection control signal CCS1 is generated as the gate-on voltage VGL. During the third through sixth sub-periods sp3 through sp6, the first demux transistors DMT1 may be turned off, and the first PWM control transistors DCT1 may be turned on. Therefore, during the third through sixth sub-periods sp3 through sp6, each of the $j^{th}$ data line DLj and the $(j+3)^{th}$ data line DLj+3 may be connected to a third power line VSL. Accordingly, during the third through sixth sub-periods sp3 through sp6, a third power supply voltage may be applied to each of the $j^{th}$ data line DLj and the $(j+3)^{th}$ data line DLj+3.

Similarly, in the first mode, during the third sub-period st3, a second demux control signal DMS2 is generated as the gate-on voltage VGL, and the second connection control signal CCS2 is generated as the gate-off voltage VGH. Because second demux transistors DMT2 are turned on and second PWM control transistors DCT2 are turned off during the third sub-period st3, the $i^{th}$ fan-out line FOL1 may be connected to the $(j+1)^{th}$ data line DLj+1, and the $(i+1)^{th}$ fan-out line FOLi+1 may be connected to the $(j+4)^{th}$ data line DLj+4. During the third sub-period st3, the PWM data voltage of the $i^{th}$ fan-out line FOLi may be applied to the $(j+1)^{th}$ data line DLj+1, and the PWM data voltage of the $(i+1)^{th}$ fan-out line FOLi+1 may be applied to the $(j+4)^{th}$ data line DLj+4.

In the first mode, during the fourth sub-period st4, the second demux control signal DMS2 is generated as the gate-off voltage VGH, and the second connection control signal CCS2 is generated as the gate-off voltage VGH. Because the second demux transistors DMT2 and the second PWM control transistors DCT2 are turned off during the fourth sub-period st4, the $(j+1)^{th}$ data line DLj may maintain the PWM data voltage, and the $(j+4)^{th}$ data line DLj+4 may maintain the PWM data voltage.

In the first mode, during the first, second, fifth and sixth sub-periods sp1, sp2, sp5 and sp6, the second demux control signal DMS2 is generated as the gate-off voltage VGH, and the second connection control signal CCS2 is generated as the gate-on voltage VGL. During the first, second, fifth and sixth sub-periods sp1, sp2, sp5 and sp6, the second demux transistors DMT2 may be turned off, and the second PWM control transistors DCT2 may be turned on. Therefore, during the first, second, fifth and sixth sub-periods sp1, sp2, sp5 and sp6, each of the $(j+1)^{th}$ data line DLj+1 and the $(j+4)^{th}$ data line DLj+4 may be connected to the third power line VSL. Accordingly, during the first, second, fifth and sixth sub-periods sp1, sp2, sp5 and sp6, the third power supply voltage may be applied to each of the $(j+1)^{th}$ data line DLj+1 and the $(j+4)^{th}$ data line DLj+4.

Similarly, in the first mode, during the fifth sub-period st5, a third demux control signal DMS3 is generated as the gate-on voltage VGL, and a third connection control signal CCS3 is generated as the gate-off voltage VGH. Because third demux transistors DMT3 are turned on and third PWM control transistors DCT3 are turned off during the fifth sub-period st5, the $i^{th}$ fan-out line FOL1 may be connected to the $(j+2)^{th}$ data line DLj+2, and the $(i+1)^{th}$ fan-out line FOLi+1 may be connected to the $(j+5)^{th}$ data line DLj+5. During the fifth sub-period st5, the PWM data voltage of the $i^{th}$ fan-out line FOLi may be applied to the $(j+2)^{th}$ data line DLj+2, and the PWM data voltage of the $(i+1)^{th}$ fan-out line FOLi+1 may be applied to the $(j+5)^{th}$ data line DLj+5.

In the first mode, during the sixth sub-period st6, the third demux control signal DMS3 is generated as the gate-off voltage VGH, and the third connection control signal CCS3 is generated as the gate-off voltage VGH. Because the third demux transistors DMT3 and the third PWM control transistors DCT3 are turned off during the sixth sub-period st6, the $(j+2)^{th}$ data line DLj+2 may maintain the PWM data voltage, and the $(j+5)^{th}$ data line DLj+5 may maintain the PWM data voltage.

In the first mode, during the first through fourth sub-periods sp1 through sp4, the third demux control signal DMS3 is generated as the gate-off voltage VGH, and the third connection control signal CCS3 is generated as the gate-on voltage VGL. During the first through fourth sub-periods sp1 through sp4, the third demux transistors DMT3 may be turned off, and the third PWM control transistors DCT3 may be turned on. Therefore, during the first through fourth sub-periods sp1 through sp4, each of the $(j+2)^{th}$ data line DLj+2 and the $(j+5)^{th}$ data line DLj+5 may be connected to the third power line VSL. Accordingly, during the first through fourth sub-periods sp1 through sp4, the third power supply voltage may be applied to each of the $(j+2)^{th}$ data line DLj+2 and the $(j+5)^{th}$ data line DLj+5.

As described above, in the first mode, during the first sub-period st1 and the second sub-period st2, the PWM data voltages of the fan-out lines FOLi and FOLi+1 may be applied to $(3j)^{th}$ PWM data lines DLj and DLj+3, respectively. During the third sub-period st3 and the fourth sub-period st4, the PWM data voltages of the fan-out lines FOLi and FOLi+1 may be applied to $(3j+1)^{th}$ PWM data lines DLj+1 and DLj+4, respectively. During the fifth sub-period st5 and the sixth sub-period st6, the PWM data voltages of the fan-out lines FOLi and FOLi+1 may be applied to $(3j+2)^{th}$ PWM data lines DLj+2 and DLj+5, respectively. In addition, in the first mode, during the first through sixth sub-periods sp1 through sp6, the PAM data voltages of the data pad lines RPL, GPL and BPL may be applied to the PAM data lines RDL, GDL and BDL, respectively. Accordingly, in the first mode, light emitting elements EL of the subpixels RP, GP and BP may emit light according to the PWM data voltages applied to the PWM data lines DLj through DLj+5 and the PAM data voltages applied to the PAM data lines RDL, GDL and BDL. Therefore, in the first mode, it may be possible to inspect whether the subpixels RP, GP and BP display an image or whether a first pixel driver PDU1 of each of the subpixels RP, GP and BP operates normally.

Second, in the second mode, the first demux unit DMX1 may time-divisionally supply inspection data voltages applied to each of the fan-out lines FOLi and FOLi+1 to Q PAM data lines, and the second demux unit DMX2 may not connect the data pad lines RPL, GPL and BPL, to which the PAM data voltages are applied, to the PAM data lines RDL, GDL and BDL, respectively (e.g., see operations S103 and S104 of FIG. 19).

Specifically, in the second mode, the first connection control signal CCS1 of the gate-on voltage VGL is applied to the first connection control line CCL1. In addition, in the second mode, the second connection control signal CCS2 of the gate-off voltage VGH is applied to the second connection control line CCL2.

In the second mode, the first through third connection control transistors CCT1 through CCT3 of the first demux unit DMX1 may be turned on by the first connection control signal CCS1 of the gate-on voltage VGL, and the fourth through sixth connection control transistors CCT4 through CCT6 of the first demux unit DMX1 may be turned off by the second connection control signal CCS2 of the gate-off voltage VGH. Therefore, in the second mode, the connection lines CLj through CLj+5 may be connected one-to-one to the PAM data lines RDL, GDL and BDL. That is, in the second mode, the $j^{th}$ connection line CLj may be connected to a first PAM data line RDL, the $(j+1)^{th}$ connection line CLj+1 may be connected to a second PAM data line GDL, the $(j+2)^{th}$ connection line CLj+2 may be connected to a third PAM data line BDL, the $(j+3)^{th}$ connection line CLj+3 may be connected to a first PAM data line RDL, the $(j+4)^{th}$ connection line CLj+4 may be connected to a second PAM data line GDL, and the $(j+5)^{th}$ connection line CLj+5 may be connected to a third PAM data line BDL.

In addition, in the second mode, the fourth through sixth demux transistors DMT4 through DMT6 of the second demux unit DMX2 may be turned off by the second connection control signal CCS2 of the gate-off voltage VGH. Therefore, in the second mode, the data pad lines RPL, GPL and BPL to which the PAM data voltages are applied may not be connected to the PAM data line RDL, GDL and BDL, respectively.

The operation of the first through third demux transistors DMT1 through DMT3 during the first through sixth sub-periods sp1 through sp6 in the second mode is substantially the same as that during the first through sixth sub-periods sp1 through sp6 in the first mode, and thus a description thereof will be omitted.

In summary, in the second mode, during the first sub-period st1 and the second sub-period st2, the inspection data voltages of the fan-out lines FOLi and FOLi+1 may be applied to the first PAM data lines RDL, respectively. During the third sub-period st3 and the fourth sub-period st4, the inspection data voltages of the fan-out lines FOLi and FOLi+1 may be applied to the second PAM data lines GDL, respectively. During the fifth sub-period st5 and the sixth sub-period st6, the inspection data voltages of the fan-out lines FOLi and FOLi+1 may be applied to the third PAM data lines BDL, respectively.

Because the first PAM data lines RDL are commonly connected to the first data pad line RPL, the second PAM data lines GDL are commonly connected to the second data pad line GPL, and the third PAM data lines BDL are commonly connected to the third data pad line BPL through the second demux unit DMX2, it may be impossible to apply an independent inspection data voltage to each of the PAM data lines RDL, GDL and BDL. However, the first demux DMX1 time-divisionally supplies the inspection data voltages applied to the fan-out lines FOLi and FOLi+1 to Q PAM data lines in the second mode. Accordingly, an independent inspection data voltage can be applied to each of the PAM data lines RDL, GDL and BDL. Therefore, because the light emitting elements EL of the subpixels RP, GP and BP may emit light according to the inspection data voltages of the PAM data lines RDL, GDL and BDL in the second mode, it may be possible to inspect whether a second pixel driver PDU2 operates normally.

Figure 20:
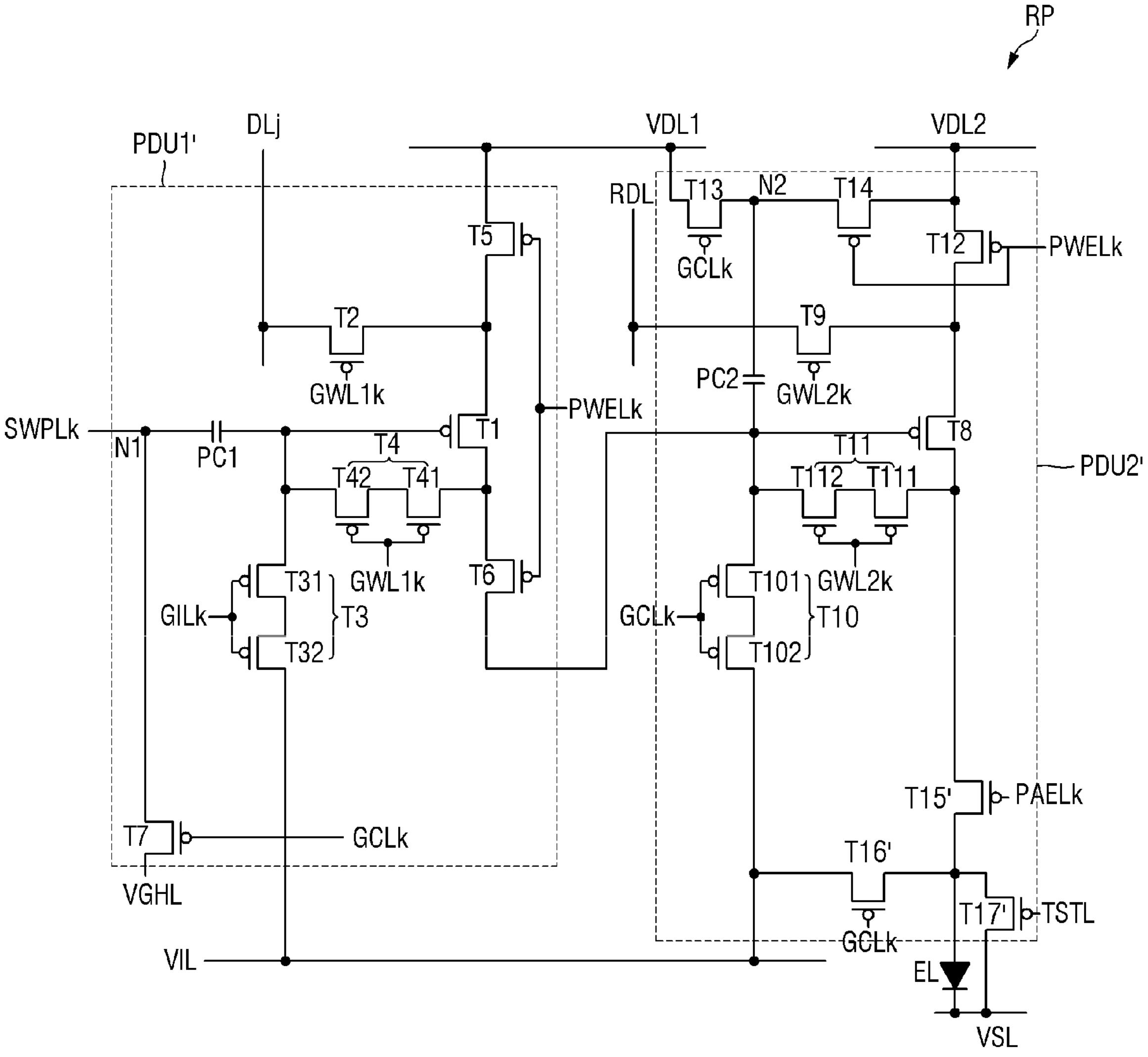
FIG. 20 is a circuit diagram of a first subpixel according to one or more embodiments.

FIG. 20 is a circuit diagram of a first subpixel RP according to one or more embodiments.

The embodiment of FIG. 20 is different from the embodiment of FIG. 2 in that a fifteenth transistor T15, a sixteenth transistor T16 and a third capacitor PC3 are removed, and a seventeenth transistor T17, an eighteenth transistor T18 and a nineteenth transistor T19 are changed to a fifteenth transistor T15', a sixteenth transistor T16' and a seventeenth transistor T17'. In reference to FIG. 20, differences from the embodiment of FIG. 2 will be mainly described.

Referring to FIG. 20, a sixth transistor T6 of a first pixel driver PDU1' is turned on by a $k^{th}$ PWM emission signal of a $k^{th}$ PWM emission line PWELk to connect a second electrode of a first transistor T1 to a gate electrode of an eighth transistor T8. The sixth transistor T6 may have a gate electrode connected to the $k^{th}$ PWM emission line PWELk, a first electrode connected to the second electrode of the first transistor T1, and a second electrode connected to the gate electrode of the eighth transistor T8.

The second pixel driver PDU2' may include the fifteenth through seventeenth transistors T15' through T17' in addition to eighth through fourteenth transistors T8 through T14.

The fifteenth transistor T15' is turned on by a $k^{th}$ PAM emission signal of a PAM emission line PAELk to connect a second electrode of the eighth transistor T8 to a first electrode of a light emitting element EL. The fifteenth transistor T15' may have a gate electrode connected to the $k^{th}$ PAM emission line PAELk, a first electrode connected to the second electrode of the eighth transistor T8, and a second electrode connected to the first electrode of the light emitting element EL.

The sixteenth transistor T16' is turned on by a $k^{th}$ scan control signal of a $k^{th}$ scan control line GCLk to connect an initialization voltage line VIL to the first electrode of the light emitting element EL. Therefore, during a period in which the sixteenth transistor T16' is turned on, the first electrode of the light emitting element EL may be discharged to an initialization voltage of the initialization voltage line VIL. The sixteenth transistor T16' may have a gate electrode connected to the $k^{th}$ scan control line GCLk, a first electrode connected to the first electrode of the light emitting element EL, and a second electrode connected to the initialization voltage line VIL.

The seventeenth transistor T17' is turned on by a test signal of a test signal line TSTL to connect the first electrode of the light emitting element EL to a third power line VSL. The seventeenth transistor T17' may have a gate electrode connected to the test signal line TSTL, a first electrode connected to the first electrode of the light emitting element EL, and a second electrode connected to the third power line VSL.

Any one of the first electrode and the second electrode of each of the fifteenth through seventeenth transistors T15' through T17' may be a source electrode, and the other may be a drain electrode. An active layer of each of the fifteenth through seventeenth transistors T15' through T17' may be made of any one of polysilicon, amorphous silicon, and an oxide semiconductor. When the active layer of each of the fifteenth through seventeenth transistors T15' through T17' is polysilicon, it may be formed by an LTPS process.

In addition, although a case where each of the fifteenth through seventeenth transistors T15' through T17' is formed as a P-type MOSFET has been mainly illustrated in FIG. 20, embodiments of the present specification are not limited thereto. For example, each of the fifteenth through seventeenth transistors T15' through T17' may also be formed as an N-type MOSFET.

A second subpixel GP and a third subpixel BP according to one or more embodiments may be substantially the same as the first subpixel RP described above with reference to FIG. 20. Therefore, a description of the second subpixel GP and the third subpixel BP according to the one or more embodiments will be omitted.

Figure 21:
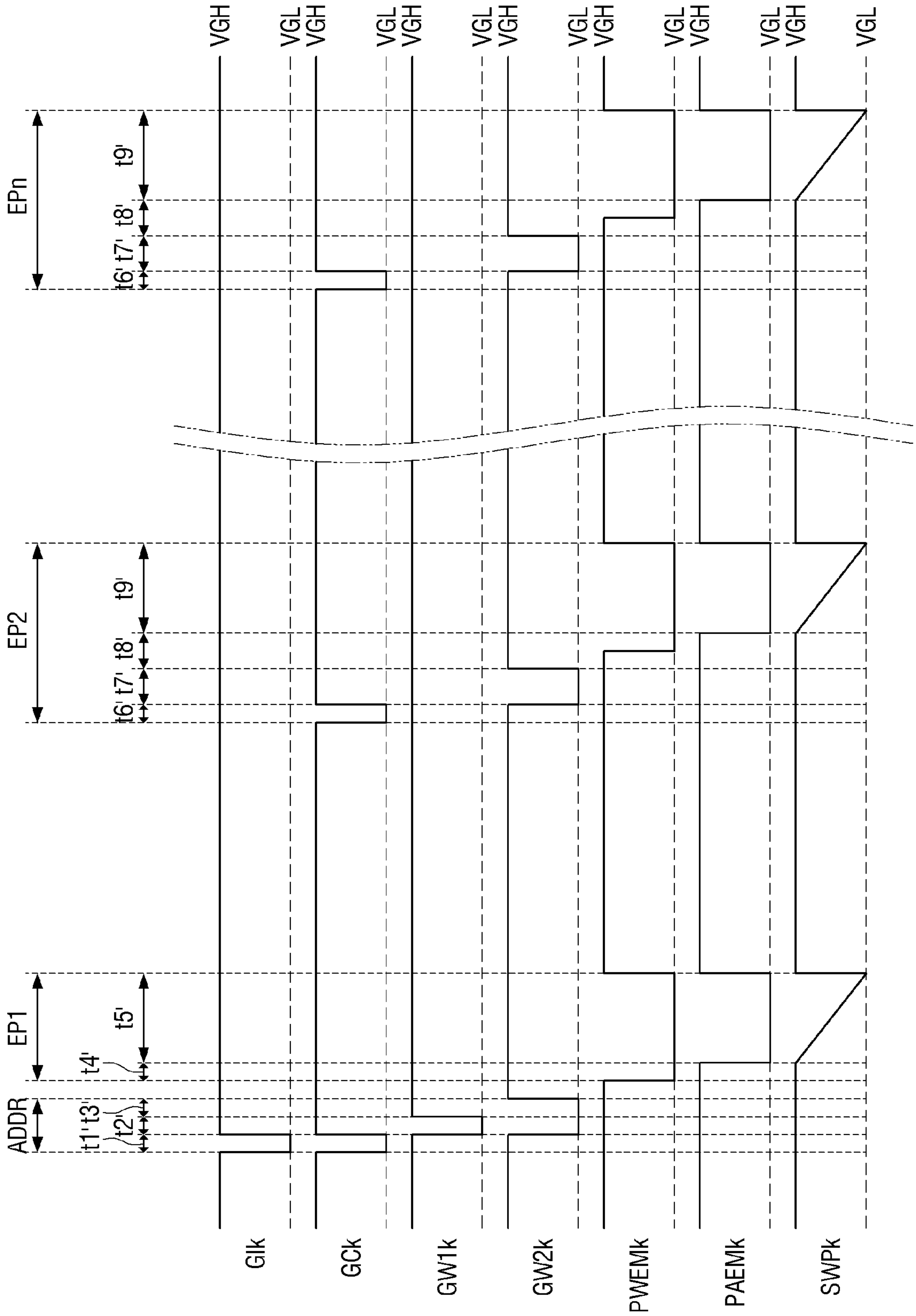
FIG. 21 is a waveform diagram illustrating periods in which a $k^{th}$ scan initialization signal, a $k^{th}$ scan write signal, a $k^{th}$ scan control signal, a $k^{th}$ PWM emission signal, a $k^{th}$ PAM emission signal and a $k^{th}$ sweep signal applied to each of subpixels disposed in a $k^{th}$ row line in an $N^{th}$ frame period according to one or more embodiments.

FIG. 21 is a waveform diagram illustrating periods in which a $k^{th}$ scan initialization signal GIk, a $k^{th}$ scan control signal GCk, a $k^{th}$ scan PWM write signal GW1 k, a $k^{th}$ scan PAM write signal GW2k, a $k^{th}$ PWM emission signal PWEMk, a $k^{th}$ PAM emission signal PAEMk and a $k^{th}$ sweep signal SWPk applied to each of subpixels RP, GP and BP disposed in a $k^{th}$ row line in an $N^{th}$ frame period according to one or more embodiments.

The embodiment of FIG. 21 is different from the embodiment of FIG. 8 in that the waveform of the $k^{th}$ scan control signal GCk is changed, the $k^{th}$ scan write signal GWk is replaced with the $k^{th}$ scan PWM write signal GW1 k, and the $k^{th}$ scan PAM write signal GW2k is added.

Referring to FIG. 21, the $k^{th}$ scan initialization signal GIk is a signal for controlling the turn-on and turn-off of the third and tenth transistors T3 and T10 of each of the subpixels RP, GP and BP. The $k^{th}$ scan control signal GCk is a signal for controlling the turn-on and turn-off of the seventh, thirteenth and sixteenth transistors T7, T13 and T16' of each of the subpixels RP, GP and BP. The $k^{th}$ scan PWM write signal GW1 k is a signal for controlling the turn-on and turn-off of second and fourth transistors T2 and T4 of each of the subpixels RP, GP and BP. The $k^{th}$ scan PAM write signal GW2k is a signal for controlling the turn-on and turn-off of the ninth and eleventh transistors T9 and T11 of each of the subpixels RP, GP and BP. The $k^{th}$ PWM emission signal PWEMk is a signal for controlling the turn-on and turn-off of the fifth, sixth, twelfth and fourteenth transistors T5, T6, T12 and T14. The $k^{th}$ PAM emission signal PAEMk is a signal for controlling the turn-on and turn-off of the fifteenth transistor T15'. The $k^{th}$ scan initialization signal GIk, the $k^{th}$ scan control signal GCk, the $k^{th}$ scan PWM write signal GW1 k, the $k^{th}$ scan PAM write signal GW2k, the $k^{th}$ PWM emission signal PWEMk, the $k^{th}$ PAM emission signal PAEMk, and the $k^{th}$ sweep signal SWPk may be generated with a cycle of one frame period.

A data address period ADDR includes first through third periods t1' through t3'. The first period t1' is a period in which the first electrode of the light emitting element EL, a gate electrode of the first transistor T1, and the gate electrode of the eighth transistor T8 are initialized. The second period t2' and the third period t3' are periods in which a PWM data voltage Vdata of a $j^{th}$ PWM data line DLj and a threshold voltage Vth1 of the first transistor T1 are sampled at the gate electrode of the first transistor T1 and in which a first PWM data voltage RVdata of a first PAM data line RDL and a threshold voltage Vth8 of the eighth transistor T8 are sampled at the gate electrode of the eighth transistor T8.

A first emission period EP1 includes a fourth period t4' and a fifth period t5'. The first emission period EP1 is a period in which the turn-on period of the eighth transistor T8 is controlled according to a control current Ic, and the driving current Ids is supplied to the light emitting element EL.

Each of second through $n^{th}$ emission periods EP2 through EPn includes sixth through ninth periods t6' through t9'. The sixth period t6' is a period in which the first electrode of the light emitting element EL and the gate electrode of the eighth transistor T8 are initialized. The seventh period t7' is a period in which the first PWM data voltage RVdata of the first PAM data line RDL and the threshold voltage Vth8 of the eighth transistor T8 are sampled at the gate of the eighth transistor T8. The eighth period t7' is substantially the same as the fourth period t4', and the ninth period t9' is substantially the same as the fifth period t5'.

Neighboring emission periods from among the first through $n^{th}$ emission periods EP1 through EPn may be spaced by about several to tens of horizontal periods.

The $k^{th}$ scan initialization signal GIk may have a gate-on voltage VGL during the first period t1' and have a gate-off voltage VGH during the other periods. That is, the $k^{th}$ scan initialization signal GIk may have a scan initialization pulse generated as the gate-on voltage VGL during the first period t1'.

The $k^{th}$ scan control signal GCk may have the gate-on voltage VGL during the first period t1' and the sixth period t6' and have the gate-off voltage VGH during the other periods. That is, the $k^{th}$ scan control signal GCk may have a scan control pulse generated as the gate-on voltage VGL during the first period t1' and the sixth period t6'.

The $k^{th}$ scan PWM write signal GW1k may have the gate-on voltage VGL during the second period t2' and have the gate-off voltage VGH during the other periods. That is, the $k^{th}$ scan PWM write signal GW1 k may have a scan PWM write pulse generated as the gate-on voltage VGL during the second period t2'.

The $k^{th}$ scan PAM write signal GW2k may have the gate-on voltage VGL during the second, third and seventh periods t2', t3' and t7' and have the gate-off voltage VGH during the other periods. That is, the $k^{th}$ scan PAM write signal GW2k may have scan PAM write pulses generated as the gate-on voltage VGL during the second, third and seventh periods t2', t3' and t7'.

The $k^{th}$ sweep signal SWPk may have sweep pulses in the form of triangular waves during the fifth period t5' and the ninth period t9' and may have the gate-off voltage VGH during the other periods. For example, a sweep pulse of the $k^{th}$ sweep signal SWPk may be in the form of a triangular wave that linearly decreases from the gate-off voltage VGH to the gate-on voltage VGL in each of the fifth period t5' and the ninth period t9' and immediately increases from the gate-on voltage VGL to the gate-off voltage VGH at the end of the fifth period t5' and at the end of the ninth period t9'.

The $k^{th}$ PWM emission signal PWEMk may have the gate-on voltage VGL during the fourth, fifth, eighth and ninth periods t4', t5', t8' and t9' and may have the gate-off voltage VGH during the other periods. That is, the $k^{th}$ PWM emission signal PWEMk may include PWM pulses generated as the gate-on voltage VGL during the fourth, fifth, eighth and ninth periods t4', t5', t8' and t9'.

The $k^{th}$ PAM emission signal PAEMk may have the gate-on voltage VGL during the fifth period t5' and the ninth period t9' and have the gate-off voltage VGH during the other periods. That is, the $k^{th}$ PAM emission signal PAEMk may include PAM pulses generated as the gate-on voltage VGL during the fifth period t5' and the ninth period t9'. A PWM pulse width of the $k^{th}$ PWM emission signal PWEMk may be greater than a sweep pulse width of the $k^{th}$ sweep signal SWPk.

Figure 22:
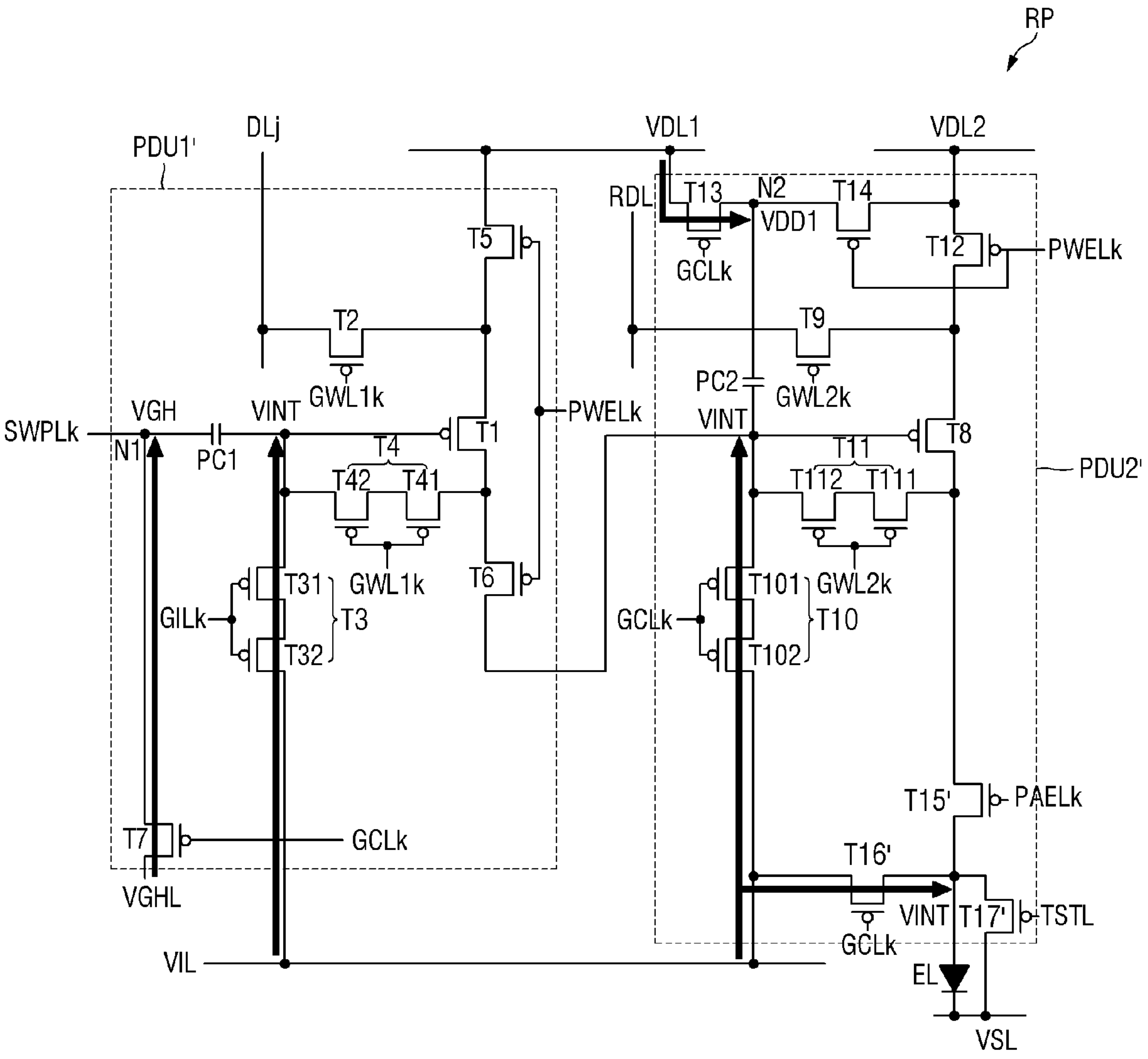
FIGS. 22, 23 and 24 are circuit diagrams illustrating the operation of a first subpixel during a first period, a second period, and a fifth period of FIG. 21.
Figure 23:
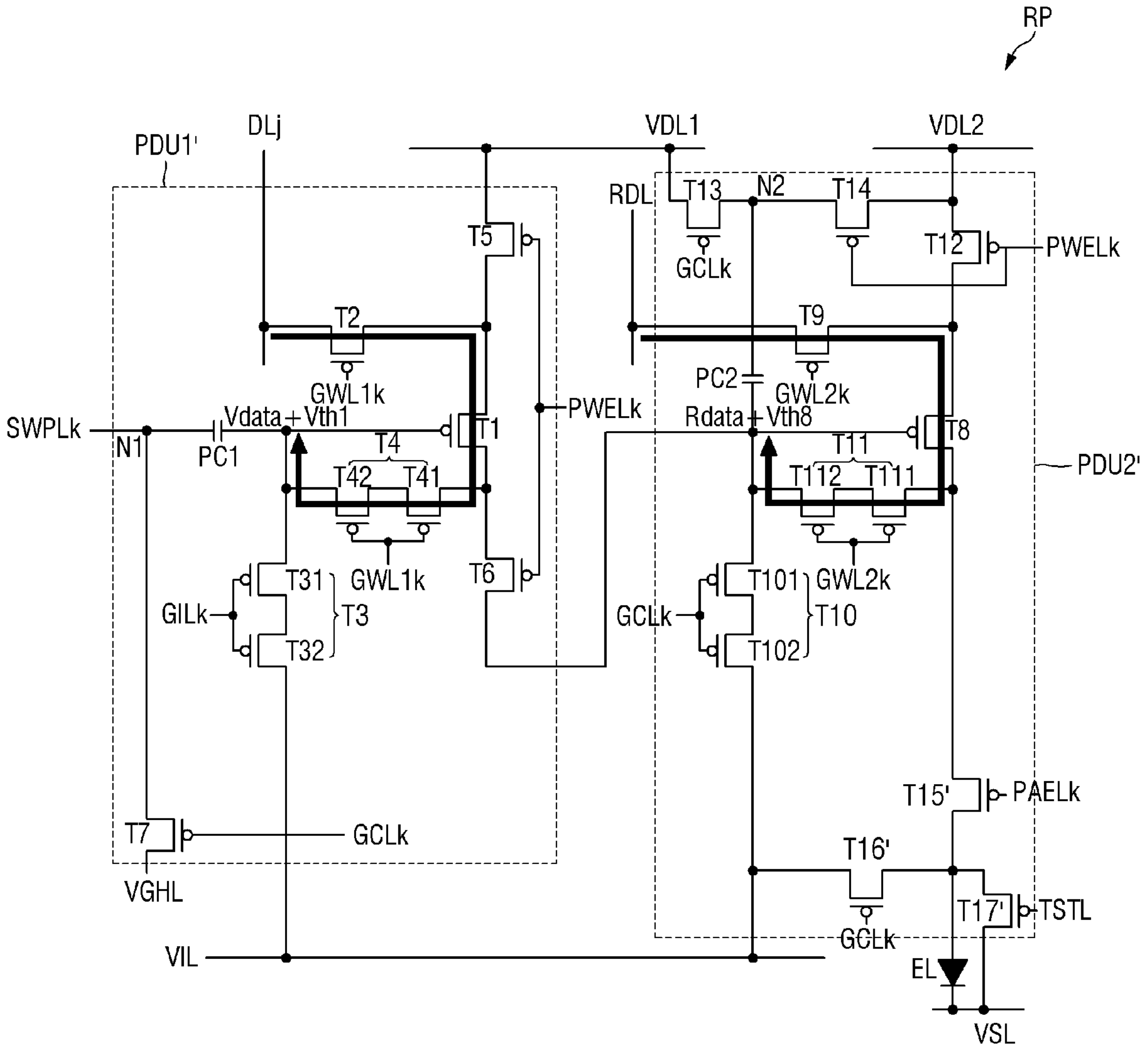
Figure 24:
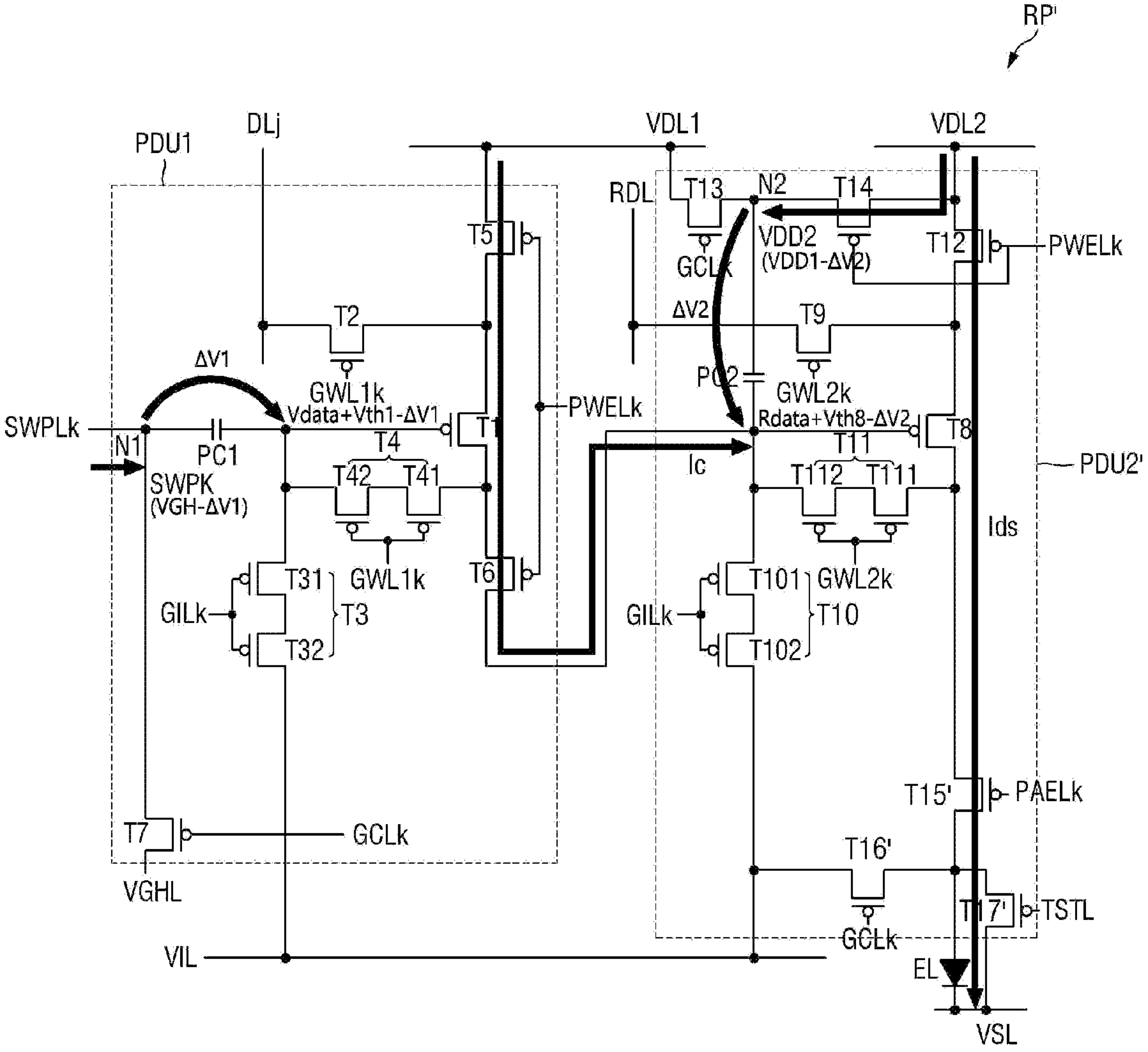

FIGS. 22 through 24 are circuit diagrams illustrating the operation of a first subpixel RP during the first period t1', the second period t2', and the fifth period t5' of FIG. 21.

The operation of a first subpixel RP according to one or more embodiments during the first through ninth periods t1' through t9' will now be described in detail with reference to FIGS. 21 through 24.

First, during the first period t1', the seventh transistor T7, the thirteenth transistor T13, and the sixteenth transistor T16' are turned on by the $k^{th}$ scan control signal GCk of the gate-on voltage VGL as illustrated in FIG. 22. In addition, during the first period t1', the third transistor T3 and the tenth transistor T10 are turned on by the $k^{th}$ scan initialization signal GIk of the gate-on voltage VGL.

Due to the turn-on of the seventh transistor T7, the gate-off voltage VGH of a gate-off voltage line VGHL is applied to a first node N1. Due to the turn-on of the thirteenth transistor T13, a first power supply voltage VDD1 of a first power line VDL1 is applied to a second node N2. Due to the turn-on of the sixteenth transistor T16', the first electrode of the light emitting element EL is initialized to an initialization voltage VINT of the initialization voltage line VIL.

Due to the turn-on of the third transistor T3, the gate electrode of the first transistor T1 is initialized to the initialization voltage VINT of the initialization voltage line VIL. In addition, due to the turn-on of the tenth transistor T10, the gate electrode of the eighth transistor T8 is initialized to the initialization voltage VINT of the initialization voltage line VIL.

Here, because the gate-off voltage VGH of the gate-off voltage line VGHL is applied to the first node N1, it may be possible to prevent a voltage change of the gate electrode of the first transistor T1 from being reflected in a $k^{th}$ sweep signal line SWPLk by a first capacitor PC1 and thereby causing the gate-off voltage VGH of the $k^{th}$ sweep signal SWPk to be changed.

Second, during the second period t2', the second transistor T2 and the fourth transistor T4 are turned on by the $k^{th}$ scan PWM write signal GW1 k of the gate-on voltage VGL as illustrated in FIG. 23. In addition, during the second period t2' and the third period t3', the ninth transistor T9 and the eleventh transistor T11 are turned on by the $k^{th}$ scan PAM write signal GW2k of the gate-on voltage VGL.

Due to the turn-on of the second transistor T2, the PWM data voltage Vdata of the $j^{th}$ PWM data line DLj is applied to a first electrode of the first transistor T1. Due to the turn-on of the fourth transistor T4, the gate electrode and the second electrode of the first transistor T1 are connected to each other. Thus, the first transistor T1 operates as a diode.

Because a voltage (Vgs=Vint-Vdata) between the gate electrode and the first electrode of the first transistor T1 is greater than the threshold voltage Vth1, the first transistor T1 forms a current path until the voltage Vgs between the gate electrode and the first electrode reaches the threshold voltage Vth1. Therefore, the voltage of the gate electrode of the first transistor T1 may increase from "Vint" to "Vdata+Vth1" during the second period t2'.

Due to the turn-on of the ninth transistor T9, the first PWM data voltage Rdata of the first PAM data line RDL is applied to a first electrode of the eighth transistor T8. Due to the turn-on of the eleventh transistor T11, the gate electrode and the second electrode of the eighth transistor T8 are connected to each other. Thus, the eighth transistor T8 may operate as a diode (e.g., may be diode-connected).

Because a voltage (Vgs=Vint-Rdata) between the gate electrode and the first electrode of the eighth transistor T8 is greater than the threshold voltage Vth8, the eighth transistor T8 forms a current path until the voltage Vgs between the gate electrode and the first electrode reaches the threshold voltage Vth8. Therefore, the voltage of the gate electrode of the eighth transistor T8 may increase from "Vint" to "Rdata+Vth8" during the second period t2' and the third period t3'.

Third, during the fourth period t4', the fifth transistor T5, the sixth transistor T6, the twelfth transistor T12, and the fourteenth transistor T14 are turned on by the $k^{th}$ PWM emission signal PWEMk of the gate-on voltage VGL as illustrated in FIG. 24.

Due to the turn-on of the fifth transistor T5, the first power supply voltage VDD1 is applied to the first electrode of the first transistor T1. In addition, due to the turn-on of the sixth transistor T6, the second electrode of the first transistor T1 is connected to the gate electrode of the eighth transistor T8.

The control current Ic flowing according to the voltage (Vdata+Vth1) of the gate electrode of the first transistor T1 during the fifth period t5' may not depend on the threshold voltage Vth1 of the first transistor T1 as shown in Equation 1, which was previously provided.

In addition, due to the turn-on of the twelfth transistor T12, the first electrode of the eighth transistor T8 may be connected to a second power line VDL2.

In addition, due to the turn-on of the fourteenth transistor T14, a second power supply voltage VDD2 of the second power line VDL2 is applied to the second node N2. When the second power supply voltage VDD2 of the second power line VDL2 is changed by a voltage drop or the like, a voltage difference ΔV2 between the first power supply voltage VDD1 and the second power supply voltage VDD2 may be reflected in the gate electrode of the eighth transistor T8 by a second capacitor PC2.

Due to the turn-on of the fourteenth transistor T14, the driving current Ids flowing according to the voltage (Rdata+Vth8) of the gate electrode of the eighth transistor T8 may be supplied to the fifteenth transistor T15'. The driving current Ids may not depend on the threshold voltage Vth8 of the eighth transistor T8 as shown in Equation 2, which was previously provided.

Fifth, during the fifth period t5', the fifth transistor T5, the sixth transistor T6, the twelfth transistor T12, and the fourteenth transistor T14 are turned on by the $k^{th}$ PWM emission signal PWEMk of the gate-on voltage VGL provided by the $k^{th}$ PWM emission line PWELk as illustrated in FIG. 24. During the fifth period t5', the fifteenth transistor T15' is turned on by the $k^{th}$ PAM emission signal PAEMk of the gate-on voltage VGL provided by the $k^{th}$ PAM emission line PAELk as illustrated in FIG. 24. During the fifth period t5', the $k^{th}$ sweep signal SWPk linearly decreases from the gate-off voltage VGH to the gate-on voltage VGL.

The fifth transistor T5, the sixth transistor T6, the twelfth transistor T12, and the fourteenth transistor T14 are substantially the same as described above in the fourth period t4'.

Due to the turn-on of the fifteenth transistor T15', the first electrode of the light emitting element EL may be connected to the second electrode of the eighth transistor T8.

During the fifth period t5', the $k^{th}$ sweep signal SWPk provided by the $k^{th}$ sweep signal line SWPLk linearly decreases from the gate-off voltage VGH to the gate-on voltage VGL, and a voltage change ΔV1 of the $k^{th}$ sweep signal SWPk is reflected in the gate electrode of the first transistor T1 by the first capacitor PC1. Therefore, the voltage of the gate electrode of the first transistor T1 may be Vdata+Vth1−ΔV1. That is, as the voltage of the $k^{th}$ sweep signal SWPk decreases during the fifth period t5', the voltage of the gate electrode of the first transistor T1 may linearly decrease.

A period during which the control current Ic is applied to the gate electrode of the eighth transistor T8 may vary according to the magnitude of the PWM data voltage Vdata applied to the first transistor T1. Accordingly, because the voltage of the gate electrode of the eighth transistor T8 varies according to the magnitude of the PWM data voltage Vdata applied to the first transistor T1, the turn-on period of the eighth transistor T8 can be controlled. Therefore, it may be possible to control a period SEP in which the driving current Ids is applied to the light emitting element EL during the fifth period t5'.

As described above, the emission period of the light emitting element EL may be adjusted by adjusting the PWM data voltage applied to the gate electrode of the first transistor T1. Therefore, the grayscale level or luminance displayed by the first subpixel RP may be adjusted by adjusting the pulse width of a voltage applied to the first electrode of the light emitting element EL while maintaining the driving current Ids applied to the light emitting element EL constant, rather than by adjusting the magnitude of the driving current Ids applied to the light emitting element EL.

In addition, the sixth period t6', the seventh period t7', the eighth period t8' and the ninth period t9' of each of the second through $n^{th}$ emission periods EP2 through EPn are similar to the above-described the first period t1', the third period t3', the fourth period t4', and the fifth period t5', respectively. That is, in each of the second through $n^{th}$ emission periods EP2 through EPn, after the gate electrode of the eighth transistor T8 is initialized to the initialization voltage VINT, a period during which the driving current Ids generated according to the first PWM data voltage Rdata written to the gate electrode of the eighth transistor T8 is applied to the light emitting element EL may be adjusted based on the PWM data voltage Vdata written to the gate electrode of the first transistor T1 during the address period ADDR.

Because the test signal of the test signal line TSTL is applied as the gate-off voltage VGH during an active period ACT of the $N^{th}$ frame period, the seventeenth transistor T17' may be turned off during the active period ACT of the $N^{th}$ frame period.

A second subpixel GP and a third subpixel BP may operate in substantially the same manner as the first subpixel RP described above with reference to FIGS. 22 through 24. Therefore, a description of the operation of the second subpixel GP and the third subpixel BP will be omitted.

Figure 25:
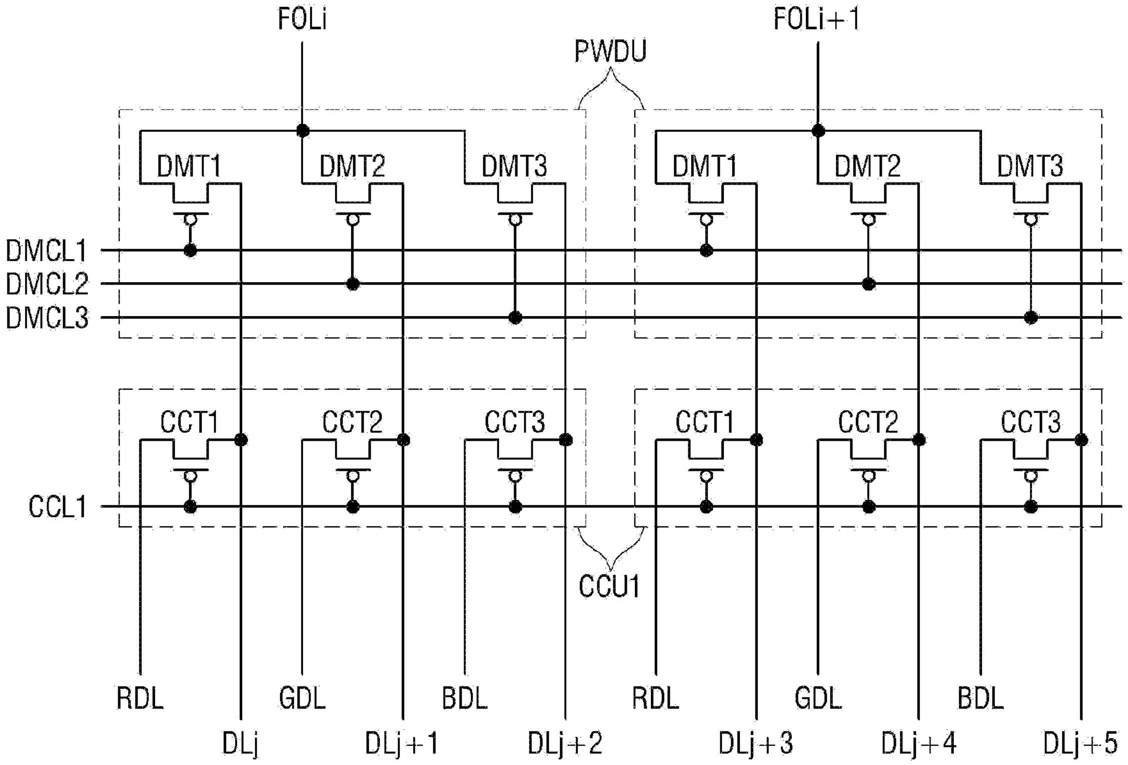
FIG. 25 is a circuit diagram of a first demux unit according to one or more embodiments.

FIG. 25 is a circuit diagram of a first demux unit DMX1 according to one or more embodiments.

The embodiment of FIG. 25 is different from the embodiment of FIG. 15 in that connection lines CLj through CLj+5 and second connection controllers CCU2 are removed from the first demux unit DMX1. In addition, in FIG. 25, each of PWM data distributors PWDU may be directly connected to Q PWM data lines instead of Q connection lines. Therefore, first connection controllers CCU1 control the connection between PWM data lines DLj through DLj+5 and PAM data lines RDL, GDL and BDL.

In a first mode, the first demux unit DMX1 distributes voltages applied to each of fan-out lines FOLi and FOLi+1 to Q PWM data lines according to demux control signals applied to demux control lines DMCL1 through DMCL3. In a second mode, the first demux unit DMX1 concurrently (e.g., simultaneously) applies the voltages applied to each of the fan-out lines FOLi and FOLi+1 to Q PWM data lines and Q PAM data lines according to the demux control signals applied to the demux control lines DMCL1 through DMCL3.

Because first PAM data lines RDL are commonly connected to a first data pad line RPL, second PAM data lines GDL are commonly connected to a second data pad line GPL, and third PAM data lines BDL are commonly connected to a third data pad line BPL through a second demux unit DMX2, it may be impossible to apply an independent inspection data voltage to each of the PAM data lines RDL, GDL and BDL. However, the first demux DMX1 time-divisionally supplies the inspection data voltages applied to each of the fan-out lines FOLi and FOLi+1 to Q PAM data lines in the second mode. Accordingly, an independent inspection data voltage can be applied to each of the PAM data lines RDL, GDL and BDL. Therefore, it may be possible to inspect whether a second pixel driver PDU2' operates normally by supplying an independent inspection data voltage to the second pixel driver PDU2' of each of subpixels RP, GP and BP.

In addition, as illustrated in FIG. 20, a first pixel driver PDU1' of each of the subpixels RP, GP and BP may be controlled by a $k^{th}$ scan PWM write signal GW1 k of a $k^{th}$ scan PWM write line GWL1k, and the second pixel driver PDU2' may be controlled by a $k^{th}$ scan PAM write signal GW2k of a $k^{th}$ scan PAM write line GWL2k. That is, the first pixel driver PDU1' and the second pixel driver PDU2' may be controlled by scan signals of different scan lines. In this case, in the second mode, a scan PWM write pulse of the $k^{th}$ scan PWM write signal GW1 k may not be applied, and only a scan PAM write pulse of the $k^{th}$ scan PAM write signal GW2k may be applied. Accordingly, even when the inspection data voltages of the fan-out lines FOLi and FOLi+1 are concurrently (e.g., simultaneously) applied to the PWM data lines DLj through DLj+5 and the PAM data lines RDL, GDL and BDL, a PWM data voltage of a PWM data line may not be applied to the first pixel driver PDU1', but a PAM data voltage of a PAM data line may be applied to the second pixel driver PDU2'. Therefore, it may be possible to inspect whether the second pixel driver PDU2' of each of the subpixels RP, GP and BP operates normally.

Figure 26:
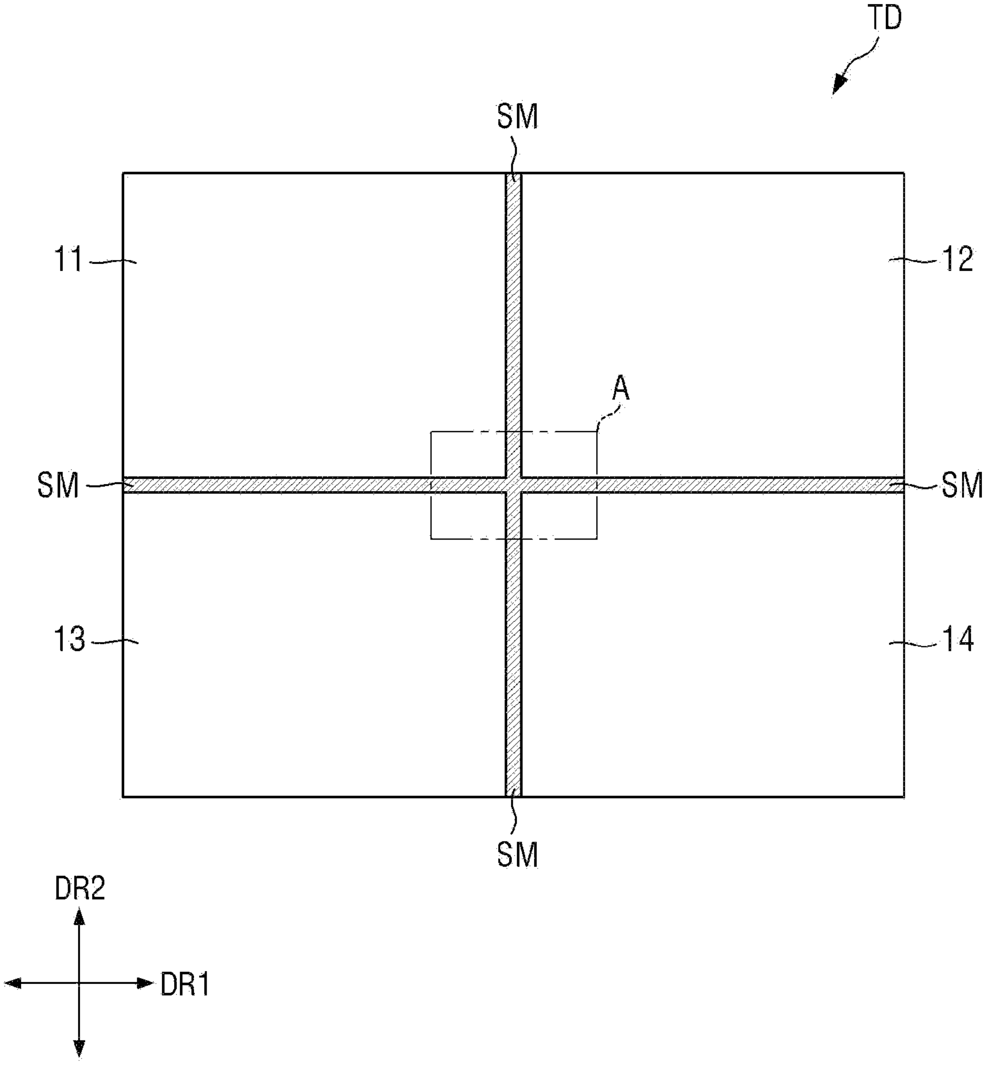
FIG. 26 is a plan view of a tiled display device including a display device according to one or more embodiments.

FIG. 26 is a plan view of a tiled display device TD including a display device according to one or more embodiments.

Referring to FIG. 26, the tiled display device TD may include a plurality of display devices 11 through 14. For example, the tiled display device TD may include a first display device 11, a second display device 12, a third display device 13, and a fourth display device 14.

The display devices 11 through 14 may be arranged in a grid shape. For example, the first display device 11 and the second display device 12 may be disposed in a first direction DR1. The first display device 11 and the third display device 13 may be disposed in a second direction DR2. The third display device 13 and the fourth display device 14 may be disposed in the first direction DR1. The second display device 12 and the fourth display device 14 may be disposed in the second direction DR2.

The number and arrangement of the display devices 11 through 14 in the tiled display device TD are not limited to those illustrated in FIG. 26. The number and arrangement of the display devices 11 through 14 in the tiled display device TD may be determined by the size of each of the display devices 11 through 14 and the tiled display device TD and the shape of the tiled display device TD.

The display devices 11 through 14 may have the same size, but embodiments of the present specification are not limited thereto. For example, the display devices 11 through 14 may also have different sizes.

Each of the display devices 11 through 14 may be shaped like a rectangle including long sides and short sides. The long sides or short sides of the display devices 11 through 14 may be connected to each other. Some or all of the display devices 11 through 14 may be disposed at an edge of the tiled display device TD and may form a side of the tiled display device TD. At least one of the display devices 11 through 14 may be disposed at at least one corner of the tiled display device TD and may form two adjacent sides of the tiled display device TD. At least one of the display devices 11 through 14 may be surrounded by other display devices.

The tiled display device TD may include a seam SM disposed between the display devices 11 through 14. For example, the seam SM may be disposed between the first display device 11 and the second display device 12, between the first display device 11 and the third display device 13, between the second display device 12 and the fourth display device 14, and between the third display device 13 and the fourth display device 14.

The seam SM may include a coupling member or an adhesive member. In this case, the display devices 11 through 14 may be connected to each other through the coupling member or the adhesive member of the seam SM.

However, the aspects of the present disclosure are not restricted to the one set forth herein. The above and other aspects of the present disclosure will become more apparent to one of daily skill in the art to which the present disclosure pertains by referencing the claims, with functional equivalents thereof to be included therein.

What is claimed is:

1. A display device comprising:

pulse amplitude modulation (PAM) data lines;

pulse width modulation (PWM) data lines;

a plurality of subpixels, each of the plurality of subpixels being connected to a corresponding one of the PWM data lines and a corresponding one of the PAM data lines;

a first PWM control line configured to receive a first PWM control signal;

a second PWM control line configured to receive a second PWM control signal;

a third PWM control line configured to receive a third PWM control signal;

a first power line configured to receive a first power supply voltage; and a second demultiplexer (demux) unit configured to connect the PWM data lines to the first power line according to the first PWM control signal, the second PWM control signal, and the third PWM control signal.

2. The display device of claim 1, wherein the second demux unit is configured to connect a first PWM data line from among the PWM data lines to the first power line when the first PWM control signal of a gate-on voltage is applied to the first PWM control line, to connect a second PWM data line from among the PWM data lines to the first power line when the second PWM control signal of the gate-on voltage is applied to the second PWM control line, and to connect a third PWM data line from among the PWM data lines to the first power line when the third PWM control signal of the gate-on voltage is applied to the third PWM control line.

3. The display device of claim 1, wherein the second demux unit comprises:

a first PWM control transistor comprising a gate electrode connected to the first PWM control line, a first electrode connected to a first PWM data line from among the PWM data lines, and a second electrode connected to the first power line;

a second PWM control transistor comprising a gate electrode connected to the second PWM control line, a first electrode connected to a second PWM data line from among the PWM data lines, and a second electrode connected to the first power line; and a third PWM control transistor comprising a gate electrode connected to the third PWM control line, a first electrode connected to a third PWM data line from among the PWM data lines, and a second electrode connected to the first power line.

4. The display device of claim 1, further comprising:

a first connection control line configured to receive a first connection control signal;

a first PAM pad line configured to receive a first PWM data voltage;

a second PAM pad line configured to receive a second PWM data voltage; and a third PAM pad line configured to receive a third PWM data voltage.

5. The display device of claim 4, wherein when the first connection control signal of a gate-on voltage is applied to the first connection control line, the second demux unit connects the first PAM pad line to a first PAM data line from among the PAM data lines, connects the second PAM pad line to a second PAM data line from among the PAM data lines, and connects the third PAM pad line to a third PAM data line from among the PAM data lines.

6. The display device of claim 1, further comprising:

connection lines;

a first connection control line configured to receive a first connection control signal;

a second connection control line configured to receive a second connection control signal; and a first demux unit configured to connect the connection lines to the PAM data lines or to the PWM data lines according to the first connection control signal and the second connection control signal.

7. The display device of claim 6, wherein the first demux unit is configured to connect the connection lines to the PWM data lines when the first connection control signal of a gate-on voltage is applied to the first connection control line.

8. The display device of claim 6, wherein the first demux unit is configured to connect the connection lines to the PAM data lines when the second connection control signal of a gate-on voltage is applied to the second connection control line.

9. The display device of claim 6, wherein the first demux unit comprises:

a first connection control transistor comprising a gate electrode connected to the second connection control line, a first electrode connected to a first connection line from among the connection lines, and a second electrode connected to a first PAM data line from among the PAM data lines;

a second connection control transistor comprising a gate electrode connected to the second connection control line, a first electrode connected to a second connection line from among the connection lines, and a second electrode connected to a second PAM data line from among the PAM data lines; and a third connection control transistor comprising a gate electrode connected to the second connection control line, a first electrode connected to a third connection line from among the connection lines, and a second electrode connected to a third PAM data line from among the PAM data lines.

10. The display device of claim 6, wherein the first demux unit comprises:

a fourth connection control transistor comprising a gate electrode connected to the first connection control line, a first electrode connected to a first connection line from among the connection lines, and a second electrode connected to a first PWM data line from among the PWM data lines;

a fifth connection control transistor comprising a gate electrode connected to the first connection control line, a first electrode connected to a second connection line from among the connection lines, and a second electrode connected to a second PWM data line from among the PWM data lines; and a sixth connection control transistor comprising a gate electrode connected to the first connection control line, a first electrode connected to a third connection line from among the connection lines, and a second electrode connected to a third PWM data line from among the PWM data lines.

11. The display device of claim 6, further comprising:

a fan-out line configured to receive PWM data voltages;

a first demux control line configured to receive a first demux control signal;

a second demux control line configured to receive a second demux control signal; and a third demux control line configured to receive a third demux control signal, and wherein the first demux unit is configured to selectively connect the fan-out line to Q connection lines among the connection lines according to the first demux control signal, the second demux control signal, and the third demux control signal, where Q is an integer greater than equal to 2.

12. The display device of claim 11, wherein the first demux unit is configured to connect the fan-out line to a first connection line from among the Q connection lines when the first demux control signal of a gate-on voltage is applied to the first demux control line, to connect the fan-out line to a second connection line from among the Q connection lines when the second demux control signal of the gate-on voltage is applied to the second demux control line, and to connect the fan-out line to a third connection line from among the Q connection lines when the third demux control signal of the gate-on voltage is applied to the third demux control line.

13. The display device of claim 11, wherein the first demux unit comprises:

a first demux transistor comprising a gate connected to the first demux control line, a first electrode connected to the fan-out line, and a second electrode connected to a first connection line from among the Q connection lines;

a second demux transistor comprising a gate connected to the second demux control line, a first electrode connected to the fan-out line, and a second electrode connected to a second connection line from among the Q connection lines; and a third demux transistor comprising a gate electrode connected to the third demux control line, a first electrode connected to the fan-out line, and a second electrode connected to a third connection line from among the Q connection lines.

14. A display panel comprising:

a plurality of fan-out lines;

a plurality of pulse amplitude modulation (PAM) data lines;

a plurality of pulse width modulation (PWM) data lines;
a plurality of PAM pad lines;
a first power line configured to receive a first power supply voltage;
a plurality of subpixels, each of the plurality of subpixels being connected to a corresponding one of the plurality of PWM data lines and a corresponding one of the plurality of PAM data lines;
a first demultiplexer (demux) unit configured to control a connection between the plurality of fan-out lines and the plurality of PWM data lines and a connection between the plurality of fan-out lines and the plurality of PAM data lines; and
a second demux unit configured to control a connection between the plurality of PWM data lines and the first power line and control a connection between the plurality of PAM data lines and the plurality of PAM pad lines.

15. The display panel of claim 14, wherein the first demux unit is adjacent to a first side of the display panel, and
wherein the second demux unit is adjacent to a second side of the display panel.

16. The display panel of claim 14, further comprising:
a plurality of demux control lines configured to receive a plurality of demux control signals, respectively;
a plurality of PWM control lines configured to receive PWM control signals, respectively; and
a plurality of connection control lines configured to receive a plurality of connection control signals, respectively,
wherein when the first demux unit connects connection lines to the PAM data lines in response to the plurality of connection control signals and the plurality of demux control signals, the second demux unit connects the PWM data lines to the first power line in response to the plurality of connection control signals and the PWM control signals.

17. The display panel of claim 14, further comprising:
a plurality of demux control lines configured to receive a plurality of demux control signals, respectively;
a plurality of PWM control lines configured to receive PWM control signals, respectively; and
a plurality of connection control lines configured to receive a plurality of connection control signals, respectively,
wherein when the first demux unit connects connection lines to the PWM data lines in response to the plurality of connection control signals and the plurality of demux control signals, the second demux unit connects the PAM data lines to the plurality of PAM pad lines.

18. The display panel of claim 14, further comprising:
a plurality of first pad units comprising a plurality of first data pads connected to the plurality of fan-out lines; and
a plurality of second pad units comprising a power pad connected to the first power line and a plurality of second data pads connected to the plurality of PAM pad lines, and
wherein the plurality of first pad units are adjacent to a first side of the display panel, and the plurality of second pad units are adjacent to a second side of the display panel.

19. The display panel of claim 18, wherein the first demux unit is adjacent to the plurality of first pad units, and the second demux unit is adjacent to the plurality of second pad units.

20. The display panel of claim 14, wherein each of the plurality of subpixels comprises:
a PWM emission line configured to receive a PWM emission signal;
a PAM emission line configured to receive a PAM emission signal;
a first pixel driver configured to supply a control current according to a corresponding one of PWM data voltages to a first node according to the PWM emission signal;
a second pixel driver configured to generate a driving current according to a corresponding one of the PWM data voltages according to the PWM emission signal; and
a third pixel driver configured to supply the driving current to a light emitting element according to the PAM emission signal and a voltage of the first node.

* * * * *